United States Patent
Park et al.

(10) Patent No.: US 11,160,045 B2
(45) Date of Patent: Oct. 26, 2021

(54) TIMING ADVANCE GROUP CONFIGURATION

(71) Applicant: BEIJING XIAOMI MOBILE SOFTWARE CO., LTD., Beijing (CN)

(72) Inventors: Kyungmin Park, Herndon, VA (US); Esmael Dinan, Herndon, VA (US); Hyoungsuk Jeon, Centreville, VA (US); Hua Zhou, Herndon, VA (US); Alireza Babaei, Fairfax, VA (US)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/101,064

(22) Filed: Aug. 10, 2018

(65) Prior Publication Data
US 2019/0053183 A1    Feb. 14, 2019

Related U.S. Application Data

(60) Provisional application No. 62/543,836, filed on Aug. 10, 2017, provisional application No. 62/543,839, (Continued)

(51) Int. Cl.
*H04W 56/00* (2009.01)
*H04W 76/18* (2018.01)
(Continued)

(52) U.S. Cl.
CPC ...... *H04W 56/0045* (2013.01); *H04B 7/0617* (2013.01); *H04J 11/0069* (2013.01);
(Continued)

(58) Field of Classification Search
CPC ......... H04W 72/0446; H04W 74/0833; H04W 72/0413; H04W 72/0406; H04W 56/001;
(Continued)

(56) References Cited

U.S. PATENT DOCUMENTS 8,588,169 B2 * 11/2013 Dinan ............... H04W 56/0005
370/329
9,282,521 B2 * 3/2016 Lim .................... H04W 52/146
(Continued)

FOREIGN PATENT DOCUMENTS

| CN | 106162730 A | 11/2016 |
| CN | 106538037 A | 3/2017 |
| WO | 2017127440 A1 | 7/2017 |

OTHER PUBLICATIONS

3GPP TR 38.801 V14.0.0 (Mar. 2017); 3rd Generation Partnership Project; Technical Specification Group Radio Access Network; Study on new radio access technology: Radio access architecture and interfaces (Release 14).

(Continued)

*Primary Examiner* — Hanh N Nguyen
(74) *Attorney, Agent, or Firm* — Arch & Lake LLP

(57) ABSTRACT

A base station distributed unit may determine that a first uplink timing advance value for a first cell of a wireless device is different than a second uplink timing advance value for a second cell of the wireless device. The first cell and the second cell may belong to a first timing advance group. The base station distributed unit may transmit a first message to a base station central unit in response to the determining. The first message may comprise one or more information elements indicating a reconfiguration of a timing advance group configuration for the wireless device. The base station distributed unit may receive a radio resource control message from the base station central unit based on the reconfiguration for the wireless device.

20 Claims, 51 Drawing Sheets

Related U.S. Application Data filed on Aug. 10, 2017, provisional application No. 62/543,841, filed on Aug. 10, 2017, provisional application No. 62/543,847, filed on Aug. 10, 2017.

(51) Int. Cl.

| | | |
|---|---|---|
| *H04W 76/11* | (2018.01) | |
| *H04W 76/27* | (2018.01) | |
| *H04B 7/06* | (2006.01) | |
| *H04J 11/00* | (2006.01) | |
| *H04L 1/18* | (2006.01) | |
| *H04L 5/00* | (2006.01) | |
| *H04W 28/02* | (2009.01) | |
| *H04W 72/02* | (2009.01) | |
| *H04W 72/04* | (2009.01) | |
| *H04W 72/14* | (2009.01) | |
| *H04W 74/00* | (2009.01) | |
| *H04W 74/08* | (2009.01) | |

(52) U.S. Cl.
CPC ............ *H04L 1/1896* (2013.01); *H04L 5/001* (2013.01); *H04L 5/0057* (2013.01); *H04L 5/0092* (2013.01); *H04W 28/0278* (2013.01); *H04W 56/0005* (2013.01); *H04W 72/02* (2013.01); *H04W 72/048* (2013.01); *H04W 72/0413* (2013.01); *H04W 72/14* (2013.01); *H04W 74/004* (2013.01); *H04W 76/11* (2018.02); *H04W 76/18* (2018.02); *H04W 76/27* (2018.02); *H04L 5/0051* (2013.01); *H04L 5/0053* (2013.01); *H04W 74/0833* (2013.01)

(58) Field of Classification Search
CPC ..... H04W 72/02; H04W 76/18; H04W 76/27; H04W 68/005; H04W 76/32; H04W 72/046; H04W 16/28; H04W 56/045; H04W 76/11; H04W 28/0278; H04W 56/0005; H04W 72/048; H04W 72/14; H04W 74/004; H04W 88/085; H04W 24/02; H04W 76/10; H04L 1/1887; H04L 5/0032; H04L 1/1896; H04L 5/0057; H04L 5/0092; H04L 5/0051; H04L 5/0053; H04L 5/0082; H04L 5/0091; H04L 5/0023; H04B 7/0695; H04B 7/0408; H04B 7/0626; H04B 7/0617; H04J 11/0069

See application file for complete search history.

(56) References Cited

U.S. PATENT DOCUMENTS

| | | | | |
|---|---|---|---|---|
| 9,585,188 | B2* | 2/2017 | Jang | H04L 1/1835 |
| 10,194,413 | B2* | 1/2019 | He | H04W 56/00 |
| 10,531,451 | B2* | 1/2020 | Kazmi | H04W 72/0446 |
| 2010/0061361 | A1 | 3/2010 | Wu | |
| 2013/0058309 | A1* | 3/2013 | Kuo | H04W 56/0045 370/331 |
| 2013/0188473 | A1 | 7/2013 | Dinan | |
| 2013/0188580 | A1 | 7/2013 | Dinan | |
| 2013/0188612 | A1 | 7/2013 | Dinan | |
| 2013/0279433 | A1* | 10/2013 | Dinan | H04J 11/00 370/329 |
| 2013/0287012 | A1 | 10/2013 | Pragada et al. | |
| 2015/0334669 | A1 | 11/2015 | Zhang et al. | |
| 2015/0358950 | A1 | 12/2015 | Zhang et al. | |
| 2017/0318504 | A1 | 11/2017 | Zhang et al. | |
| 2018/0006770 | A1 | 1/2018 | Guo et al. | |
| 2018/0124724 | A1 | 5/2018 | Tsai et al. | |
| 2018/0279186 | A1 | 9/2018 | Park et al. | |
| 2018/0288760 | A1 | 10/2018 | Lee et al. | |
| 2018/0324641 | A1 | 11/2018 | Tsai et al. | |
| 2018/0367255 | A1 | 12/2018 | Jeon et al. | |
| 2018/0368107 | A1 | 12/2018 | Babaei et al. | |
| 2019/0037631 | A1 | 1/2019 | Byun et al. | |
| 2019/0053316 | A1* | 2/2019 | Aiba | H04W 72/0413 |
| 2019/0116514 | A1 | 4/2019 | Ookubo et al. | |
| 2019/0150071 | A1* | 5/2019 | Lee | H04W 4/70 370/328 |
| 2019/0159086 | A1 | 5/2019 | Xu et al. | |
| 2019/0166526 | A1 | 5/2019 | Xu et al. | |
| 2019/0191429 | A1 | 6/2019 | Stern-Berkowitz et al. | |
| 2019/0215726 | A1 | 7/2019 | Park et al. | |
| 2019/0222291 | A1 | 7/2019 | Wang et al. | |
| 2019/0313244 | A1 | 10/2019 | Wang et al. | |
| 2019/0356460 | A1 | 11/2019 | Tsuboi et al. | |
| 2019/0380158 | A1 | 12/2019 | Gao et al. | |
| 2020/0029390 | A1* | 1/2020 | Han | H04W 80/00 |
| 2020/0092733 | A1 | 3/2020 | Myhre et al. | |
| 2020/0092851 | A1* | 3/2020 | Zhang | H04L 5/0053 |

OTHER PUBLICATIONS

3GPP TS 36.321 V14.3.0 (Jun. 2017); Technical Specification; 3rd Generation Partnership Project; Technical Specification Group Radio Access Network; Evolved Universal Terrestrial Radio Access (E-UTRA); Medium Access Control (MAC) protocol specification (Release 14).
R2-1706401; 3GPP TSG-RAN WG2 Ad Hoc NR#2 ; Qingdao, China, Jun. 27-29, 2017; Source: CATT; Title: N and Threshold for Cell quality derivation; Agenda Item: 10.4.1.4.2.
R2-1706661; 3GPP TSG RAN WG2#NR_AdHoc#2; Qingdao, China, Jun. 27-29, 2017; Agenda item: 10.4.1.4.2; Source: ZTE Corporation; Title: Remaining issues on cell quality derivation from N beams.
R2-1706769; resubmisson of R2-1705181; 3GPP TSG-RAN2 NR Adhoc#02; Qingdao, China, Jun. 27-29, 2017; Agenda Item: 10.4.1.5.6; Source: Huawei, HiSilicon; Title: Beam specific SI transmission.
R2-1706918; 3GPP TSG-RAN WG2 Ad-hoc Meeting; Qingdao, China, Jun. 27-29, 2017; Agenda item: 10.4.1.4.2; Source: LG Electronics Inc.; Title: How to select good beams for cell quality derivation.
R2-1707013; 3GPP TSG-RAN WG2 #AdHoc Meeting; Qingdao, China, Jun. 27-29, 2017; Agena Item: 10.4.1.4.3; Source: Intel; Title: Report of email discussion [98#32][NR] Measurement report content (Intel).
Tdoc R2-1707284; 3GPP TSG RAN WG2 NR AdHoc#2; Qingdao, P.R. of China, Jun. 27-29, 2017; Agenda Item: 10.4.1.4.2; Source: Ericsson; Title: On the need for thresholds in cell quality derivation in NR.
R2-1707330; Resubmission; 3GPP TSG RAN WG2 NR AH #2; Qingdao, China, Jun. 27 to 29, 2017; Agenda Item: 10.4.1.4.8; Souce: Samsung; Title: The Impact of Beam Sweeping on RRM Measurement.
R3-172102; 3GPP TSG-RAN3 NR AdHoc Meeting; Qingdao, P. R. China, Jun. 27-29, 2017; Title: On the preliminary transport comparison between F1-C and F1-U protocols; Source: China Telecom.
R3-172176; 3GPP TSG-RAN3 NR AdHoc; Qingdao, China, Jun. 27-29, 2017; Title: F1AP procedures for RRC Connection Setup; Source: Huawei; Agenda item: 10.10.4.
R3-172178; 3GPP TSG RAN WG3 NR AdHoc; Qingdao, China, Jun. 27-29, 2017; Title: TP on Transmitting RRC Connection Setup message over F1 to 38.470; Source: Huawei; Agenda item: 10.10.4.
R3-172198; 3GPP TSG RAN WG3 NR AdHoc; Qingdao, China, Jun. 27-29, 2017; Agenda item: 10.10.1 Source: Huawei; Title: Discussions on F1 interface management.
R3-172199; 3GPP TSG RAN WG3 NR AdHoc; Qingdao, China, Jun. 27-29, 2017; Agenda item: 10.10.1 Source: Huawei; Title: TP on F1 interface management to 38.470.
R3-172200; 3GPP TSG RAN WG3 NR AdHoc; Qingdao, China, Jun. 27-29, 2017; Agenda item: 10.10.1 Source: Huawei, Hisilicon; Title: TP on F1 interface management procedures to 38.473.

(56) References Cited

OTHER PUBLICATIONS

R3-172209; 3GPP TSG RAN WG3 Meeting #97; Qingdao, P. R. China, Jun. 27-29, 2017; Agenda item: 10.10.1 Source: Chinatelecom; Title: gNB and gNB-CU ID discussion.
R3-172218; 3GPP TSG RAN WG3 Meeting #NR ADHOC; Qingdao,China, Jun. 27-29, 2017; Source: CATT Title: Discussion on the F1AP funtions necessary for Option 3.
R3-172244; 3GPP TSG-RAN WG3 Meeting Ad Hoc; Qingdao, P. R. China, Jun. 27-29, 2017; Agenda item: 10.10.1; Source: Samsung, KT, SK Telecom; Title: Centralized retransmission of lost PDUs.
R3-172250;3GPP TSG-RAN WG3 Meeting Ad Hoc; Qingdao, P. R. China, Jun. 27-29, 2017; Agenda item: 10.10.4; Source: Samsung, KT, SK Telecom; Title: On-demand SI support in high layer functional split.
R3-172251; 3GPP TSG-RAN WG3 Meeting Ad Hoc; Qingdao, P. R. China, Jun. 27-29, 2017; Agenda item: 10.10.1; Source: Samsung, KT, SK Telecom; Title: Stage 2 text proposal for TS38.401 on mechanism of centralized retransmission of lost PDUs.
R3-172256; 3GPP TSG-RAN WG3 Meeting Ad Hoc; Qingdao, P. R. China, Jun. 27-29, 2017; Agenda item: 10.10.4; Source: Samsung, KT, SK Telecom; Title: Stage 2 text proposal for TS38.401 on supporting on-demand SI.
R3-172266; 3GPP TSG-RAN WG3 Meeting #NR AdHoc; Qingdao, P. R. China, Jun. 27-29, 2017; Agenda item: 10.10.4; Source: LG Electronics Inc.; Title: Issue on C-RNTI allocation for RRC connection resume.
R3-172309; 3GPP TSG RAN WG3 AdHoc NR; Qingdao, China, Jun. 27-29, 2017; Agenda item: 10.10.1; Source: Nokia, Alcatel-Lucent Shanghai Bell; Title: Inter-gNB-DU Mobility procedure.
R3-172310; 3GPP TSG RAN WG3 AdHoc NR; Qingdao, China, Jun. 27-29, 2017; Agenda item: 10.10.1 Source: Nokia, Alcatel-Lucent Shanghai Bell; Title: TP of Inter-gNB-DU Mobility procedure (TS 38.401).
R3-172321; 3GPP TSG RAN WG3 AdHoc NR; Qingdao, China, Jun. 27-29, 2017; Agenda item: 10.10.1; Source: Nokia, Alcatel-Lucent Shanghai Bell; Title: Retransmission procedure in radio link outage.
R3-172322; 3GPP TSG RAN WG3 AdHoc NR; Qingdao, China, Jun. 27-29, 2017; Agenda item: 10.10.1; Source: Nokia, Alcatel-Lucent Shanghai Bell; Title: TP of Retransmission procedure in radio link outage (TS 38.401).
R3-172323; 3GPP TSG RAN WG3 AdHoc NR; Qingdao, China, Jun. 27-29, 2017; Agenda item: 10.10.1; Source: Nokia, Alcatel-Lucent Shanghai Bell; Title: TP of Retransmission procedure in radio link outage (TS 38.475).
R3-172324; 3GPP TSG-RAN3 Adhoc NR; Qingdao, China, Jun. 27-29, 2017; Title: [Draft] LS on retransmission procedure in radio link outage.
R3-172333; 3GPP TSG RAN WG3 AdHoc NR; Qingdao, China, Jun. 27-29, 2017; Agenda item: 10.10.1 Source: Nokia, Alcatel-Lucent Shanghai Bell; Title: UE Initial Access procedure.
R3-172334; 3GPP TSG RAN WG3 AdHoc NR; Qingdao, China, Jun. 27-29, 2017; Agenda item: 10.10.1 Source: Nokia, Alcatel-Lucent Shanghai Bell; Title: TP of UE Initial Access procedure (TS 38.401).
R3-172342; 3GPP TSG-RAN WG3 Meeting NR Adhoc; Qingdao, China, Jun. 27, 2017-Jun. 29, 2017; Agenda item: 10.10.4; Source: LG Electronics Inc.; Title: Consideration on C-RNTI during initial UE access.
R3-172343; 3GPP TSG-RAN WG3 Meeting NR Adhoc; Qingdao, China, May 27, 2017-May 29, 2017; Agenda item: 10.10.4; Source: LG Electronics Inc.; Title: TP for consideration on C-RNTI during initial UE access.
R3-172344; 3GPP TSG-RAN WG3 Meeting NR Adhoc; Qingdao, China, May 27, 2017-May 29, 2017; Agenda item: 10.10.4; Source: LG Electronics Inc.; Title: TP for consideration on C-RNTI during initial UE access.
R3-172345; 3GPP TSG RAN WG3 NR AD HOC; Qingdao, China, Jun. 27-29, 2017; RRC message transmission over F1 interface for TS38.401.

R3-172346; 3GPP TSG RAN WG3 NR AD HOC; Qingdao, China, Jun. 27-29, 2017; Title: RRC message transmission over F1 interface for TS38.470.
R3-172347; 3GPP TSG RAN WG3 NR AD HOC; Qingdao, China, Jun. 27-29, 2017; Title: RRC message transmission over F1 interface for TS38.473.
R3-172356; 3GPP TSG RAN WG3 NR AD HOC; Qingdao, China, Jun. 27-29, 2017; Agenda item: 10.10.1 Source: ZTE, China Telecom; Title: Discussion on flow control over F1-U.
R3-172357; 3GPP TSG RAN WG3 NR AD HOC; Qingdao, China, Jun. 27-29, 2017; Title: Update on Flow control over F1 interface for TS38.401.
R3-172358; 3GPP TSG RAN WG3 NR AD HOC; Qingdao, China, Jun. 27-29, 2017; Title: Flow control over F1 interface for TS38.475.
R3-172399; 3GPP TSG-RAN WG3-NR #2; Qingdao, P.R. China, Jun. 27-29, 2017; Agenda item: 10.10.1 Source: NEC; Title: How many gNB-DUs can be operated by one gNB-CU.
R3-172401; 3GPP TSG-RAN WG3 NR#2 Adhoc; Qingdao, China, Jun. 27-29, 2017; Agenda item: 10.10.1 Source: CMCC; Title: gNB ID and NCGI considering CU-DU split.
R3-172417; 3GPP TSG RAN WG3 NR AD HOC; Qingdao, China, Jun. 27-29, 2017; Agenda item: 10.10.1 Source: ZTE, China Unicom; Title: Discussion on CU DU ID and NCGI.
R3-172418; 3GPP TSG RAN WG3 NR AD HOC; Qingdao, China, Jun. 27-29, 2017; Title: CUDU ID and NCGI for TS38.300.
R3-172481; 3GPP TSG-RAN WG3 Meeting Ad Hoc; Qingdao, P. R. China, Jun. 27-29, 2017; Agenda item: 10.10.1; Source: Samsung; Title: Identification of gNB, gNB-CU/DU, and NR cell.
R3-172484; 3GPP TSG-RAN WG3 NR#2; Qingdao P. R. China, May 27-29, 2017; Agenda Item: 10.10.1; Source: Vodafone; Title: Common Radio Resource Management Functional Split for Different Deployment Scenarios.
Tdoc R3-172511; 3GPP TSG-RAN WG3 AH #2; Qingdao, P. R. China, Jun. 27-29, 2017; Agenda Item: 10.10.1 Source: Ericsson; Title: Resilience and scalability in a disaggregated gNB.
Tdoc R3-172512; 3GPP TSG-RAN WG3 AH #2; Qingdao, P. R. China, Jun. 27-29, 2017; Agenda Item: 10.10.1; Source: Ericsson; Title: TP for resilience and scalability in a disaggregated gNB.
R3-172513; 3GPP TSG-RAN WG3 NR AdHoc Meeting #2; Qingdao, P.R. China, Jun. 27-29, 2017; Agenda Item: 10.10.1; Source: Ericsson; Title: Further discussion on the internal split RAN architecture.
R3-172514; 3GPP TSG-RAN WG3 NR Adhoc Meeting #2; Qingdao, P.R. China, Jun. 27-29, 2017; Title: Deployment scenarios for disaggregated NG RAN nodes.
CMCC. "Discussion on Intra-DU Inter-Cell Mobility". 3GPP TSG-RAN WG3 #97 R3-173142. Berlin, Germany, Aug. 12, 2017. section 2.1.
ZTE. "Solution on RRC message transmission". 3GPP TSG RAN WG3 Meeting #96 R3-171593. Hangzhou, P. R. China, May 19, 2017 section 2.
First Office Action of the Chinese application No. 201880065376.7, dated Sep. 8, 2020.
Non-Final Office Action of the U.S. Appl. No. 16/101,074, dated Jan. 10, 2020.
Final Office Action of the U.S. Appl. No. 16/101,074, dated Jul. 10, 2020.
Non-Final Office Action after RCE of the U.S. Appl. No. 16/101,074, dated Mar. 18, 2021.
ETSI TS 136 331 V9.2.0 (Apr. 2010). LTE; Evolved Universal Terrestrial Radio Access (E-UTRA); Radio Resource Control (RRC); Protocol specification (3GPP TS 36.331 version 9.2.0 Release 9).
U.S. Appl. No. 62/502,430, Tsai, May 5, 2017(Year:2017).
Non-Final Office Action of the U.S. Appl. No. 16/101,077, dated Jan. 2, 2020.
Notice of Allowance of the US No. U.S. Appl. No. 16/101,077, dated May 14, 2020.
Huawei, Discussions on mobility procedures, 3GPP TSG RAN WG3 adhoc_R3_AH_NR-1706 R3-172181, 3GPP, Jun. 20, 2017.
ZTE, Corporation, Signalling flows of solution 1A, 3GPP TSG-RAN WG3#82, R3-132204, 3GPP, Nov. 1, 2013.

(56) References Cited

OTHER PUBLICATIONS

ZTE, Update on F1 interface management for TS38.473, 3GPP TSG RAN WG3 adhoc_R3_AH_NR_1706 R3-172351, 3GPP, Jun. 20, 2017.
ASTRI, TCL Communication Ltd., Measurement Configuration Reduction for Intra-NR Mobility, 3GPP TSG RAN WG2 #96 R2-168017, 3GPP, Nov. 5, 2016.
First Office Action of the Japanese Application No. 2020-507080, dated Sep. 2, 2020.
3GPP TS 36.133 V14.3.0 (Mar. 2017). 3rd Generation Partnership Project; Technical Specification Group Radio Access Network; Evolved Universal Terrestrial Radio Access (E-UTRA); Requirements for support of radio resource management. (Release 14).
International Search Report in the International Application No. PCT/US2018/046270, dated Oct. 1, 2019.
Written Opinion of the International Search Authority in the International Application No. PCT/US2018/046270, dated Oct. 1, 2019.
First Office Action of the Canadian Application No. 3069759, dated Aug. 25, 2020.
Final Office Action of the U.S. Appl. No. 16/101,074, dated Jul. 7, 2021, (35p).

* cited by examiner

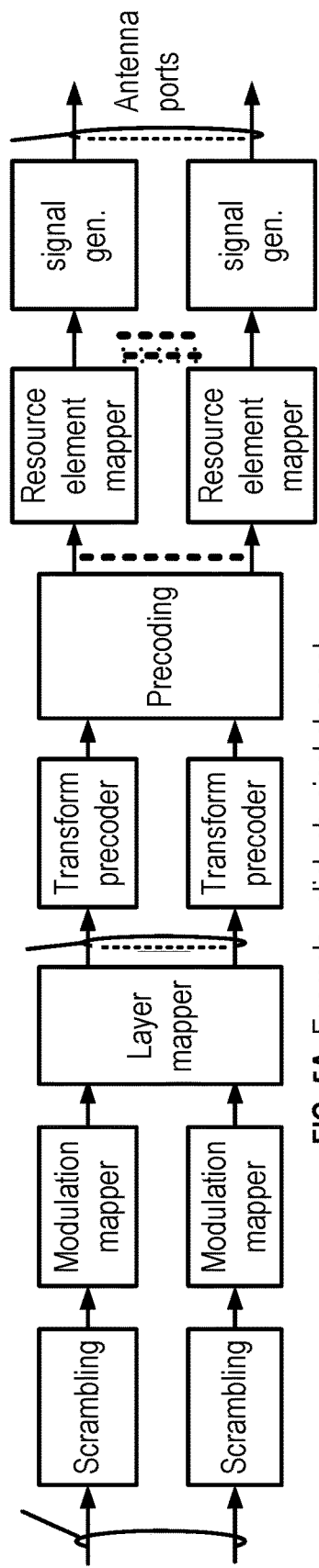
FIG. 5A Example uplink physical channel
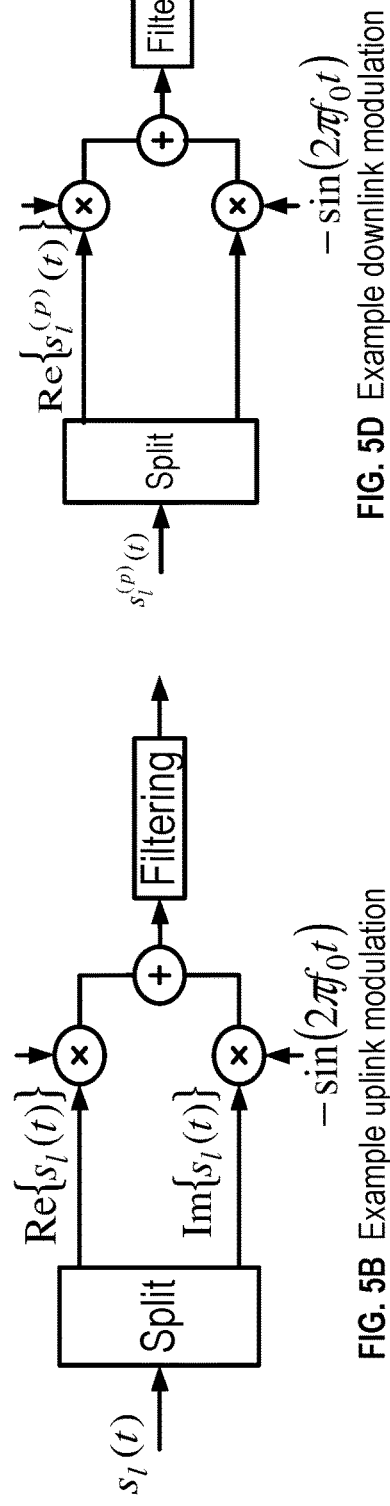
FIG. 5B Example uplink modulation
FIG. 5D Example downlink modulation
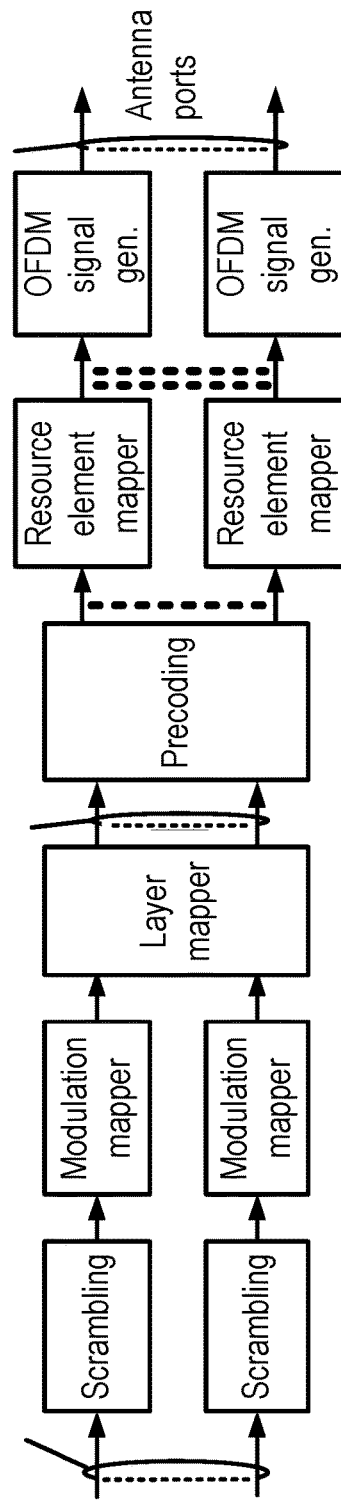
FIG. 5C Example downlink physical channel Dual-Connectivity- two MAC entities at UE side Example 1: 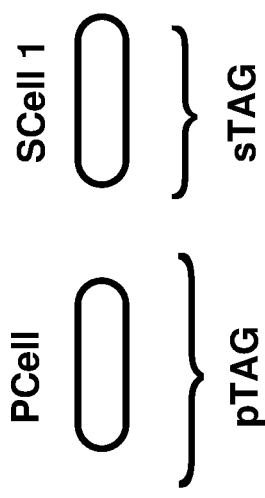
Example 2: 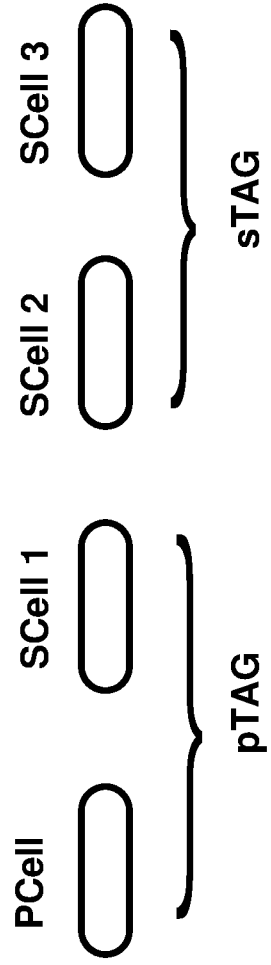
Example 3: 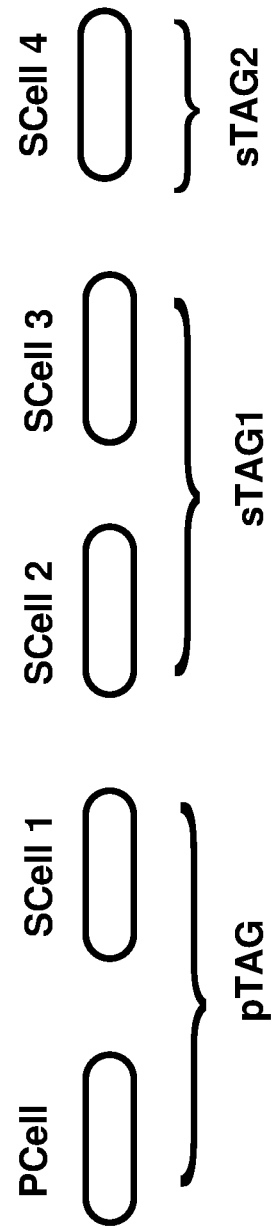
FIG. 8 gNB connected to NGC eLTE eNB connected to NGC

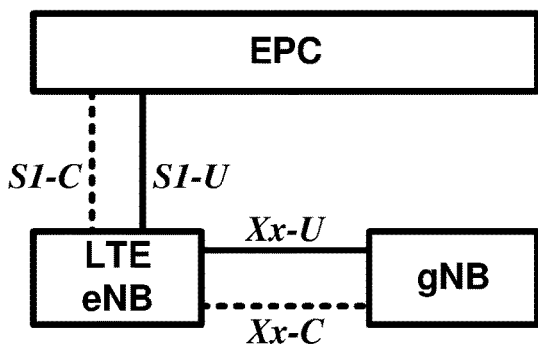

LTE eNB connected to EPC with non-standalone gNB.
gNB user plane connected to EPC via LTE eNB.

FIG. 11A

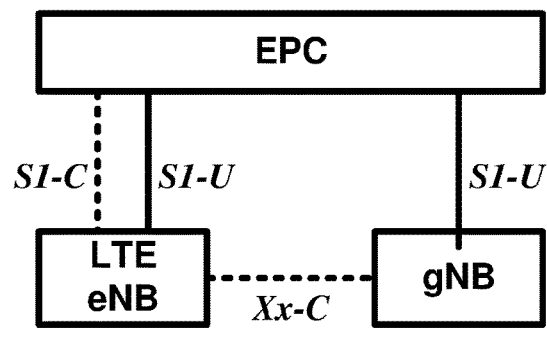

LTE eNB connected to EPC with non-standalone gNB.
gNB user plane connected to EPC directly.

FIG. 11B

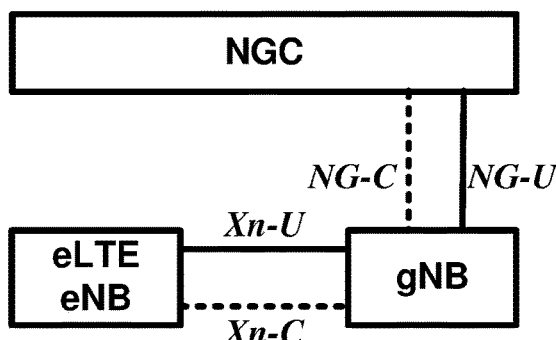

gNB connected to NGC with non-standalone eLTE eNB.
eLTE eNB user plane connected to NGC via gNB.

FIG. 11C

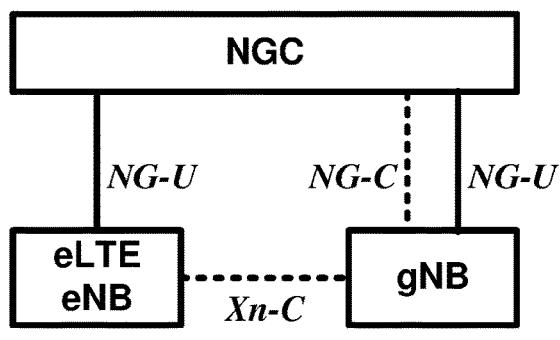

gNB connected to NGC with non-standalone eLTE eNB.
eLTE eNB user plane connected to NGC directly.

FIG. 11D

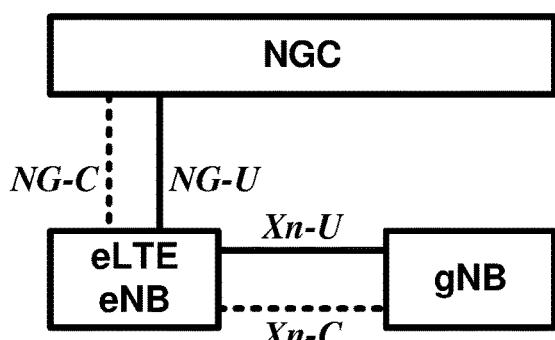

eLTE eNB connected to NGC with non-standalone gNB.
gNB user plane connected to NGC via eLTE eNB.

FIG. 11E

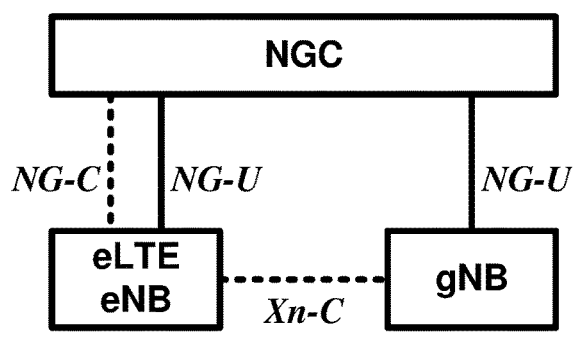

eLTE eNB connected to NGC with non-standalone gNB.
gNB user plane connected to NGC directly.

FIG. 11F

Radio protocol architecture for split bearer and SCG bearer. LTE eNB connected to EPC with non-standalone gNB.

Radio protocol architecture for split bearer and SCG bearer. gNB connected to NGC with non-standalone eLTE eNB.

Radio protocol architecture for split bearer and SCG bearer. eLTE eNB connected to NGC with non-standalone gNB.

Non-centralized deployment

Centralized deployment

RRC Connection Control Procedures

| | RAN → UE | UE → RAN | N | Notes |
|---|---|---|---|---|
| RRC connection establishment | RRCConnectionSetup or RRCConnectionResume | RRCConnectionSetupComplete or RRCConnectionResumeComplete | 15 | |
| RRC connection release | RRCConnectionRelease | | N/A | |
| RRC connection re-configuration (radio resource configuration) | RRCConnectionReconfiguration | RRCConnectionReconfigurationComplete | 15 | |
| RRC connection re-configuration (measurement configuration) | RRCConnectionReconfiguration | RRCConnectionReconfigurationComplete | 15 | |
| RRC connection re-configuration | RRCConnectionReconfiguration | RRCConnectionReconfigurationComplete | 15 | |
| RRC connection reconfiguration (SCell addition/release) | RRCConnectionReconfiguration | RRCConnectionReconfigurationComplete | 20 | |
| RRC connection reconfiguration (SCG establishment/ release, SCG cell addition/ release) | RRCConnectionReconfiguration | RRCConnectionReconfigurationComplete | 20 | |
| RRC connection re-establishment | RRCConnectionReestablishment | RRCConnectionReestablishmentComplete | 15 | |
| Initial security activation | SecurityModeCommand | SecurityModeCommandComplete/ SecurityModeCommandFailure | 10 | |
| Initial security activation + RRC connection re-configuration (RB establishment) | SecurityModeCommand, RRCConnectionReconfiguration | RRCConnectionReconfigurationComplete | 20 | The two DL messages are transmitted in the same TTI |
| Paging | Paging | | N/A | |

FIG. 26

| | RAN → UE | UE → RAN | N | Notes |
|---|---|---|---|---|
| Inter RAT mobility | | | | |
| Handover to E-UTRA | RRCConnectionReconfiguration (sent by other RAT) | RRCConnectionReconfigurationComplete | N/A | |
| Handover from E-UTRA | MobilityFromEUTRACommand | | N/A | |
| Handover to CDMA2000 | HandoverPreparationRequest (CDMA2000) | | N/A | Handover preparation procedure with CDMA2000 |
| Measurement procedure | | | | |
| Measurement Reporting | | MeasurementReport | N/A | |
| Other procedure | | | | |
| UE capability transfer | UECapabilityEnquiry | UECapabilityInformation | 10 | |
| Counter check | CounterCheck | CounterCheckResponse | 15 | |
| Proximity indication | | ProximityIndication | N/A | |
| UE information | UEInformationRequest | UEInformationResponse | 15 | |
| MBMS counting | MBMSCountingRequest | MBMSCountingResponse | N/A | |
| MBMS interest indication | | MBMSInterestIndication | N/A | |
| In-device coexistence indication | | InDeviceCoexIndication | N/A | |
| UE assistance information | | UEAssistanceInformation | N/A | |
| SCG failure information | | SCGFailureInformation | N/A | |
| Sidelink UE information | | SidelinkUEInformation | N/A | |
| WLAN Connection Status Reporting | | WLANConnectionStatusReport | N/A | |
| Delay Budget Report | | DelayBudgetReport | N/A | |

FIG. 27

Transmit, by a base station distributed unit to a base station central unit, a 1st message comprising first configuration parameters of a wireless device
4210

Receive, by the base station central unit from the base station distributed unit, a 2nd message indicating acknowledgement of the 1st message, the 2nd message comprising 2nd configuration parameters determined based on the 1st configuration parameters
4220

Transmit, by the base station central unit to the wireless device and via the base station distributed unit, a 3rd message comprising the 2nd configuration parameters
4230

Receive, by the base station central unit from the wireless device and via the base station distributed unit, a 4th message confirming one or more elements of the 2nd configuration parameters
4240

Receive, by the base station distributed unit from the wireless device, a 5th message indicating that the wireless device successfully performed a reconfiguration procedure based on the 2nd configuration parameters
4250

FIG. 42

Transmit, by a base station distributed unit to a base station central unit, a 1st message comprising one or more beam configuration parameters of a 1st cell, wherein the one or more beam configuration parameters comprise: a 1st beam index identifying a 1st beam; and 1st beam scheduling information of the 1st beam
4310

Receive, by the base station distributed unit from the base station central unit, a 2nd message indicating acknowledgement of the 1st message
4320

Transmit, by the base station distributed unit to a plurality of wireless devices, a system information block comprising the one or more beam configuration parameters of the 1st cell
4330

Transmit, by the base station distributed unit to the plurality of wireless devices, synchronization signals via the 1st beam
4340

FIG. 43

Receive, by a base station central unit from a network entity, timing advance correlation information comprising: at least one identifier of at least one timing advance correlation group; and a list of cells grouped into one of the at least one timing advance correlation group, the list of cells comprising an uplink timing advance value
4410

Transmit, by the base station central unit to the wireless device via a base station distributed unit, radio resource control configuration information indicating that a 1st cell of the one or more cells belongs to the 1st timing advance group
4420

Configure, by the base station central unit, the one or more cells to belong to a 1st timing advance group for a wireless device in response to the one or more cells being the list of cells
4430

Transmit, by the 1st distributed radio access network entity to a plurality of wireless devices, beam information determined based on the one or more beam configuration parameters
4440

FIG. 44

```
┌─────────────────────────────────────────────────────────┐
│ Transmit, by a base station central unit to a wireless device via a │
│    base station distributed unit, a 1st message comprising          │
│         configuration parameters of the wireless device             │
│                            4510                                     │
└─────────────────────────────────────────────────────────┘
                              │
                              ▼
┌─────────────────────────────────────────────────────────┐
│ Receive, by the base station central unit from the wireless device  │
│ via the base station distributed unit, a 2nd message confirming at  │
│              least one of the configuration parameters              │
│                            4520                                     │
└─────────────────────────────────────────────────────────┘
                              │
                              ▼
┌─────────────────────────────────────────────────────────┐
│   Transmit, by the base station central unit to the base station    │
│ distributed unit, a 3rd message indicating that the wireless device │
│ successfully performed a reconfiguration procedure based on the     │
│                     configuration parameters                        │
│                            4530                                     │
└─────────────────────────────────────────────────────────┘
```

FIG. 45

Determine, by a base station distributed unit, that a 1st uplink timing advance value for a 1st cell of a wireless device is different than a 2nd uplink timing advance value for a 2nd cell of the wireless device, where the 1st cell and the 2nd cell belong to a 1st timing advance group
4610

Transmit, by the base station distributed unit to a base station central unit, a 1st message in response to the determining, where the 1st message comprises information element(s) indicating a reconfiguration of a timing advance group configuration for the wireless device
4620

Receive, by the base station distributed unit from the base station central unit, a radio resource control message based on the reconfiguration for the wireless device
4630

FIG. 46

Receive, by a base station distributed unit from a wireless device, at least one first reference signal via a 1st cell and at least one 2nd reference signal via a 2nd cell, where the 1st cell and the 2nd cell are configured to belong to a 1st timing advance group
4710

Determine, by the base station distributed unit and based on the at least one 1st reference signal and the at least one 2nd reference signal, a 1st uplink time alignment value of the wireless device for the 1st cell is different than a 2nd uplink timing advance value of the wireless device for the 2nd cell
4720

Transmit, by the base station distributed unit to a base station central unit, a 1st message comprising at least one of: the 1st uplink timing advance value is different than the 2nd uplink timing advance value; the 1st uplink timing advance value and the 2nd uplink timing advance value; a difference value indicating an amount of difference between the 1st uplink timing advance value and the 2nd uplink timing advance value; or a timing advance group reconfiguration request for at least one of the 1st cell or the 2nd cell
4730

FIG. 47

Receive, by a base station central unit from a network entity, timing advance correlation information comprising one or more cell identifiers of one or more cells, the one or more cells served by a 1st transmission and reception point
4810

Configure, by the base station central unit, the one or more cells to belong to a 1st timing advance group for a wireless device in response to the one or more cells being served by the 1st transmission and reception point
4820

Transmit, by the base station central unit to the wireless device via a base station distributed unit, radio resource control configuration information indicating that the one or more cells belong to the 1st timing advance group
4830

FIG. 48

Receive, by a base station central unit from a network entity, timing advance correlation information comprising: at least one identifier of at least one timing advance correlation group; and a list of cells grouped into one of the at least one timing advance correlation group, the list of cells comprising an uplink timing advance value
4910

Configure, by the base station central unit, the one or more cells to belong to a 1st timing advance group for a wireless device in response to the one or more cells being the list of cells
4920

Transmit, by the base station central unit to the wireless device via a base station distributed unit, radio resource control configuration information indicating that a 1st cell of the one or more cells belongs to the 1st timing advance group
4930

FIG. 49

TIMING ADVANCE GROUP CONFIGURATION

CROSS-REFERENCE TO RELATED APPLICATIONS

This application claims the benefit of U.S. Provisional Patent Application No. 62/543,836, filed Aug. 10, 2017, U.S. Provisional Patent Application No. 62/543,839, filed Aug. 10, 2017, U.S. Provisional Patent Application No. 62/543,841, filed Aug. 10, 2017, and U.S. Provisional Patent Application No. 62/543,847, filed Aug. 10, 2017, which are hereby incorporated by reference in their entirety.

BRIEF DESCRIPTION OF THE SEVERAL VIEWS OF THE DRAWINGS

Examples of several of the various embodiments of the present invention are described herein with reference to the drawings.

FIG. 5A, FIG. 5B, FIG. 5C and FIG. 5D are example diagrams for uplink and downlink signal transmission as per an aspect of an embodiment of the present invention.

FIG. 8 shows example TAG configurations as per an aspect of an embodiment of the present invention.

FIG. 11A, FIG. 11B, FIG. 11C, FIG. 11D, FIG. 11E, and FIG. 11F are example diagrams for architectures of tight interworking between 5G RAN (e.g. gNB) and LTE RAN (e.g. (e)LTE eNB) as per an aspect of an embodiment of the present invention.

FIG. 26 is an example diagram of an aspect of an embodiment of the present disclosure.

FIG. 27 is an example diagram of an aspect of an embodiment of the present disclosure.

FIG. 42 is a flow diagram of an aspect of an embodiment of the present disclosure.

FIG. 43 is a flow diagram of an aspect of an embodiment of the present disclosure.

FIG. 44 is a flow diagram of an aspect of an embodiment of the present disclosure.

FIG. 45 is a flow diagram of an aspect of an embodiment of the present disclosure.

FIG. 46 is a flow diagram of an aspect of an embodiment of the present disclosure.

FIG. 47 is a flow diagram of an aspect of an embodiment of the present disclosure.

FIG. 48 is a flow diagram of an aspect of an embodiment of the present disclosure.

FIG. 49 is a flow diagram of an aspect of an embodiment of the present disclosure.

DETAILED DESCRIPTION OF EMBODIMENTS

Figure 1:
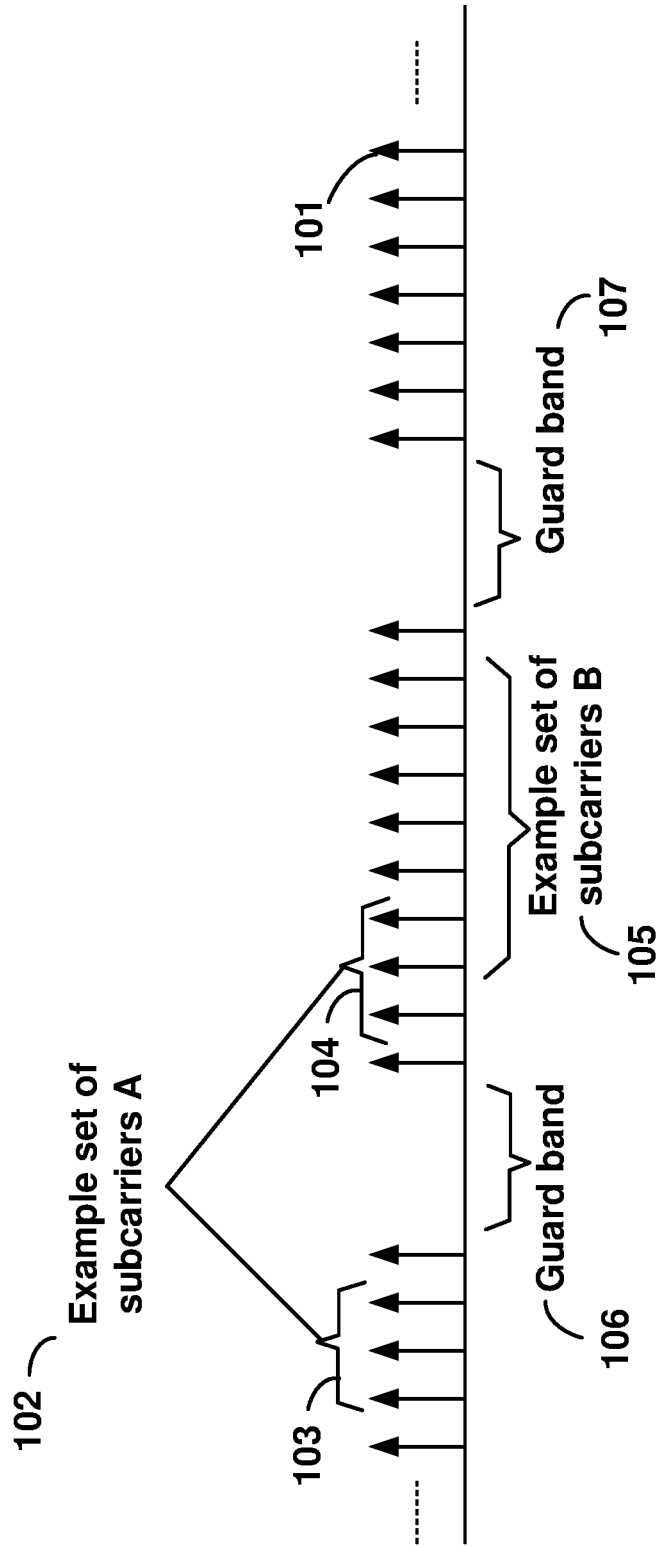
FIG. 1 is a diagram depicting example sets of OFDM subcarriers as per an aspect of an embodiment of the present invention.

Example embodiments of the present invention enable operation of wireless communication systems. Embodiments of the technology disclosed herein may be employed in the technical field of multicarrier communication systems. More particularly, the embodiments of the technology disclosed herein may relate to cellular wireless systems in a multicarrier communication systems.

The following Acronyms are used throughout the present disclosure:

ASIC application-specific integrated circuit
BPSK binary phase shift keying
CA carrier aggregation
CSI channel state information
CDMA code division multiple access
CSS common search space
CPLD complex programmable logic devices
CC component carrier
CP cyclic prefix
DL downlink
DCI downlink control information
DC dual connectivity
eMBB enhanced mobile broadband
EPC evolved packet core
E-UTRAN evolved-universal terrestrial radio access network
FPGA field programmable gate arrays
FDD frequency division multiplexing
HDL hardware description languages
HARQ hybrid automatic repeat request
IE information element
LTE long term evolution
MCG master cell group
MeNB master evolved node B
MIB master information block
MAC media access control
MAC media access control
MME mobility management entity
mMTC massive machine type communications
NAS non-access stratum
NR new radio
OFDM orthogonal frequency division multiplexing
PDCP packet data convergence protocol
PDU packet data unit
PHY physical
PDCCH physical downlink control channel
PHICH physical HARQ indicator channel
PUCCH physical uplink control channel
PUSCH physical uplink shared channel
PCell primary cell
PCell primary cell
PCC primary component carrier
PSCell primary secondary cell
pTAG primary timing advance group
QAM quadrature amplitude modulation
QPSK quadrature phase shift keying
RBG resource block groups
RLC radio link control
RRC radio resource control
RA random access
RB resource blocks
SCC secondary component carrier
SCell secondary cell
Scell secondary cells
SCG secondary cell group
SeNB secondary evolved node B
sTAGs secondary timing advance group
SDU service data unit
S-GW serving gateway
SRB signaling radio bearer
SC-OFDM single carrier-OFDM
SFN system frame number
SIB system information block
TAI tracking area identifier
TAT time alignment timer
TDD time division duplexing
TDMA time division multiple access
TA timing advance
TAG timing advance group
TTI transmission time intervalTB transport block
UL uplink
UE user equipment
URLLC ultra-reliable low-latency communications
VHDL VHSIC hardware description language
CU central unit
DU distributed unit
Fs-C Fs-control plane
Fs-U Fs-user plane
gNB next generation node B
NGC next generation core
NG CP next generation control plane core
NG-C NG-control plane
NG-U NG-user plane
NR new radio
NR MAC new radio MAC
NR PHY new radio physical
NR PDCP new radio PDCP
NR RLC new radio RLC
NR RRC new radio RRC
NSSAI network slice selection assistance information
PLMN public land mobile network
UPGW user plane gateway
Xn-C Xn-control plane
Xn-U Xn-user plane
Xx-C Xx-control plane
Xx-U Xx-user plane Example embodiments of the invention may be implemented using various physical layer modulation and transmission mechanisms. Example transmission mechanisms may include, but are not limited to: CDMA, OFDM, TDMA, Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement QAM using BPSK, QPSK, 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is a diagram depicting example sets of OFDM subcarriers as per an aspect of an embodiment of the present invention. As illustrated in this example, arrow(s) in the diagram may depict a subcarrier in a multicarrier OFDM system. The OFDM system may use technology such as OFDM technology, DFTS-OFDM, SC-OFDM technology, or the like. For example, arrow 101 shows a subcarrier transmitting information symbols. FIG. 1 is for illustration purposes, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As illustrated in FIG. 1, guard band 106 is between subcarriers 103 and subcarriers 104. The example set of subcarriers A 102 includes subcarriers 103 and subcarriers 104. FIG. 1 also illustrates an example set of subcarriers B 105. As illustrated, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
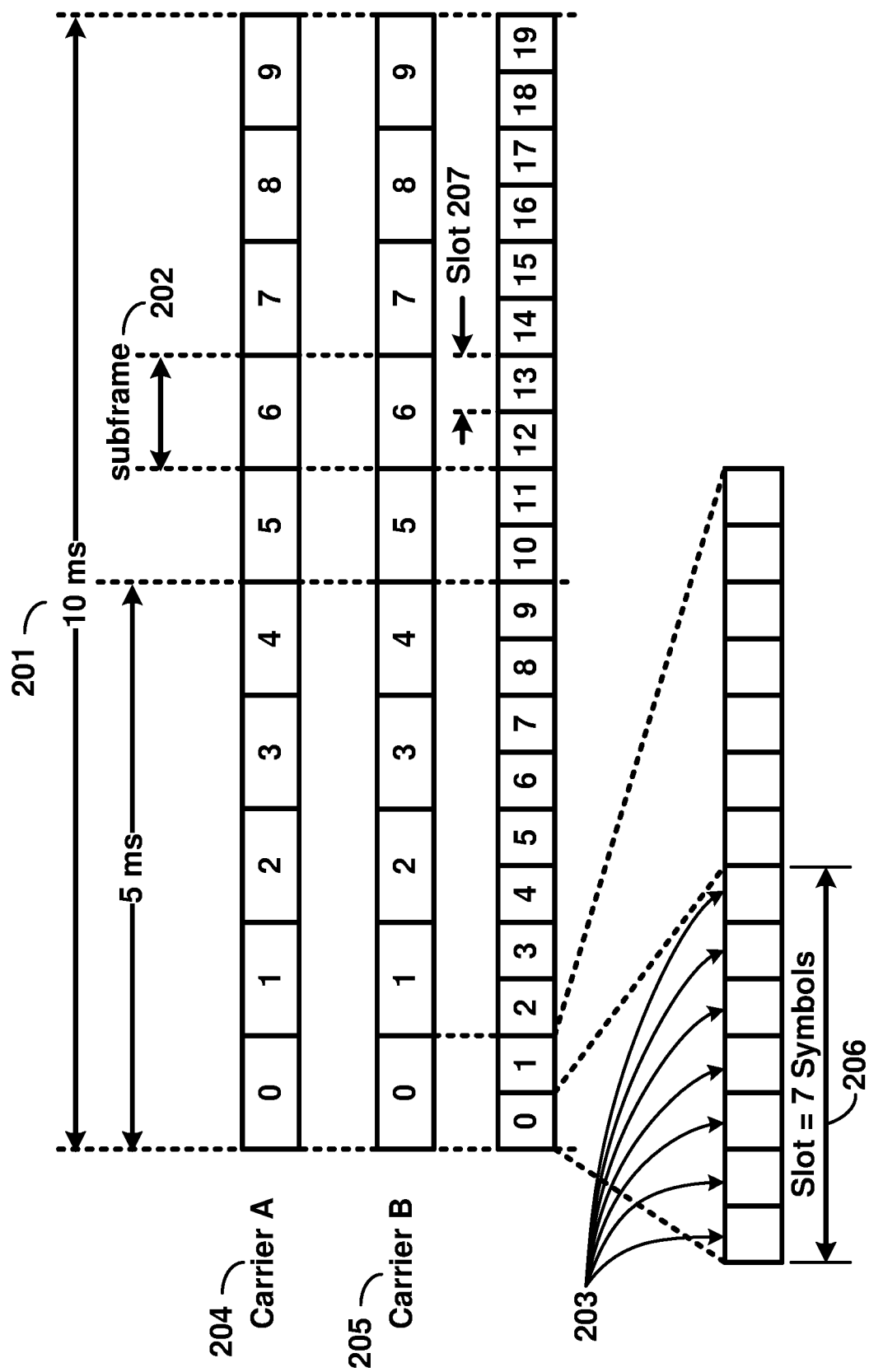
FIG. 2 is a diagram depicting an example transmission time and reception time for two carriers in a carrier group as per an aspect of an embodiment of the present invention.

FIG. 2 is a diagram depicting an example transmission time and reception time for two carriers as per an aspect of an embodiment of the present invention. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD and TDD duplex mechanisms. FIG. 2 shows an example FDD frame timing. Downlink and uplink transmissions may be organized into radio frames 201. In this example, radio frame duration is 10 msec. Other frame durations, for example, in the range of 1 to 100 msec may also be supported. In this example, each 10 ms radio frame 201 may be divided into ten equally sized subframes 202. Other subframe durations such as including 0.5 msec, 1 msec, 2 msec, and 5 msec may also be supported. Subframe(s) may consist of two or more slots (e.g. slots 206 and 207). For the example of FDD, 10 subframes may be available for downlink transmission and 10 subframes may be available for uplink transmissions in each 10 ms interval. Uplink and downlink transmissions may be separated in the frequency domain. A slot may be 7 or 14 OFDM symbols for the same subcarrier spacing of up to 60 kHz with normal CP. A slot may be 14 OFDM symbols for the same subcarrier spacing higher than 60 kHz with normal CP. A slot may contain all downlink, all uplink, or a downlink part and an uplink part and/or alike. Slot aggregation may be supported, e.g., data transmission may be scheduled to span one or multiple slots. In an example, a mini-slot may start at an OFDM symbol in a subframe. A mini-slot may have a duration of one or more OFDM symbols. Slot(s) may include a plurality of OFDM symbols 203. The number of OFDM symbols 203 in a slot 206 may depend on the cyclic prefix length and subcarrier spacing.

Figure 3:
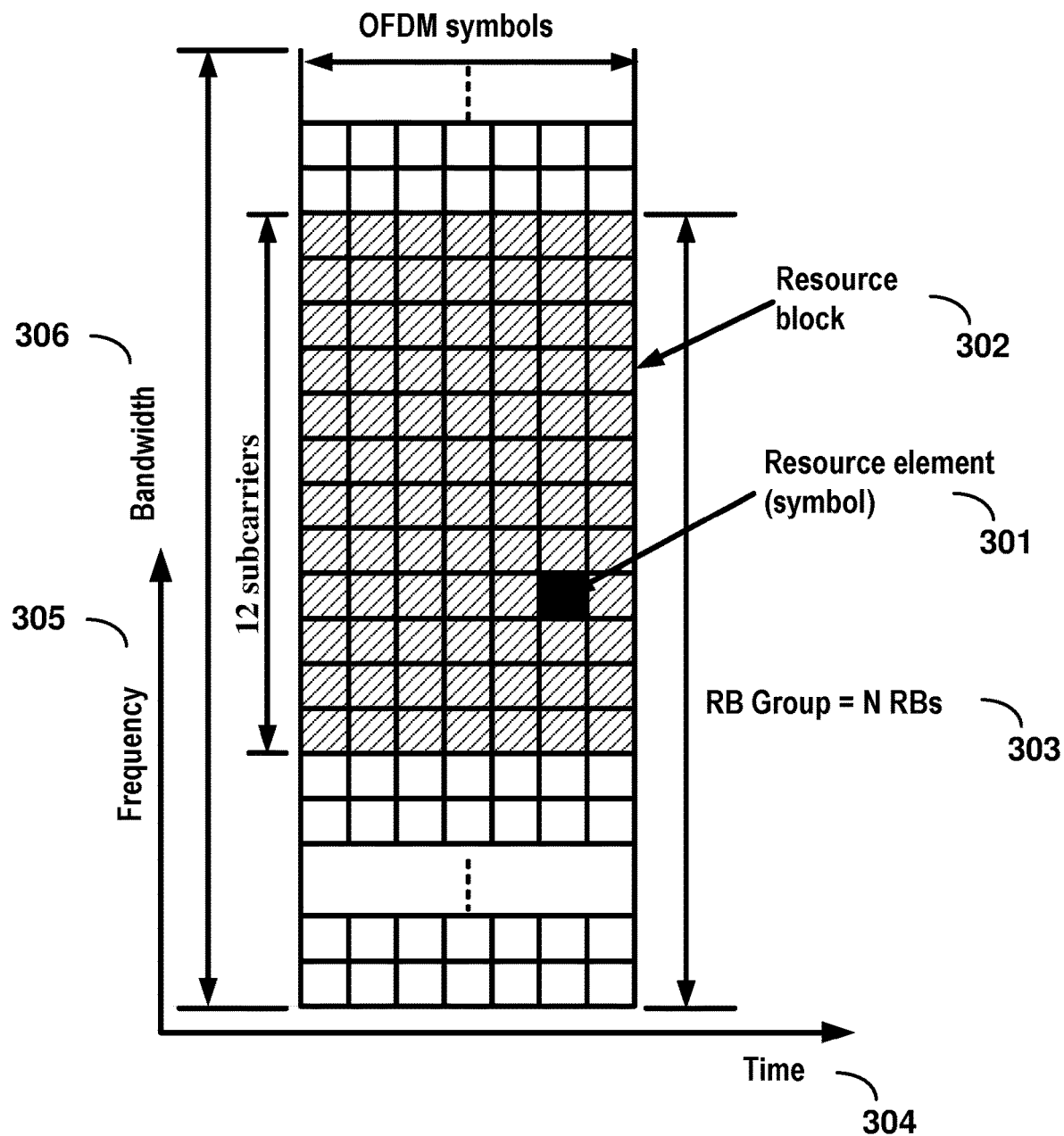
FIG. 3 is a diagram depicting OFDM radio resources as per an aspect of an embodiment of the present invention.

FIG. 3 is a diagram depicting OFDM radio resources as per an aspect of an embodiment of the present invention. The resource grid structure in time 304 and frequency 305 is illustrated in FIG. 3. The quantity of downlink subcarriers or RBs may depend, at least in part, on the downlink transmission bandwidth 306 configured in the cell. The smallest radio resource unit may be called a resource element (e.g. 301). Resource elements may be grouped into resource blocks (e.g. 302). Resource blocks may be grouped into larger radio resources called Resource Block Groups (RBG) (e.g. 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec. In an illustrative example, a resource block may correspond to one slot in the time domain and 180 kHz in the frequency domain (for 15 KHz subcarrier bandwidth and 12 subcarriers).

In an example embodiment, multiple numerologies may be supported. In an example, a numerology may be derived by scaling a basic subcarrier spacing by an integer N. In an example, scalable numerology may allow at least from 15 kHz to 480 kHz subcarrier spacing. The numerology with 15 kHz and scaled numerology with different subcarrier spacing with the same CP overhead may align at a symbol boundary every 1 ms in a NR carrier.

FIG. 5A, FIG. 5B, FIG. 5C and FIG. 5D are example diagrams for uplink and downlink signal transmission as per an aspect of an embodiment of the present invention. FIG. 5A shows an example uplink physical channel. The baseband signal representing the physical uplink shared channel may perform the following processes. These functions are illustrated as examples and it is anticipated that other mechanisms may be implemented in various embodiments. The functions may comprise scrambling, modulation of scrambled bits to generate complex-valued symbols, mapping of the complex-valued modulation symbols onto one or several transmission layers, transform precoding to generate complex-valued symbols, precoding of the complex-valued symbols, mapping of precoded complex-valued symbols to resource elements, generation of complex-valued time-domain DFTS-OFDM/SC-FDMA signal for each antenna port, and/or the like.

Example modulation and up-conversion to the carrier frequency of the complex-valued DFTS-OFDM/SC-FDMA baseband signal for each antenna port and/or the complex-valued PRACH baseband signal is shown in FIG. 5B. Filtering may be employed prior to transmission.

An example structure for Downlink Transmissions is shown in FIG. 5C. The baseband signal representing a downlink physical channel may perform the following processes. These functions are illustrated as examples and it is anticipated that other mechanisms may be implemented in various embodiments. The functions include scrambling of coded bits in each of the codewords to be transmitted on a physical channel; modulation of scrambled bits to generate complex-valued modulation symbols; mapping of the complex-valued modulation symbols onto one or several transmission layers; precoding of the complex-valued modulation symbols on each layer for transmission on the antenna ports; mapping of complex-valued modulation symbols for each antenna port to resource elements; generation of complex-valued time-domain OFDM signal for each antenna port, and/or the like.

Example modulation and up-conversion to the carrier frequency of the complex-valued OFDM baseband signal for each antenna port is shown in FIG. 5D. Filtering may be employed prior to transmission.

Figure 4:
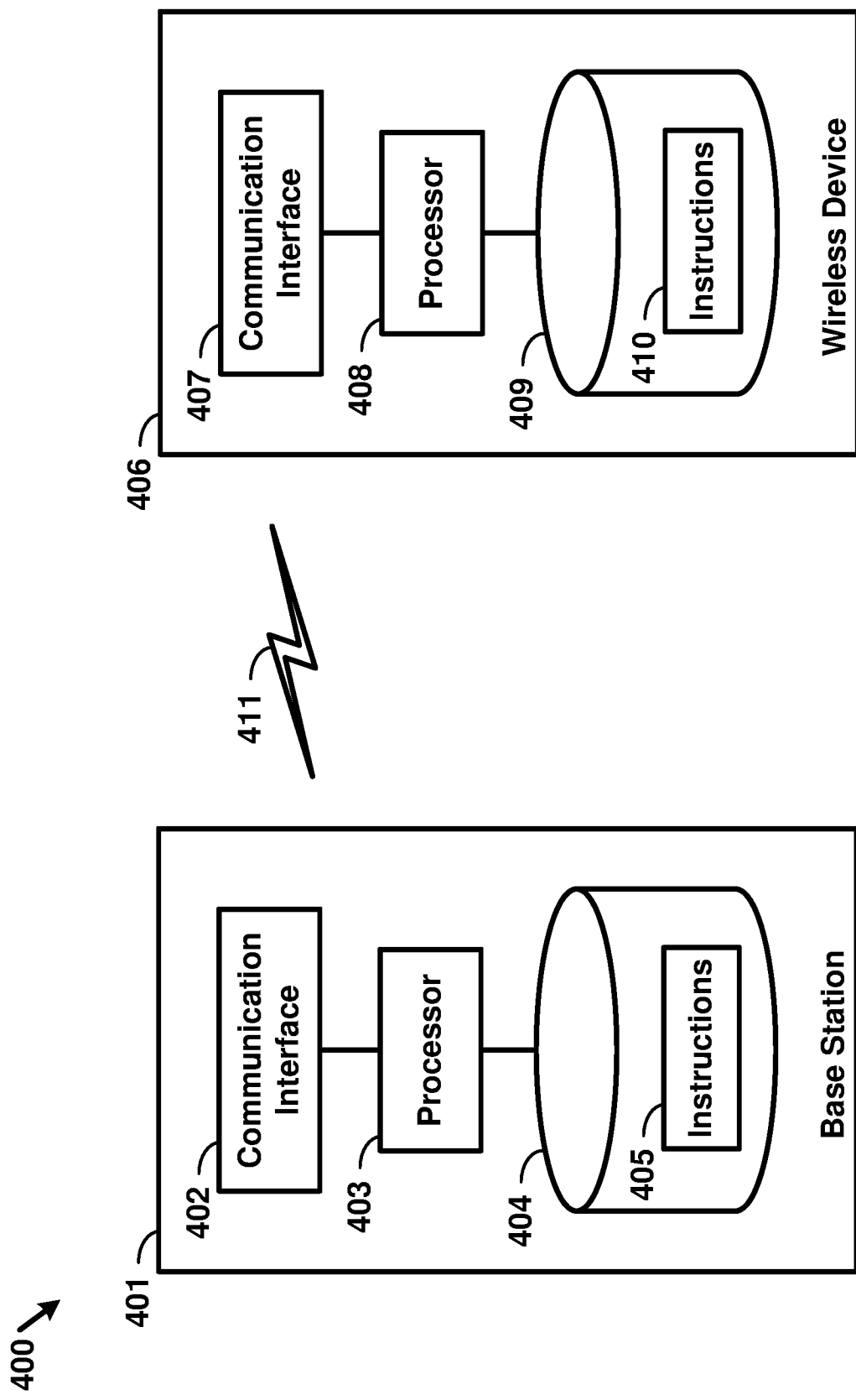
FIG. 4 is a block diagram of a base station and a wireless device as per an aspect of an embodiment of the present invention.

FIG. 4 is an example block diagram of a base station 401 and a wireless device 406, as per an aspect of an embodiment of the present invention. A communication network 400 may include at least one base station 401 and at least one wireless device 406. The base station 401 may include at least one communication interface 402, at least one processor 403, and at least one set of program code instructions 405 stored in non-transitory memory 404 and executable by the at least one processor 403. The wireless device 406 may include at least one communication interface 407, at least one processor 408, and at least one set of program code instructions 410 stored in non-transitory memory 409 and executable by the at least one processor 408. Communication interface 402 in base station 401 may be configured to engage in communication with communication interface 407 in wireless device 406 via a communication path that includes at least one wireless link 411. Wireless link 411 may be a bi-directional link. Communication interface 407 in wireless device 406 may also be configured to engage in a communication with communication interface 402 in base station 401. Base station 401 and wireless device 406 may be configured to send and receive data over wireless link 411 using multiple frequency carriers. According to some of the various aspects of embodiments, transceiver(s) may be employed. A transceiver is a device that includes both a transmitter and receiver. Transceivers may be employed in devices such as wireless devices, base stations, relay nodes, and/or the like. Example embodiments for radio technology implemented in communication interface 402, 407 and wireless link 411 are illustrated are FIG. 1, FIG. 2, FIG. 3, FIG. 5, and associated text.

An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics in the device, whether the device is in an operational or non-operational state.

Figure 10A:
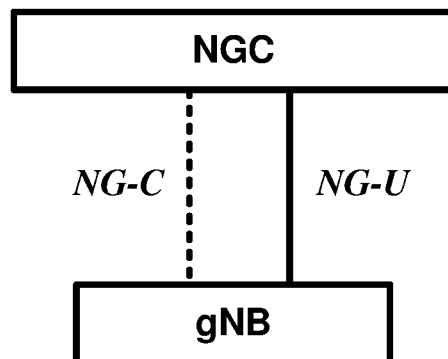
FIG. 10A and FIG. 10B are example diagrams for interfaces between a 5G core network (e.g. NGC) and base stations (e.g. gNB and eLTE eNB) as per an aspect of an embodiment of the present invention.
Figure 10B:
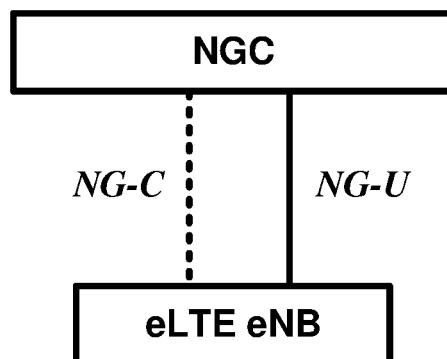

According to some of the various aspects of embodiments, a 5G network may include a multitude of base stations, providing a user plane NR PDCP/NR RLC/NR MAC/NR PHY and control plane (NR RRC) protocol terminations towards the wireless device. The base station(s) may be interconnected with other base station(s) (e.g. employing an Xn interface). The base stations may also be connected employing, for example, an NG interface to an NGC. FIG. 10A and FIG. 10B are example diagrams for interfaces between a 5G core network (e.g. NGC) and base stations (e.g. gNB and eLTE eNB) as per an aspect of an embodiment of the present invention. For example, the base stations may be interconnected to the NGC control plane (e.g. NG CP) employing the NG-C interface and to the NGC user plane (e.g. UPGW) employing the NG-U interface. The NG interface may support a many-to-many relation between 5G core networks and base stations.

A base station may include many sectors for example: 1, 2, 3, 4, or 6 sectors. A base station may include many cells, for example, ranging from 1 to 50 cells or more. A cell may be categorized, for example, as a primary cell or secondary cell. At RRC connection establishment/re-establishment/handover, one serving cell may provide the NAS (non-access stratum) mobility information (e.g. TAI), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC), while in the uplink, it may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC), while in the uplink, it may be an Uplink Secondary Component Carrier (UL SCC). An SCell may or may not have an uplink carrier.

A cell, comprising a downlink carrier and optionally an uplink carrier, may be assigned a physical cell ID and a cell index. A carrier (downlink or uplink) may belong to only one cell. The cell ID or Cell index may also identify the downlink carrier or uplink carrier of the cell (depending on the context it is used). In the specification, cell ID may be equally referred to a carrier ID, and cell index may be referred to carrier index. In implementation, the physical cell ID or cell index may be assigned to a cell. A cell ID may be determined using a synchronization signal transmitted on a downlink carrier. A cell index may be determined using RRC messages. For example, when the specification refers to a first physical cell ID for a first downlink carrier, the specification may mean the first physical cell ID is for a cell comprising the first downlink carrier. The same concept may apply to, for example, carrier activation. When the specification indicates that a first carrier is activated, the specification may equally mean that the cell comprising the first carrier is activated.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices may support multiple technologies, and/or multiple releases of the same technology. Wireless devices may have some specific capability(ies) depending on its wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of wireless devices in a coverage area that may not comply with the disclosed methods, for example, because those wireless devices perform based on older releases of LTE or 5G technology.

Figure 6:
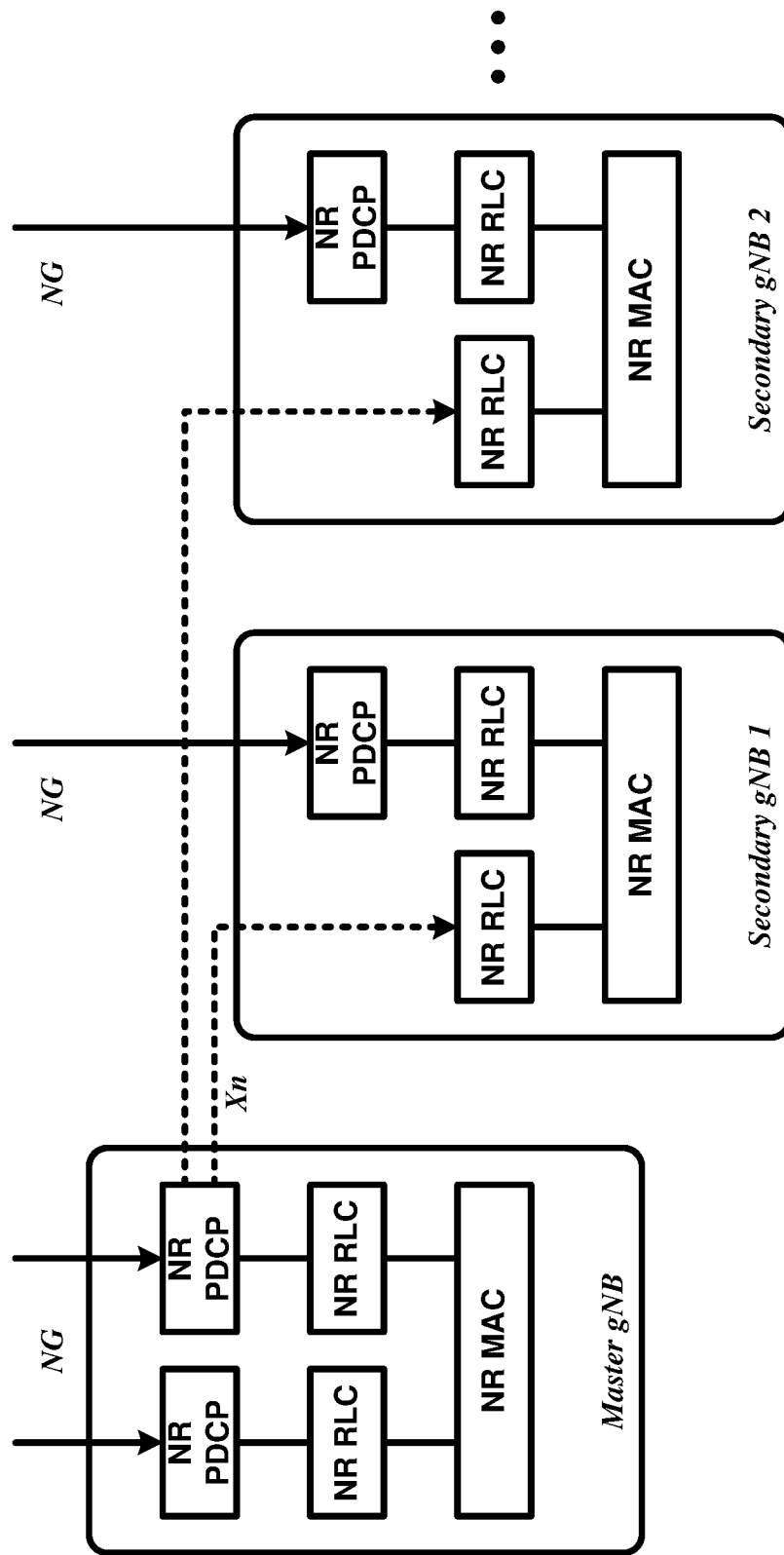
FIG. 6 is an example diagram for a protocol structure with multi-connectivity as per an aspect of an embodiment of the present invention.
Figure 7:
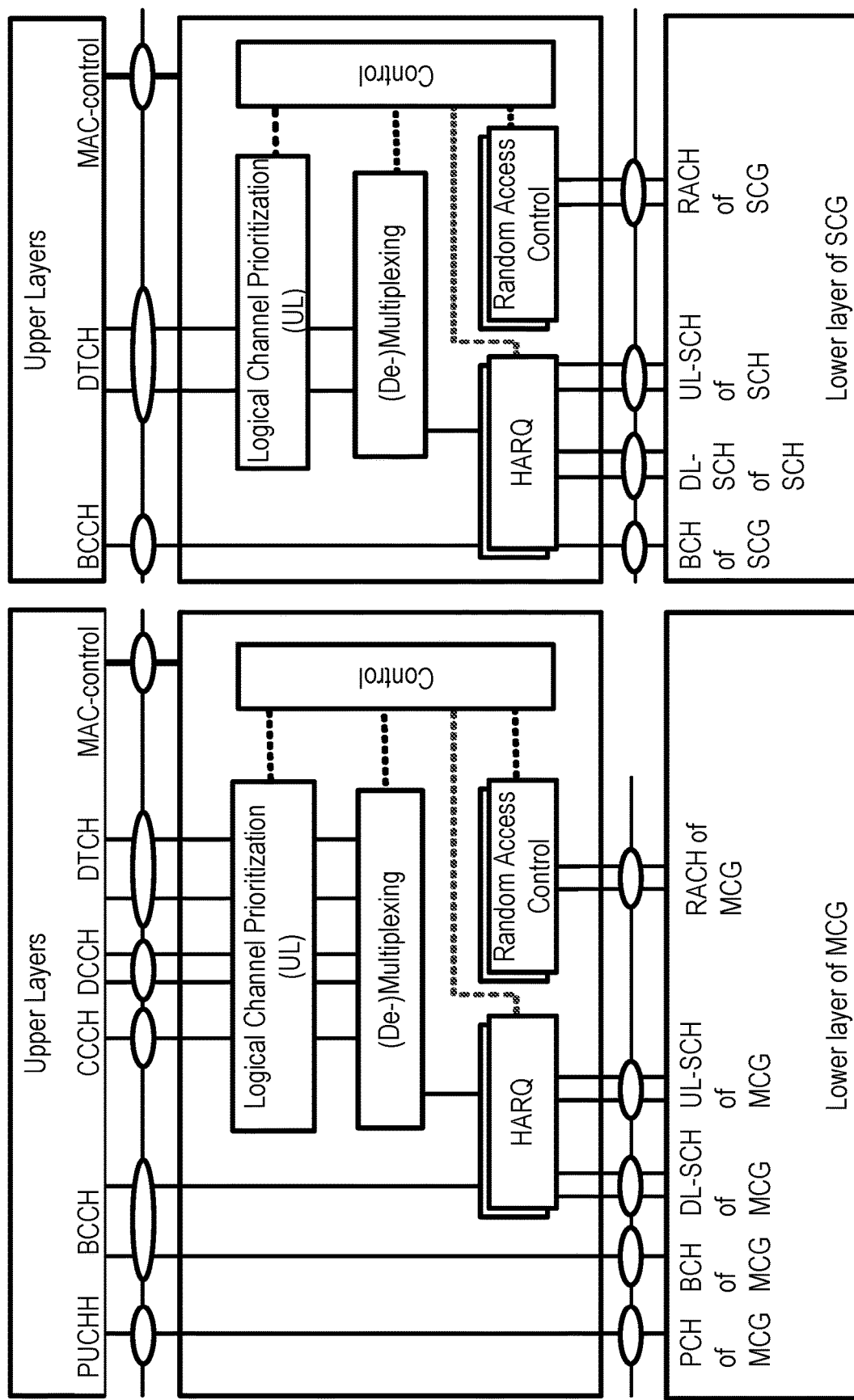
FIG. 7 is an example diagram for a protocol structure with CA and DC as per an aspect of an embodiment of the present invention.

FIG. 6 and FIG. 7 are example diagrams for protocol structure with CA and multi-connectivity as per an aspect of an embodiment of the present invention. NR may support multi-connectivity operation whereby a multiple RX/TX UE in RRC_CONNECTED may be configured to utilize radio resources provided by multiple schedulers located in multiple gNBs connected via a non-ideal or ideal backhaul over the Xn interface. gNBs involved in multi-connectivity for a certain UE may assume two different roles: a gNB may either act as a master gNB or as a secondary gNB. In multi-connectivity, a UE may be connected to one master gNB and one or more secondary gNBs. FIG. 7 illustrates one example structure for the UE side MAC entities when a Master Cell Group (MCG) and a Secondary Cell Group (SCG) are configured, and it may not restrict implementation. Media Broadcast Multicast Service (MBMS) reception is not shown in this figure for simplicity.

In multi-connectivity, the radio protocol architecture that a particular bearer uses may depend on how the bearer is setup. Three alternatives may exist, an MCG bearer, an SCG bearer and a split bearer as shown in FIG. 6. NR RRC may be located in master gNB and SRBs may be configured as a MCG bearer type and may use the radio resources of the master gNB. Multi-connectivity may also be described as having at least one bearer configured to use radio resources provided by the secondary gNB. Multi-connectivity may or may not be configured/implemented in example embodiments of the invention.

In the case of multi-connectivity, the UE may be configured with multiple NR MAC entities: one NR MAC entity for master gNB, and other NR MAC entities for secondary gNBs. In multi-connectivity, the configured set of serving cells for a UE may comprise of two subsets: the Master Cell Group (MCG) containing the serving cells of the master gNB, and the Secondary Cell Groups (SCGs) containing the serving cells of the secondary gNBs. For a SCG, one or more of the following may be applied: at least one cell in the SCG has a configured UL CC and one of them, named PSCell (or PCell of SCG, or sometimes called PCell), is configured with PUCCH resources; when the SCG is configured, there may be at least one SCG bearer or one Split bearer; upon detection of a physical layer problem or a random access problem on a PSCell, or the maximum number of NR RLC retransmissions has been reached associated with the SCG, or upon detection of an access problem on a PSCell during a SCG addition or a SCG change: a RRC connection re-establishment procedure may not be triggered, UL transmissions towards cells of the SCG are stopped, a master gNB may be informed by the UE of a SCG failure type, for split bearer, the DL data transfer over the master gNB is maintained; the NR RLC AM bearer may be configured for the split bearer; like PCell, PSCell may not be de-activated; PSCell may be changed with a SCG change (e.g. with security key change and a RACH procedure); and/or a direct bearer type change between a Split bearer and a SCG bearer or simultaneous configuration of a SCG and a Split bearer may or may not supported.

With respect to the interaction between a master gNB and secondary gNBs for multi-connectivity, one or more of the following principles may be applied: the master gNB may maintain the RRM measurement configuration of the UE and may, (e.g. based on received measurement reports or traffic conditions or bearer types), decide to ask a secondary gNB to provide additional resources (serving cells) for a UE; upon receiving a request from the master gNB, a secondary gNB may create a container that may result in the configuration of additional serving cells for the UE (or decide that it has no resource available to do so); for UE capability coordination, the master gNB may provide (part of) the AS configuration and the UE capabilities to the secondary gNB; the master gNB and the secondary gNB may exchange information about a UE configuration by employing of NR RRC containers (inter-node messages) carried in Xn messages; the secondary gNB may initiate a reconfiguration of its existing serving cells (e.g., PUCCH towards the secondary gNB); the secondary gNB may decide which cell is the PSCell within the SCG; the master gNB may or may not change the content of the NR RRC configuration provided by the secondary gNB; in the case of a SCG addition and a SCG SCell addition, the master gNB may provide the latest measurement results for the SCG cell(s); both a master gNB and secondary gNBs may know the SFN and subframe offset of each other by OAM, (e.g., for the purpose of DRX alignment and identification of a measurement gap). In an example, when adding a new SCG SCell, dedicated NR RRC signaling may be used for sending required system information of the cell as for CA, except for the SFN acquired from a MIB of the PSCell of a SCG.

In an example, serving cells may be grouped in a TA group (TAG). Serving cells in one TAG may use the same timing reference. For a given TAG, user equipment (UE) may use at least one downlink carrier as a timing reference. For a given TAG, a UE may synchronize uplink subframe and frame transmission timing of uplink carriers belonging to the same TAG. In an example, serving cells having an uplink to which the same TA applies may correspond to serving cells hosted by the same receiver. A UE supporting multiple TAs may support two or more TA groups. One TA group may contain the PCell and may be called a primary TAG (pTAG). In a multiple TAG configuration, at least one TA group may not contain the PCell and may be called a secondary TAG (sTAG). In an example, carriers within the same TA group may use the same TA value and/or the same timing reference. When DC is configured, cells belonging to a cell group (MCG or SCG) may be grouped into multiple TAGs including a pTAG and one or more sTAGs.

FIG. 8 shows example TAG configurations as per an aspect of an embodiment of the present invention. In Example 1, pTAG comprises PCell, and an sTAG comprises SCell1. In Example 2, a pTAG comprises a PCell and SCell1, and an sTAG comprises SCell2 and SCell3. In Example 3, pTAG comprises PCell and SCell1, and an sTAG1 includes SCell2 and SCell3, and sTAG2 comprises SCell4. Up to four TAGs may be supported in a cell group (MCG or SCG) and other example TAG configurations may also be provided. In various examples in this disclosure, example mechanisms are described for a pTAG and an sTAG. Some of the example mechanisms may be applied to configurations with multiple sTAGs.

In an example, an eNB may initiate an RA procedure via a PDCCH order for an activated SCell. This PDCCH order may be sent on a scheduling cell of this SCell. When cross carrier scheduling is configured for a cell, the scheduling cell may be different than the cell that is employed for preamble transmission, and the PDCCH order may include an SCell index. At least a non-contention based RA procedure may be supported for SCell(s) assigned to sTAG(s).

Figure 9:
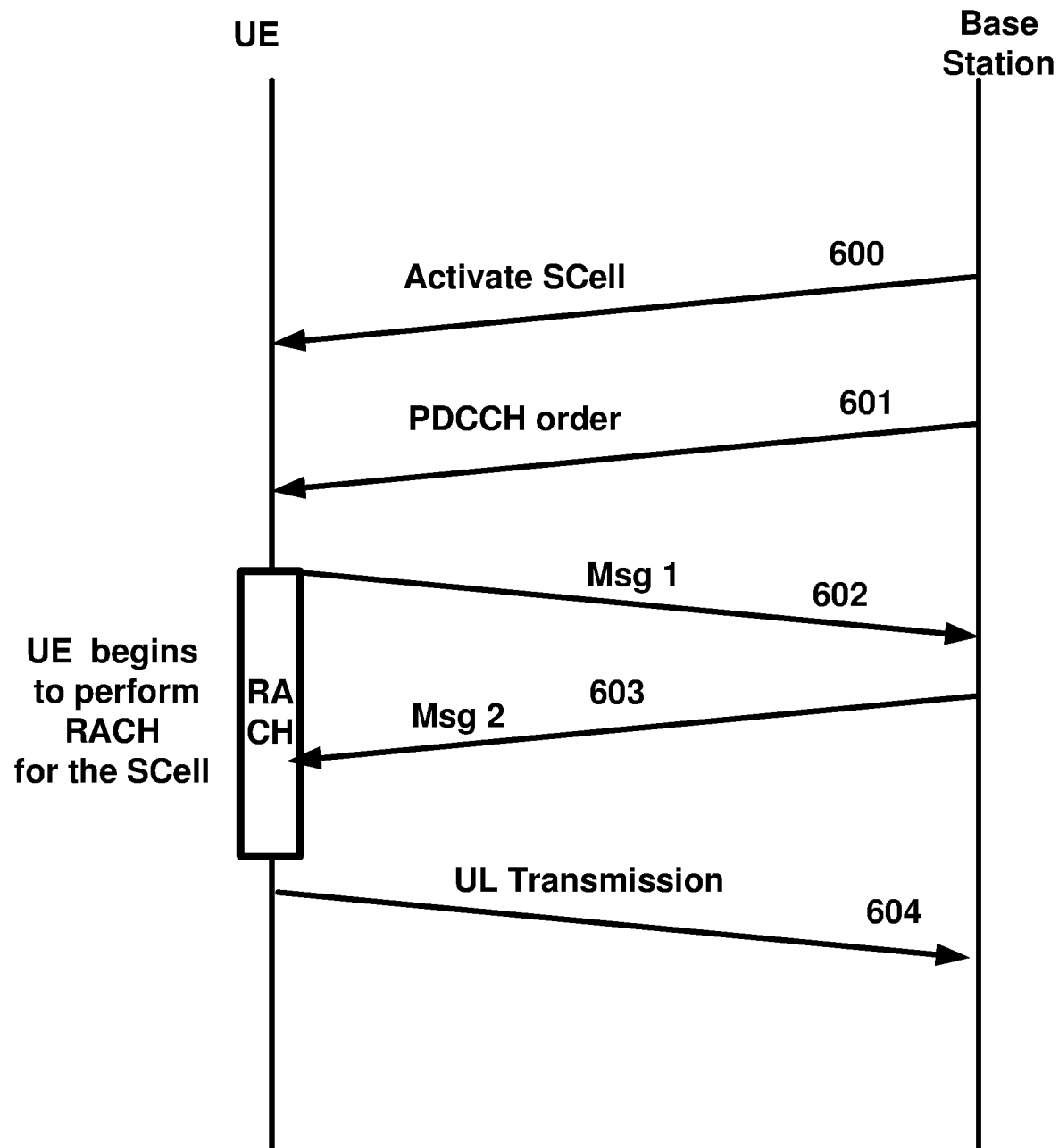
FIG. 9 is an example message flow in a random access process in a secondary TAG as per an aspect of an embodiment of the present invention.

FIG. 9 is an example message flow in a random access process in a secondary TAG as per an aspect of an embodiment of the present invention. An eNB transmits an activation command 600 to activate an SCell. A preamble 602

(Msg1) may be sent by a UE in response to a PDCCH order 601 on an SCell belonging to an sTAG. In an example embodiment, preamble transmission for SCells may be controlled by the network using PDCCH format 1A. Msg2 message 603 (RAR: random access response) in response to the preamble transmission on the SCell may be addressed to RA-RNTI in a PCell common search space (CSS). Uplink packets 604 may be transmitted on the SCell in which the preamble was transmitted.

According to some of the various aspects of embodiments, initial timing alignment may be achieved through a random access procedure. This may involve a UE transmitting a random access preamble and an eNB responding with an initial TA command NTA (amount of timing advance) within a random access response window. The start of the random access preamble may be aligned with the start of a corresponding uplink subframe at the UE assuming NTA=0. The eNB may estimate the uplink timing from the random access preamble transmitted by the UE. The TA command may be derived by the eNB based on the estimation of the difference between the desired UL timing and the actual UL timing. The UE may determine the initial uplink transmission timing relative to the corresponding downlink of the sTAG on which the preamble is transmitted.

The mapping of a serving cell to a TAG may be configured by a serving eNB with RRC signaling. The mechanism for TAG configuration and reconfiguration may be based on RRC signaling. According to some of the various aspects of embodiments, when an eNB performs an SCell addition configuration, the related TAG configuration may be configured for the SCell. In an example embodiment, an eNB may modify the TAG configuration of an SCell by removing (releasing) the SCell and adding (configuring) a new SCell (with the same physical cell ID and frequency) with an updated TAG ID. The new SCell with the updated TAG ID may initially be inactive subsequent to being assigned the updated TAG ID. The eNB may activate the updated new SCell and start scheduling packets on the activated SCell. In an example implementation, it may not be possible to change the TAG associated with an SCell, but rather, the SCell may need to be removed and a new SCell may need to be added with another TAG. For example, if there is a need to move an SCell from an sTAG to a pTAG, at least one RRC message, for example, at least one RRC reconfiguration message, may be send to the UE to reconfigure TAG configurations by releasing the SCell and then configuring the SCell as a part of the pTAG (when an SCell is added/configured without a TAG index, the SCell may be explicitly assigned to the pTAG). The PCell may not change its TA group and may be a member of the pTAG.

The purpose of an RRC connection reconfiguration procedure may be to modify an RRC connection, (e.g. to establish, modify and/or release RBs, to perform handover, to setup, modify, and/or release measurements, to add, modify, and/or release SCells). If the received RRC Connection Reconfiguration message includes the sCellToReleaseList, the UE may perform an SCell release. If the received RRC Connection Reconfiguration message includes the sCellToAddModList, the UE may perform SCell additions or modification.

In LTE Release-10 and Release-11 CA, a PUCCH is only transmitted on the PCell (PSCell) to an eNB. In LTE-Release 12 and earlier, a UE may transmit PUCCH information on one cell (PCell or PSCell) to a given eNB.

As the number of CA capable UEs and also the number of aggregated carriers increase, the number of PUCCHs and also the PUCCH payload size may increase. Accommodating the PUCCH transmissions on the PCell may lead to a high PUCCH load on the PCell. A PUCCH on an SCell may be introduced to offload the PUCCH resource from the PCell. More than one PUCCH may be configured for example, a PUCCH on a PCell and another PUCCH on an SCell. In the example embodiments, one, two or more cells may be configured with PUCCH resources for transmitting CSI/ACK/NACK to a base station. Cells may be grouped into multiple PUCCH groups, and one or more cell within a group may be configured with a PUCCH. In an example configuration, one SCell may belong to one PUCCH group. SCells with a configured PUCCH transmitted to a base station may be called a PUCCH SCell, and a cell group with a common PUCCH resource transmitted to the same base station may be called a PUCCH group.

In an example embodiment, a MAC entity may have a configurable timer timeAlignmentTimer per TAG. The timeAlignmentTimer may be used to control how long the MAC entity considers the Serving Cells belonging to the associated TAG to be uplink time aligned. The MAC entity may, when a Timing Advance Command MAC control element is received, apply the Timing Advance Command for the indicated TAG; start or restart the timeAlignmentTimer associated with the indicated TAG. The MAC entity may, when a Timing Advance Command is received in a Random Access Response message for a serving cell belonging to a TAG and/or if the Random Access Preamble was not selected by the MAC entity, apply the Timing Advance Command for this TAG and start or restart the timeAlignmentTimer associated with this TAG. Otherwise, if the timeAlignmentTimer associated with this TAG is not running, the Timing Advance Command for this TAG may be applied and the timeAlignmentTimer associated with this TAG started. When the contention resolution is considered not successful, a timeAlignmentTimer associated with this TAG may be stopped. Otherwise, the MAC entity may ignore the received Timing Advance Command.

In example embodiments, a timer is running once it is started, until it is stopped or until it expires; otherwise it may not be running. A timer can be started if it is not running or restarted if it is running. For example, a timer may be started or restarted from its initial value.

Example embodiments of the invention may enable operation of multi-carrier communications. Other example embodiments may comprise a non-transitory tangible computer readable media comprising instructions executable by one or more processors to cause operation of multi-carrier communications. Yet other example embodiments may comprise an article of manufacture that comprises a non-transitory tangible computer readable machine-accessible medium having instructions encoded thereon for enabling programmable hardware to cause a device (e.g. wireless communicator, UE, base station, etc.) to enable operation of multi-carrier communications. The device may include processors, memory, interfaces, and/or the like. Other example embodiments may comprise communication networks comprising devices such as base stations, wireless devices (or user equipment: UE), servers, switches, antennas, and/or the like.

FIG. 11A, FIG. 11B, FIG. 11C, FIG. 11D, FIG. 11E, and FIG. 11F are example diagrams for architectures of tight interworking between 5G RAN and LTE RAN as per an aspect of an embodiment of the present invention. The tight interworking may enable a multiple RX/TX UE in RRC_CONNECTED to be configured to utilize radio resources provided by two schedulers located in two base stations (e.g. (e)LTE eNB and gNB) connected via a non-ideal or ideal backhaul over the Xx interface between LTE eNB and gNB or the Xn interface between eLTE eNB and gNB. Base stations involved in tight interworking for a certain UE may assume two different roles: a base station may either act as a master base station or as a secondary base station. In tight interworking, a UE may be connected to one master base station and one secondary base station. Mechanisms implemented in tight interworking may be extended to cover more than two base stations.

In FIG. 11A and FIG. 11B, a master base station may be an LTE eNB, which may be connected to EPC nodes (e.g. to an MME via the S1-C interface and to an S-GW via the S1-U interface), and a secondary base station may be a gNB, which may be a non-standalone node having a control plane connection via an Xx-C interface to an LTE eNB. In the tight interworking architecture of FIG. 11A, a user plane for a gNB may be connected to an S-GW through an LTE eNB via an Xx-U interface between LTE eNB and gNB and an S1-U interface between LTE eNB and S-GW. In the architecture of FIG. 11B, a user plane for a gNB may be connected directly to an S-GW via an S1-U interface between gNB and S-GW.

In FIG. 11C and FIG. 11D, a master base station may be a gNB, which may be connected to NGC nodes (e.g. to a control plane core node via the NG-C interface and to a user plane core node via the NG-U interface), and a secondary base station may be an eLTE eNB, which may be a non-standalone node having a control plane connection via an Xn-C interface to a gNB. In the tight interworking architecture of FIG. 11C, a user plane for an eLTE eNB may be connected to a user plane core node through a gNB via an Xn-U interface between eLTE eNB and gNB and an NG-U interface between gNB and user plane core node. In the architecture of FIG. 11D, a user plane for an eLTE eNB may be connected directly to a user plane core node via an NG-U interface between eLTE eNB and user plane core node.

In FIG. 11E and FIG. 11F, a master base station may be an eLTE eNB, which may be connected to NGC nodes (e.g. to a control plane core node via the NG-C interface and to a user plane core node via the NG-U interface), and a secondary base station may be a gNB, which may be a non-standalone node having a control plane connection via an Xn-C interface to an eLTE eNB. In the tight interworking architecture of FIG. 11E, a user plane for a gNB may be connected to a user plane core node through an eLTE eNB via an Xn-U interface between eLTE eNB and gNB and an NG-U interface between eLTE eNB and user plane core node. In the architecture of FIG. 11F, a user plane for a gNB may be connected directly to a user plane core node via an NG-U interface between gNB and user plane core node.

Figure 12A:
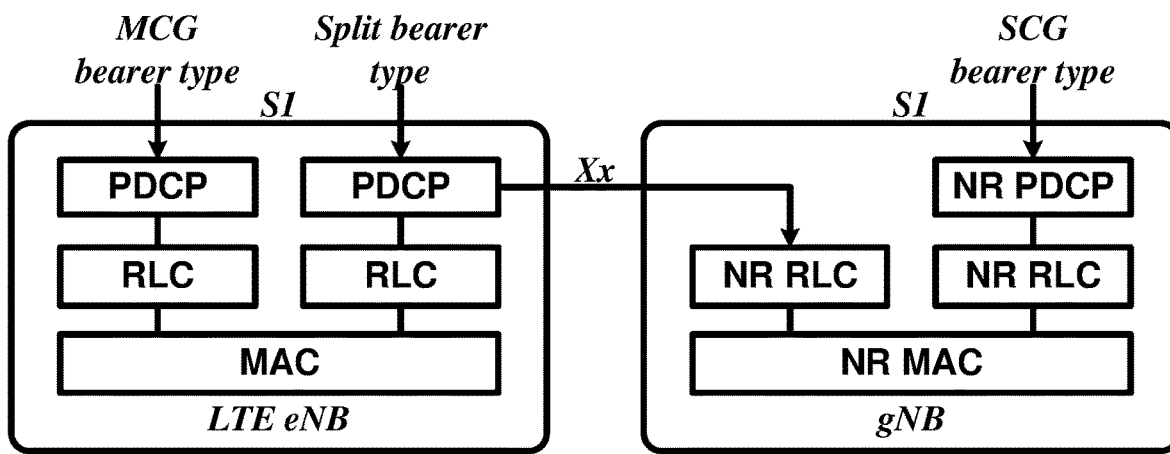
FIG. 12A, FIG. 12B, and FIG. 12C are example diagrams for radio protocol structures of tight interworking bearers as per an aspect of an embodiment of the present invention.
Figure 12B:
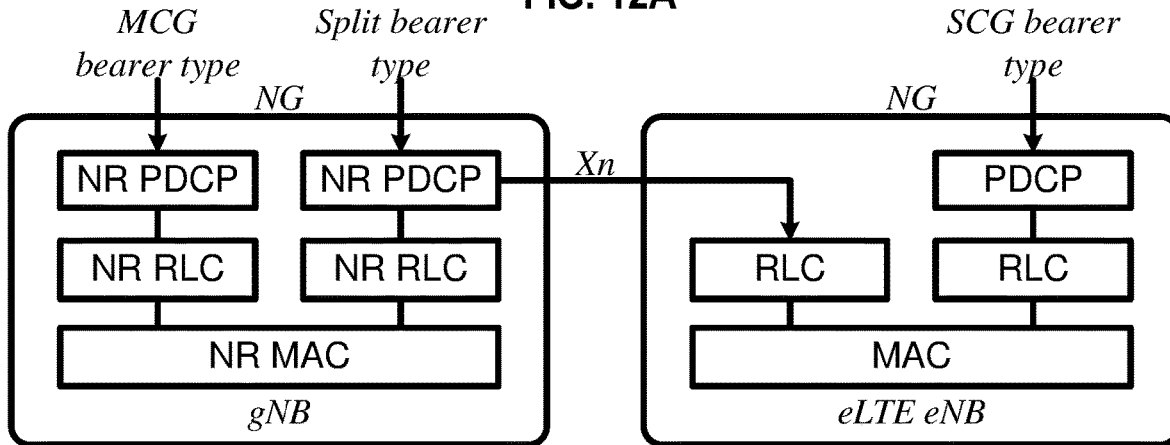
Figure 12C:
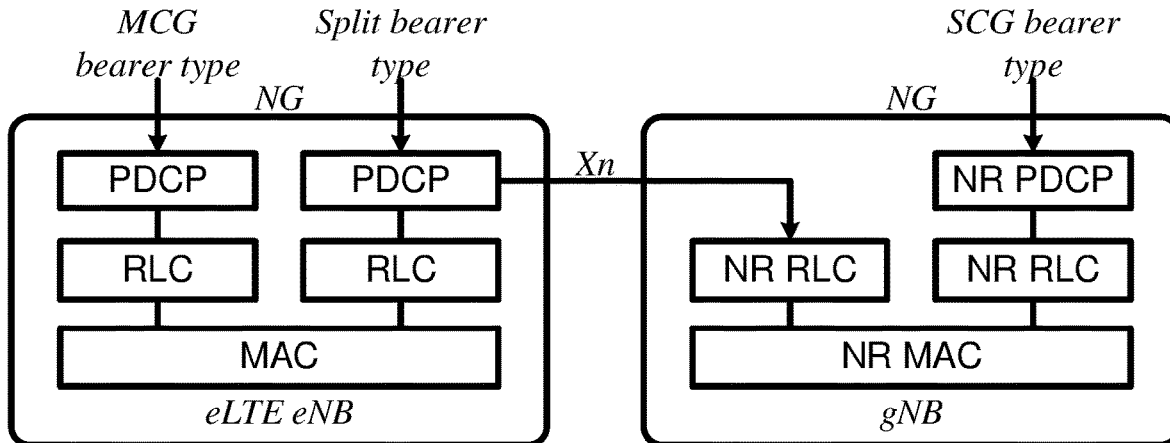

FIG. 12A, FIG. 12B, and FIG. 12C are example diagrams for radio protocol structures of tight interworking bearers as per an aspect of an embodiment of the present invention. In FIG. 12A, an LTE eNB may be a master base station, and a gNB may be a secondary base station. In FIG. 12B, a gNB may be a master base station, and an eLTE eNB may be a secondary base station. In FIG. 12C, an eLTE eNB may be a master base station, and a gNB may be a secondary base station. In 5G network, the radio protocol architecture that a particular bearer uses may depend on how the bearer is setup. Three alternatives may exist, an MCG bearer, an SCG bearer, and a split bearer as shown in FIG. 12A, FIG. 12B, and FIG. 12C. NR RRC may be located in master base station, and SRBs may be configured as an MCG bearer type and may use the radio resources of the master base station. Tight interworking may also be described as having at least one bearer configured to use radio resources provided by the secondary base station. Tight interworking may or may not be configured/implemented in example embodiments of the invention.

In the case of tight interworking, the UE may be configured with two MAC entities: one MAC entity for master base station, and one MAC entity for secondary base station. In tight interworking, the configured set of serving cells for a UE may comprise of two subsets: the Master Cell Group (MCG) containing the serving cells of the master base station, and the Secondary Cell Group (SCG) containing the serving cells of the secondary base station. For a SCG, one or more of the following may be applied: at least one cell in the SCG has a configured UL CC and one of them, named PSCell (or PCell of SCG, or sometimes called PCell), is configured with PUCCH resources; when the SCG is configured, there may be at least one SCG bearer or one split bearer; upon detection of a physical layer problem or a random access problem on a PSCell, or the maximum number of (NR) RLC retransmissions has been reached associated with the SCG, or upon detection of an access problem on a PSCell during a SCG addition or a SCG change: a RRC connection re-establishment procedure may not be triggered, UL transmissions towards cells of the SCG are stopped, a master base station may be informed by the UE of a SCG failure type, for split bearer, the DL data transfer over the master base station is maintained; the RLC AM bearer may be configured for the split bearer; like PCell, PSCell may not be de-activated; PSCell may be changed with a SCG change (e.g. with security key change and a RACH procedure); and/or neither a direct bearer type change between a Split bearer and a SCG bearer nor simultaneous configuration of a SCG and a Split bearer are supported.

With respect to the interaction between a master base station and a secondary base station, one or more of the following principles may be applied: the master base station may maintain the RRM measurement configuration of the UE and may, (e.g, based on received measurement reports, traffic conditions, or bearer types), decide to ask a secondary base station to provide additional resources (serving cells) for a UE; upon receiving a request from the master base station, a secondary base station may create a container that may result in the configuration of additional serving cells for the UE (or decide that it has no resource available to do so); for UE capability coordination, the master base station may provide (part of) the AS configuration and the UE capabilities to the secondary base station; the master base station and the secondary base station may exchange information about a UE configuration by employing of RRC containers (inter-node messages) carried in Xn or Xx messages; the secondary base station may initiate a reconfiguration of its existing serving cells (e.g., PUCCH towards the secondary base station); the secondary base station may decide which cell is the PSCell within the SCG; the master base station may not change the content of the RRC configuration provided by the secondary base station; in the case of a SCG addition and a SCG SCell addition, the master base station may provide the latest measurement results for the SCG cell(s); both a master base station and a secondary base station may know the SFN and subframe offset of each other by OAM, (e.g., for the purpose of DRX alignment and identification of a measurement gap). In an example, when adding a new SCG SCell, dedicated RRC signaling may be used for sending required system information of the cell as for CA, except for the SFN acquired from a MIB of the PSCell of a SCG.

Figure 13A:
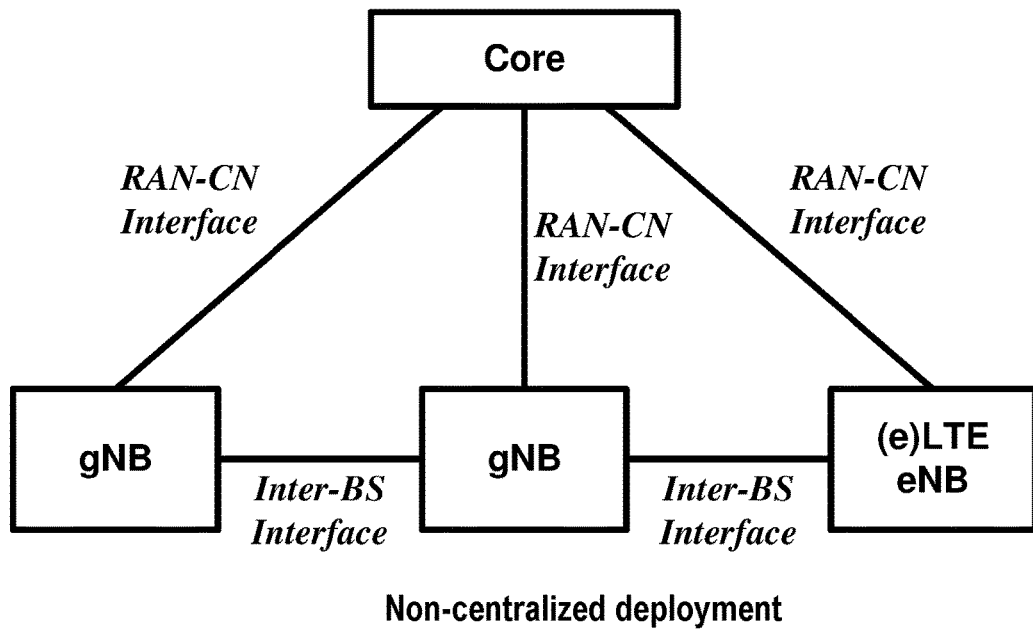
FIG. 13A and FIG. 13B are example diagrams for gNB deployment scenarios as per an aspect of an embodiment of the present invention.
Figure 13B:
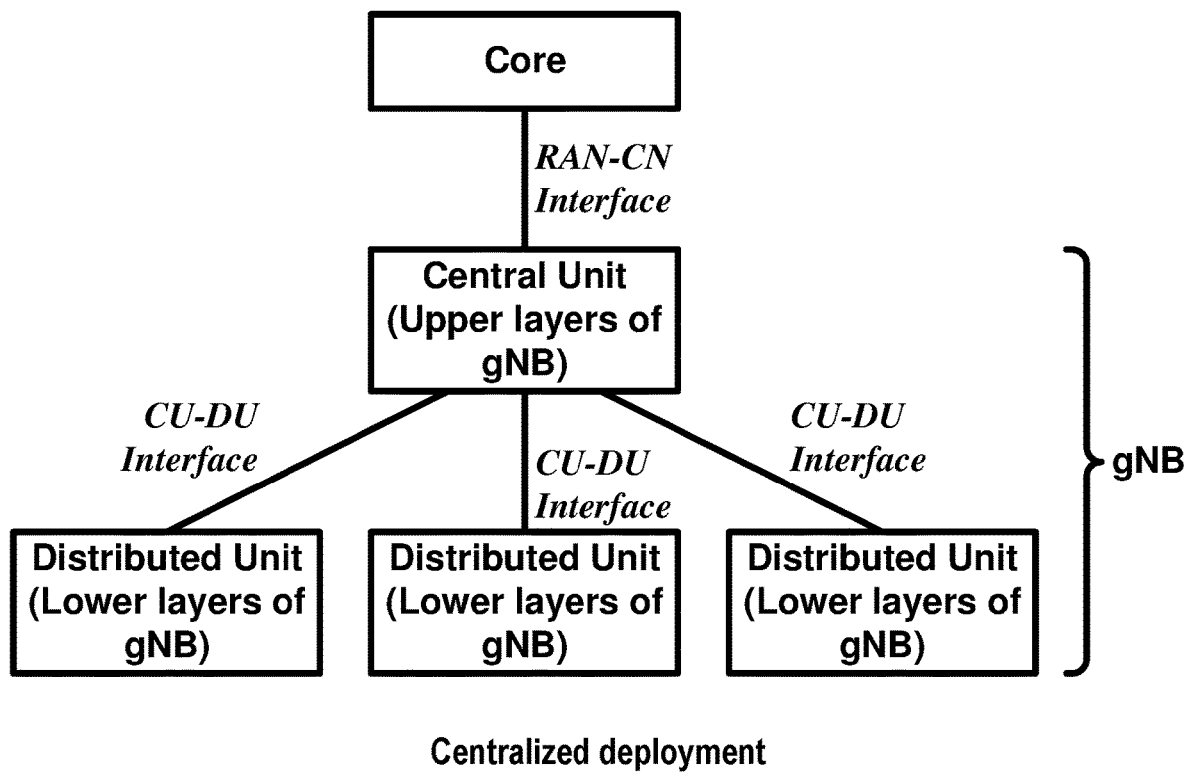

FIG. 13A and FIG. 13B are example diagrams for gNB deployment scenarios as per an aspect of an embodiment of the present invention. In the non-centralized deployment scenario in FIG. 13A, the full protocol stack (e.g. NR RRC, NR PDCP, NR RLC, NR MAC, and NR PHY) may be supported at one node. In the centralized deployment scenario in FIG. 13B, upper layers of gNB may be located in a Central Unit (CU), and lower layers of gNB may be located in Distributed Units (DU). The CU-DU interface (e.g. Fs interface) connecting CU and DU may be ideal or non-ideal. Fs-C may provide a control plane connection over Fs interface, and Fs-U may provide a user plane connection over Fs interface. In the centralized deployment, different functional split options between CU and DUs may be possible by locating different protocol layers (RAN functions) in CU and DU. The functional split may support flexibility to move RAN functions between CU and DU depending on service requirements and/or network environments. The functional split option may change during operation after Fs interface setup procedure, or may change only in Fs setup procedure (i.e. static during operation after Fs setup procedure).

Figure 14:
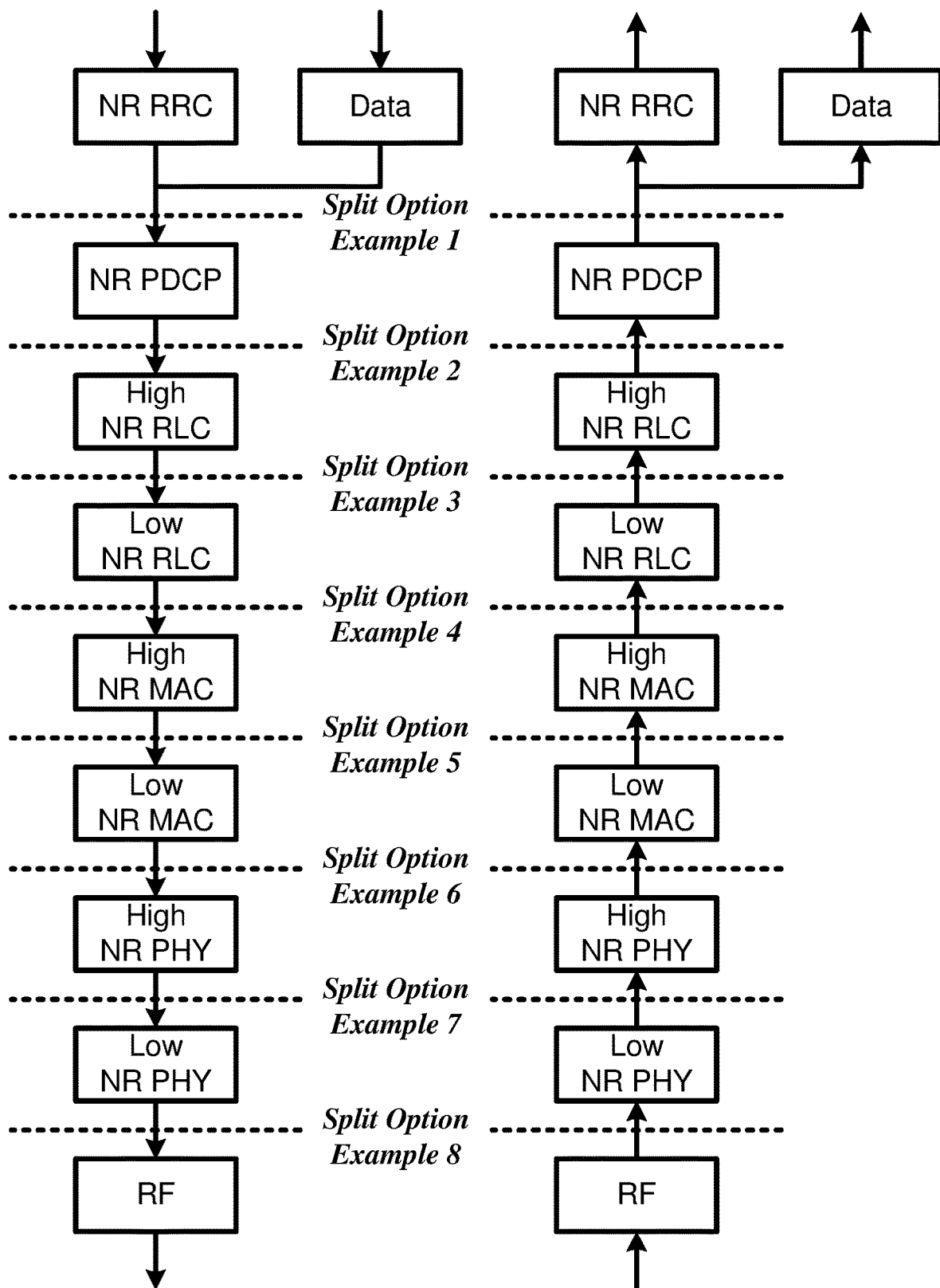
FIG. 14 is an example diagram for functional split option examples of the centralized gNB deployment scenario as per an aspect of an embodiment of the present invention.

FIG. 14 is an example diagram for different functional split option examples of the centralized gNB deployment scenario as per an aspect of an embodiment of the present invention. In the split option example 1, an NR RRC may be in CU, and NR PDCP, NR RLC, NR MAC, NR PHY, and RF may be in DU. In the split option example 2, an NR RRC and NR PDCP may be in CU, and NR RLC, NR MAC, NR PHY, and RF may be in DU. In the split option example 3, an NR RRC, NR PDCP, and partial function of NR RLC may be in CU, and the other partial function of NR RLC, NR MAC, NR PHY, and RF may be in DU. In the split option example 4, an NR RRC, NR PDCP, and NR RLC may be in CU, and NR MAC, NR PHY, and RF may be in DU. In the split option example 5, an NR RRC, NR PDCP, NR RLC, and partial function of NR MAC may be in CU, and the other partial function of NR MAC, NR PHY, and RF may be in DU. In the split option example 6, an NR RRC, NR PDCP, NR RLC, and NR MAC may be in CU, and NR PHY and RF may be in DU. In the split option example 7, an NR RRC, NR PDCP, NR RLC, NR MAC, and partial function of NR PHY may be in CU, and the other partial function of NR PHY and RF may be in DU. In the split option example 8, an NR RRC, NR PDCP, NR RLC, NR MAC, and NR PHY may be in CU, and RF may be in DU.

The functional split may be configured per CU, per DU, per UE, per bearer, per slice, or with other granularities. In per CU split, a CU may have a fixed split, and DUs may be configured to match the split option of CU. In per DU split, each DU may be configured with a different split, and a CU may provide different split options for different DUs. In per UE split, a gNB (CU and DU) may provide different split options for different UEs. In per bearer split, different split options may be utilized for different bearer types. In per slice splice, different split options may be applied for different slices.

In an example embodiment, the new radio access network (new RAN) may support different network slices, which may allow differentiated treatment customized to support different service requirements with end to end scope. The new RAN may provide a differentiated handling of traffic for different network slices that may be pre-configured, and may allow a single RAN node to support multiple slices. The new RAN may support selection of a RAN part for a given network slice, by one or more slice ID(s) or NSSAI(s) provided by a UE or a NGC (e.g. NG CP). The slice ID(s) or NSSAI(s) may identify one or more of pre-configured network slices in a PLMN. For initial attach, a UE may provide a slice ID and/or an NSSAI, and a RAN node (e.g. gNB) may use the slice ID or the NSSAI for routing an initial NAS signaling to an NGC control plane function (e.g. NG CP). If a UE does not provide any slice ID or NSSAI, a RAN node may send a NAS signaling to a default NGC control plane function. For subsequent accesses, the UE may provide a temporary ID for a slice identification, which may be assigned by the NGC control plane function, to enable a RAN node to route the NAS message to a relevant NGC control plane function. The new RAN may support resource isolation between slices. The RAN resource isolation may be achieved by avoiding that shortage of shared resources in one slice breaks a service level agreement for another slice.

The amount of data traffic carried over cellular networks is expected to increase for many years to come. The number of users/devices is increasing and each user/device accesses an increasing number and variety of services, e.g. video delivery, large files, images. This requires not only high capacity in the network, but also provisioning very high data rates to meet customers' expectations on interactivity and responsiveness. More spectrum is therefore needed for cellular operators to meet the increasing demand. Considering user expectations of high data rates along with seamless mobility, it is beneficial that more spectrum be made available for deploying macro cells as well as small cells for cellular systems.

Striving to meet the market demands, there has been increasing interest from operators in deploying some complementary access utilizing unlicensed spectrum to meet the traffic growth. This is exemplified by the large number of operator-deployed Wi-Fi networks and the 3GPP standardization of LTE/WLAN interworking solutions. This interest indicates that unlicensed spectrum, when present, can be an effective complement to licensed spectrum for cellular operators to help addressing the traffic explosion in some scenarios, such as hotspot areas. LAA offers an alternative for operators to make use of unlicensed spectrum while managing one radio network, thus offering new possibilities for optimizing the network's efficiency.

In an example embodiment, Listen-before-talk (clear channel assessment) may be implemented for transmission in an LAA cell. In a listen-before-talk (LBT) procedure, equipment may apply a clear channel assessment (CCA) check before using the channel. For example, the CCA utilizes at least energy detection to determine the presence or absence of other signals on a channel in order to determine if a channel is occupied or clear, respectively. For example, European and Japanese regulations mandate the usage of LBT in the unlicensed bands. Apart from regulatory requirements, carrier sensing via LBT may be one way for fair sharing of the unlicensed spectrum.

In an example embodiment, discontinuous transmission on an unlicensed carrier with limited maximum transmission duration may be enabled. Some of these functions may be supported by one or more signals to be transmitted from the beginning of a discontinuous LAA downlink transmission. Channel reservation may be enabled by the transmission of signals, by an LAA node, after gaining channel access via a successful LBT operation, so that other nodes that receive the transmitted signal with energy above a certain threshold sense the channel to be occupied. Functions that may need to be supported by one or more signals for LAA operation with discontinuous downlink transmission may include one or more of the following: detection of the LAA downlink transmission (including cell identification) by UEs; time & frequency synchronization of UEs.

In an example embodiment, DL LAA design may employ subframe boundary alignment according to LTE-A carrier aggregation timing relationships across serving cells aggregated by CA. This may not imply that the eNB transmissions can start only at the subframe boundary. LAA may support transmitting PDSCH when not all OFDM symbols are available for transmission in a subframe according to LBT. Delivery of necessary control information for the PDSCH may also be supported.

LBT procedure may be employed for fair and friendly coexistence of LAA with other operators and technologies operating in unlicensed spectrum. LBT procedures on a node attempting to transmit on a carrier in unlicensed spectrum require the node to perform a clear channel assessment to determine if the channel is free for use. An LBT procedure may involve at least energy detection to determine if the channel is being used. For example, regulatory requirements in some regions, e.g., in Europe, specify an energy detection threshold such that if a node receives energy greater than this threshold, the node assumes that the channel is not free. While nodes may follow such regulatory requirements, a node may optionally use a lower threshold for energy detection than that specified by regulatory requirements. In an example, LAA may employ a mechanism to adaptively change the energy detection threshold, e.g., LAA may employ a mechanism to adaptively lower the energy detection threshold from an upper bound. Adaptation mechanism may not preclude static or semi-static setting of the threshold. In an example Category 4 LBT mechanism or other type of LBT mechanisms may be implemented.

Various example LBT mechanisms may be implemented. In an example, for some signals, in some implementation scenarios, in some situations, and/or in some frequencies no LBT procedure may performed by the transmitting entity. In an example, Category 2 (e.g. LBT without random back-off) may be implemented. The duration of time that the channel is sensed to be idle before the transmitting entity transmits may be deterministic. In an example, Category 3 (e.g. LBT with random back-off with a contention window of fixed size) may be implemented. The LBT procedure may have the following procedure as one of its components. The transmitting entity may draw a random number N within a contention window. The size of the contention window may be specified by the minimum and maximum value of N. The size of the contention window may be fixed. The random number N may be employed in the LBT procedure to determine the duration of time that the channel is sensed to be idle before the transmitting entity transmits on the channel. In an example, Category 4 (e.g. LBT with random back-off with a contention window of variable size) may be implemented. The transmitting entity may draw a random number N within a contention window. The size of contention window may be specified by the minimum and maximum value of N. The transmitting entity may vary the size of the contention window when drawing the random number N. The random number N is used in the LBT procedure to determine the duration of time that the channel is sensed to be idle before the transmitting entity transmits on the channel.

LAA may employ uplink LBT at the UE. The UL LBT scheme may be different from the DL LBT scheme (e.g. by using different LBT mechanisms or parameters) for example, since the LAA UL is based on scheduled access which affects a UE's channel contention opportunities. Other considerations motivating a different UL LBT scheme include, but are not limited to, multiplexing of multiple UEs in a single subframe.

In an example, a DL transmission burst may be a continuous transmission from a DL transmitting node with no transmission immediately before or after from the same node on the same CC. An UL transmission burst from a UE perspective may be a continuous transmission from a UE with no transmission immediately before or after from the same UE on the same CC. In an example, UL transmission burst is defined from a UE perspective. In an example, an UL transmission burst may be defined from an eNB perspective. In an example, in case of an eNB operating DL+UL LAA over the same unlicensed carrier, DL transmission burst(s) and UL transmission burst(s) on LAA may be scheduled in a TDM manner over the same unlicensed carrier. For example, an instant in time may be part of a DL transmission burst or an UL transmission burst.

According to some of the various aspects of embodiments, initial timing alignment may be achieved through a random access procedure. This may involve a UE transmitting at least one random access preamble and an base station responding with an initial TA command NTA (amount of timing advance) within a random access response window. The start of the random access preamble may be aligned with the start of a corresponding uplink subframe at the UE assuming NTA=0. The base station may estimate the uplink timing from the random access preamble transmitted by the UE. The TA command may be derived by the base station based on the estimation of the difference between the desired UL timing and the actual UL timing. The UE may determine the initial uplink transmission timing relative to the corresponding downlink of a TAG on which the preamble is transmitted. TA value may be determined based on the timing difference between a reference downlink signal timing and uplink transmission timing. A timing advance value depends at least on channel condition, e.g. propagation delay.

In an example, a wireless device may employ multiple cells served by different transmission/reception points of a base station. One or more cells of the multiple cells may by served by multiple transmission/reception points. In an example, depending on a transmission/reception point serving a cell for a wireless device, a timing advance of the cell for the wireless device may vary when the cell operates with multiple transmission/reception points. In an example, depending on a transmission/reception point serving a cell for a wireless device, the cell may need to belong to different timing advance group (TAG) of the wireless device. In an example, propagation delay and timing advance of a cell may change when a wireless device moves in a coverage area and/or connect to a different transmission point.

In existing technologies, if a gNB is split into a gNB-CU and a gNB-DU, a gNB-CU may provide at least an RRC layer and a gNB-DU may provide at least one of a physical layer and/or a MAC layer. In an example, when a timing advance of a cell changes, a gNB-DU may detect a change of a timing advance value of the cell for the wireless device. A gNB-CU may not be aware of the change of the timing advance of a cell of a wireless device. A gNB-CU may configure, for a wireless device, RRC parameters (e.g. RRC messages) comprising TAG configuration parameters without information of a timing advance change of a cell of a wireless device. Implementation of existing RRC message configuration mechanism of a gNB-CU may configure inappropriate parameters for the wireless device. The existing technology may decrease radio channel reliability and increase a interference generated by a wireless device. There is a need to develop enhance signaling mechanisms among a gNB-CU, a gNB-DU and a wireless device so that a gNB-CU can properly configure timing advance groups to enhance uplink timing and reduce interference.

Example embodiments enhance RRC parameter configuration mechanisms of a gNB-CU when a gNB-DU provides lower layer functions of a gNB. Example embodiments may enhance interactions of a gNB-CU and a gNB-DU to configure timing alignment configuration parameters for wireless devices. Example embodiments may increase connection reliability and decrease interference of wireless devices by enhancing parameter configuration mechanisms of a gNB-CU and a gNB-DU for wireless devices.

In an example embodiment, a base station may comprise a gNB, eNB, an RNC, a home eNB, a home gNB, NG-eNB, Integrated Access and Backhaul (IAB) node, a relay node, an access point and/or any type of base stations or access points communicating with one or more wireless devices. Example embodiments for an example base station may be applied to other types of base stations. For example an embodiment on gNB can be applied to implementation of IAB node. In an example embodiment, a gNB-CU may be interpreted as a centralized base station (e.g. eNB-CU, RNC, access point central unit, relay donor node, integrated access and backhaul (IAB) donor node, and/or the like). In an example embodiment, a gNB-DU may be interpreted as a distributed base station (e.g. eNB-DU, RRH, transmission and reception point (TRP), access point distributed unit, relay node, IAB) node, and/or the like).

In an example embodiment, an uplink timing advance (TA) associated with a first cell may be changed when a wireless device moves from a first transmission point to a second transmission point of the first cell. In an example, if both the first cell and a second cell belong to a first timing advance group (TAG) for the wireless device and the second cell is not served by the second transmission point, the first cell and the second cell may not be able to belong to the same TAG (e.g. the first TAG) when the wireless device moves to the second transmission point for the first cell because an uplink TA associated with the second cell may not be changed. In an example, a base station may update a TAG for the first cell and/or the second cell in response to a TA change of the first cell. In an example, the base station may assign different TAGs for the first cell and the second cell at the time of allocating the first cell and the second cell to the wireless device if the base station has information of TA correlation information between different cells.

In an example, a base station may comprise a central RAN entity (e.g. gNB-CU) and one or more distributed RAN entities (e.g. gNB-DUs). A distributed RAN entity of the one or more distributed RAN entity may serve at least one cell. The central RAN entity may provide at least a radio resource control (RRC) functionality and/or a packet data convergence protocol (PDCP) layer functionality. The distributed RAN entity may provide at least a radio link control (RLC) layer functionality, a medium access control (MAC) layer functionality, and/or a physical (PHY) layer functionality.

An F1 interface (e.g. a logical direct interface) may be setup between the central RAN entity and the distributed RAN entity. The F1 interface may comprise a user plane interface and/or a control plane interface. RRC messages may be transmitted from the central RAN entity to a wireless device or from a wireless device to the central RAN entity via the distributed RAN entity. Data packets may be transmitted from the central RAN entity to a wireless device or from a wireless device to the central RAN entity via the distributed RAN entity. In an example, data packets transmitted over the F1 interface may be PDCP layer packets. In an example, RRC messages transmitted over the F1 interface may be conveyed by an F1 interface message, and/or the RRC messages conveyed by the F1 interface message may be one or more PDCP layer packets associated with one or more signaling radio bearers.

Figure 15:
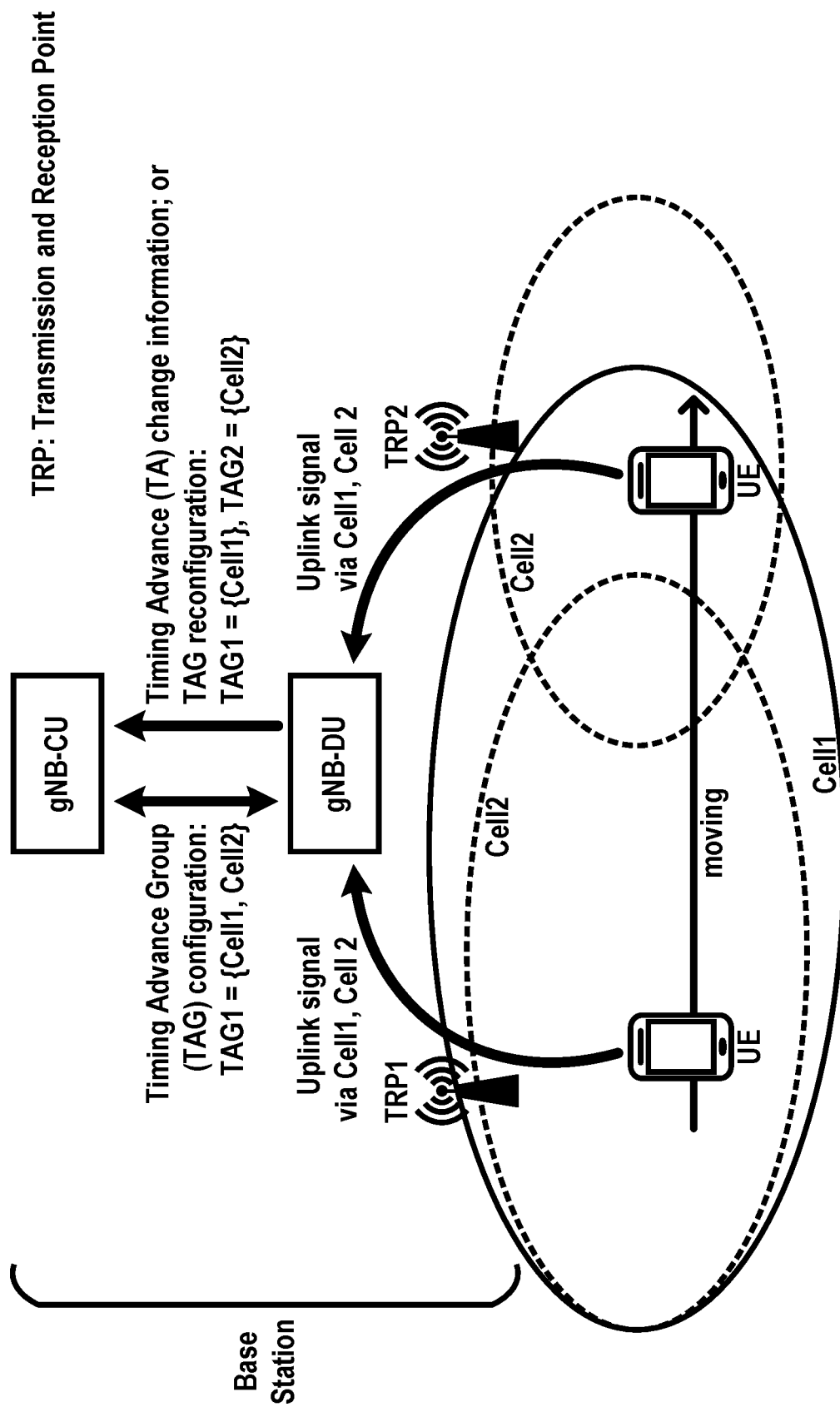
FIG. 15 is an example diagram of an aspect of an embodiment of the present disclosure.
Figure 16:
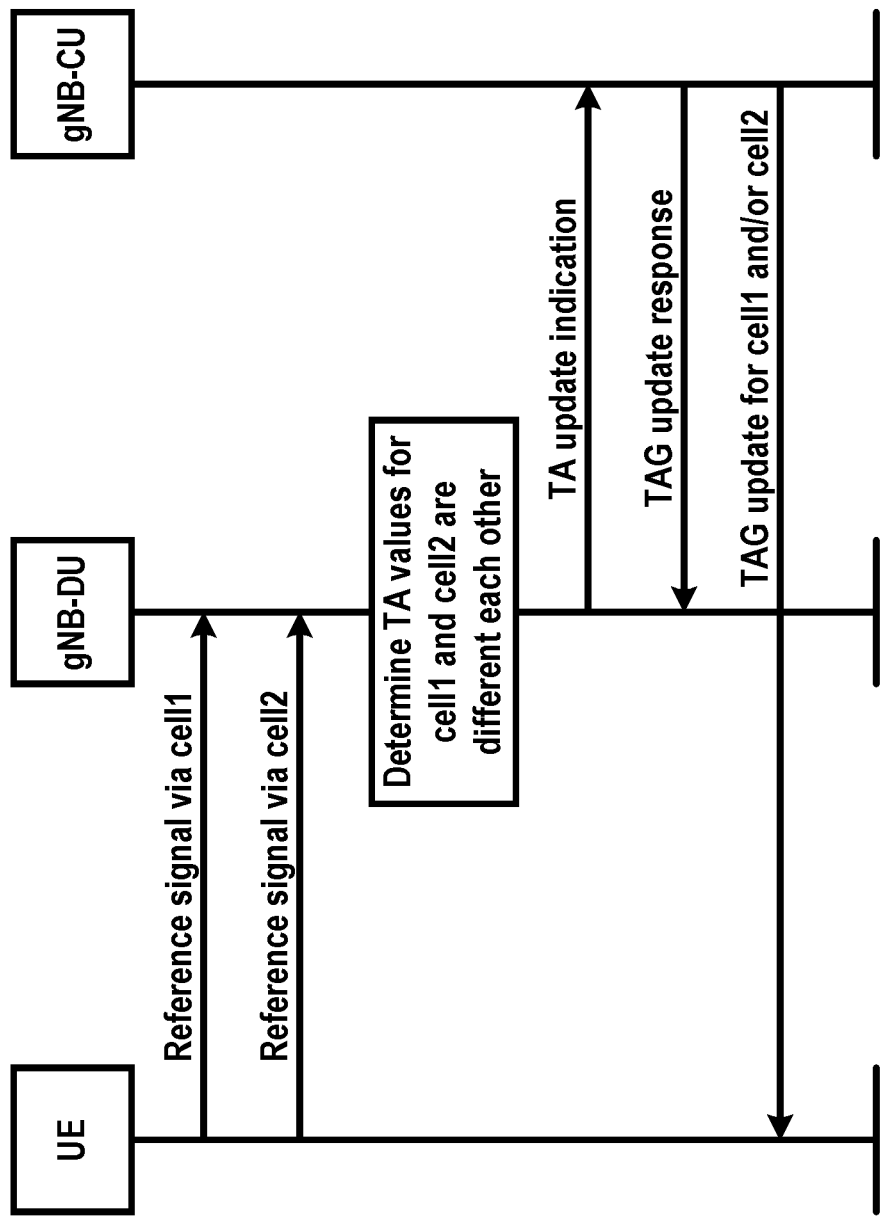
FIG. 16 is an example diagram of an aspect of an embodiment of the present disclosure.

In an example embodiment, as shown in FIG. 15 and FIG. 16, a distributed radio access network (RAN) entity may receive, from a wireless device, one or more first reference signals (e.g. a sounding reference signal, SRS, a random access preamble, and/or the like) via a first cell and one or more second reference signals via a second cell. The first cell and the second cell may be configured to belong to the same timing advance group (TAG), a first TAG. The configuration of the first TAG may be set by the distributed RAN entity and/or by a central RAN entity corresponding to the distributed RAN entity. In an example, the distributed RAN entity may configure the first cell and the second cell as the first TAG, and/or may transmit the configuration information of the first TAG to the central RAN entity via an F1 interface and/or to the wireless device via a radio interface (e.g. a medium access control layer, a physical layer, and/or the like). In an example, a central RAN entity may configure the first cell and the second cell as the first TAG, and/or may transmit the configuration information of the first TAG to the distributed RAN entity via an F1 interface and/or to the wireless device via one or more radio resource control (RRC) layer messages.

In an example, in response to receiving the one or more first reference signals, the distributed RAN entity may measure a first uplink timing advance (TA) value for the first cell based on at least one of the one or more first reference signals. In response to receiving the one or more second reference signals, the distributed RAN entity may measure a second uplink TA value for the second cell based on at least one of the one or more second reference signals. The distributed RAN entity may determine whether the first uplink TA value and the second uplink TA value are different each other. In an example, the distributed RAN entity may determine whether a difference between the first uplink TA value and the second uplink TA value is larger than a threshold value.

For example, the first cell may be served by a first transmission and reception point (TRP), and the second cell may be served by a first TRP and a second TRP. When a base station (e.g. the central RAN entity and/or the distributed RAN entity) assigns the first TAG for the first cell and the second cell to serve the wireless device, the base station may determine that a TA value for the first cell and a TA value for the second cell are same (or a difference between two TA values is lower than a threshold value) and may decide to assign the same TAG (the same TAG identifier), the first TAG. In an example, a base station distributed unit may determine that a first uplink timing advance value for a first cell of a wireless device is same (e.g. a timing difference is below than a threshold, e.g. 10 micro seconds) as a second uplink timing advance value for a second cell of the wireless device, wherein the first cell and the second cell belong to different timing advance groups.

If the wireless moves to a service area of the second TRP, the first cell for the wireless device may be served via the first TRP and the second cell for the wireless device may be served via the second TRP. If a TA value for the first cell and a TA value for the second cell are different each other because serving TRPs for two cells are different, the first cell and the second cell may not be able to belong to the same TAG. To reconfigure TAG(s) for the first cell and/or the second cell, the distributed RAN entity may need to inform this to the central RAN entity.

In an example, if the first uplink TA value and the second uplink TA value are different each other and/or if a difference between the first uplink TA value and the second uplink TA value is larger than a threshold value, the distributed RAN entity may transmit a first message to the central RAN entity. The first message may be transmitted via an F1 interface between the distributed RAN entity and the central RAN entity. The first message may indicate that, for the wireless device, a TA value associated with the first cell and a TA value associated with the second cell are different each other (e.g. at least the difference between two TA values is larger than the threshold value). In an example, the first message may comprise the first uplink TA value and/or the second uplink TA value. The first and/or second uplink TA values may comprise an index value (e.g. 0, 1, 2, . . . , 63), which indicates an amount of time to be adjusted for uplink timing synchronization (timing advance) for the first cell and/or the second cell. A length of the first and/or second uplink TA values may be 6 bits. In an example, the first message may comprise an amount of difference between a TA value for the first cell and a TA value for the second cell. A value of the amount of difference may comprise an index value (e.g. 0, 1, 2, . . . , 63).

In an example, the first message may indicate a request for reconfiguring a TAG(s) associated with the first cell and/or the second cell, wherein the request may be one of one or more cell configuration change requests for the first cell and/or the second cell. In an example, the first message may indicate, explicitly and/or implicitly, that the first cell and the second cell cannot belong to the same TAG for the wireless device. In an example, the first message may indicate that the first cell and the second cell belong to the different TAGs to each other for the wireless device. In an example, the first message may comprise one or more reconfiguration information elements indicating a reconfiguration of a TAG configuration for the wireless device. In an example, the first message may further comprise a wireless device identifier of the wireless device (e.g. TMSI, F1 UE identifier, C-RNTI, DU-RNTI, and/or the like).

In an example, the central RAN entity may transmit a response message to the distributed RAN entity in response to the first message. The response message may be transmitted via the F1 interface between the central RAN entity and the distributed RAN entity. The response message may indicate an acknowledgement for one or more elements of the first message.

In an example, the central RAN entity may configure the second cell to belong to a second TAG based on one or more elements of the first message. The central RAN entity may configure the first cell to belong to a second TAG based on one or more elements of the first message. The central RAN entity may configure the first cell and the second cell to belong to different TAGs each other based on one or more elements of the first message. In an example, the central RAN entity may configure a second message indicating that the first cell and the second cell to belong to different TAGs each other based on the first message. In an example, the central RAN entity may configure a second message indicating that the first cell and the second cell to belong to different TAGs each other based on the one or more reconfiguration information elements of the first message. In an example, the central RAN entity may transmit, to the wireless device, the second message determined based on configuring a TAG of the second cell and/or the first cell. The second message may be an RRC layer message. In an example, the second message may be an RRC connection reconfiguration message. The second message may indicate that the second cell belongs to a second TAG and/or that the first cell belongs to the first TAG. The second message may indicate that the first cell belongs to a second TAG and/or that the second cell belongs to the first TAG. The second message may indicate that the first cell and the second cell belong to different TAGs each other. In an example, the second message may be transmitted to the wireless device via the F1 interface and the distributed RAN entity. The distributed RAN entity may forward the second message to the wireless device via a radio interface.

In an example, the second message may comprise a TAG identifier associated with the second TAG. In an example, the second message may comprise a TAG identifier of a TAG for the first cell and/or a TAG identifier of a TAG for the second cell determined based on configuring (updating/reconfiguring) a TAG of the second cell and/or the first cell.

In an example, the distributed RAN entity (e.g. gNB-DU) may interpret the second message.

In an example, the distributed RAN entity may decode the second message. To transmit the second message to the wireless device, the central RAN entity may transmit the second message to the distributed RAN entity via an F1 interface message by encapsulating the second message into the F1 interface message (e.g. via an F1 interface message comprising an RRC container information element, which comprise the second message and/or elements of the second message), and the distributed RAN entity may transmit (forward) the second message to the wireless device via a radio interface. By decoding the second message, the distributed RAN entity may be able to be informed about reconfiguration of a TAG of the first cell and/or the second cell for the wireless device. In an example, the distributed RAN entity may transmit, to the wireless device, a timing advance command (TAC) based on the updated TAGs for the first cell and/or the second cell. In an example, the TAC may be transmitted via a medium access control (MAC) control element message.

In an example, the TAC may comprise a TA adjusting value (e.g. 0, 1, 2, . . . , 63) used to control the amount of timing adjustment that a MAC entity may apply for uplink transmission. The length of a field for the TAC may be 6 bits.

In an example, the central RAN entity (e.g. gNB-CU) may transmit, to the distributed RAN entity (e.g. gNB-DU), a message indicating updated TAG configurations.

In an example, the central RAN entity may transmit, to the distributed RAN entity, a third message indicating the updated TAG configurations for the first cell and/or the second cell, wherein the updated TAG configurations may correspond to one or more elements of the second message. The third message may be determined based on the configuration of a TAG of the second cell and/or the first cell at least based on one or more elements of the first message. The third message may be an F1 interface message. The third message may indicate that the second cell belongs to the second TAG and/or that the first cell belongs to the first TAG. The third message may indicate that the first cell belongs to the second TAG and/or that the second cell belongs to the first TAG. The third message may indicate that the first cell and the second cell belong to different TAGs each other.

In an example, the third message may comprise a TAG identifier associated with the second TAG. In an example, the third message may comprise a TAG identifier of a TAG for the first cell and/or a TAG identifier of a TAG for the second cell determined based on configuring (updating/reconfiguring) a TAG of the second cell and/or the first cell. The third message may further comprise a wireless device identifier of the wireless device (e.g. TMSI, F1 UE identifier, C-RNTI, DU-RNTI, and/or the like).

In an example, the distributed RAN entity may transmit, to the wireless device, a timing advance command (TAC) based on the updated TAGs for the first cell and/or the second cell at least based on one or more elements of the third message. In an example, the TAC may be transmitted via a medium access control (MAC) control element message.

In an example, a gNB-CU may receive transmission and reception point information of cells of a gNB-DU.

In an example embodiment, a central radio access network entity (CU, Central Unit) may receive a transmission reception point (TRP) information from a distributed radio access network entity (DU, Distributed Unit) and/or an operation and management (OAM, O&M) entity. The TRP information may comprise one or more beam identifiers of one or more beams, one or more cell identifiers of one or more cells, and/or one or more TRP identifiers of one or more TRPs. The CU may assign one or more timing advance groups (TAG) for a wireless device at least based on one or more elements of the TRP information. In an example, if a first beam and a second beam are served via the same TRP, the CU may assign the first beam and the second beam to the same TAG. In an example, if a first cell and a second cell are served via the same TRP, the CU may assign the first cell and the second cell to the same TAG. The CU may transmit the TAG assignment information associated with one or more cells and/or one or more beams for the wireless device to the wireless device and/or the DU. The DU may transmit a timing advance command to the wireless device at least based on the TAG assignment information received from the CU.

In an example, a distributed RAN entity may transmit, to a central RAN entity, a TA correlation information via an F1 interface between the distribute RAN entity and the central RAN entity. The TA correlation information may be transmitted via an F1 setup request message from the distributed RAN entity to the central RAN entity. The TA correlation information may be transmitted via an DU configuration update message (or an DU modification request message) from the distributed RAN entity to the central RAN entity. The TA correlation information may comprise at least one of: at least one identifier of at least one TA correlation group (e.g. transmission and reception point, TRP, identifier of at least one TRP); a list of cells grouped into one of the at least one TA correlation group (wherein the list of cells may have the same uplink TA value), a list of beams grouped into one of the at least one TA correlation group (wherein the list of beams may have the same uplink TA value).

In an example, the central RAN entity may configure one or more cells and/or one or more beams for a wireless device to belong to a first TAG for the wireless device if the one or more cells and/or the one or more beams are grouped in the same TA correlation group based on the TA correlation information received from the distributed RAN entity or from an operation and management (maintenance) entity (OAM). In an example, the one or more cells and/or the one or more beams may be determined to serve the wireless device at least based on one or more measurement reports from the wireless device and/or radio resource status information.

In an example, the central RAN entity may transmit, to the wireless device, a radio resource control (RRC) configuration information indicating that a first cell of the one or more cells belongs to the first TAG and/or indicating that a first beam of the one or more beams belongs to the first TAG based on the configuration. The RRC configuration information may be conveyed via an RRC message. The RRC configuration information (and/or the RRC message) may be transmitted through the distributed RAN entity. The RRC message may indicate, to the wireless device, an addition of the first cell as a secondary cell and/or a cell information of the first cell as a handover target cell for the wireless device. In an example, the RRC message may indicate, to the wireless device, an addition of the first beam as a serving beam of a serving cell for the wireless device. The RRC message may comprise an TAG identifier of the first TAG associated the first cell and/or the first beam. The RRC message may comprise a cell identifier of the first cell and/or a beam index (e.g. beam index, synchronization signal information, reference signal information associated with the first beam) of the first beam.

In an example, the distributed RAN entity may decode the RRC configuration information conveyed via the RRC message. The distributed RAN entity may transmit, to the wireless device, a timing advance command (TAC) for the first cell and/or the first beam with the TAG identifier of the first TAG at least based on the RRC configuration information.

In an example, the central RAN entity may transmit, to the distributed RAN entity, a configuration update message associated with the wireless device. The configuration update message may indicate the first cell and/or the first beam belongs to the first TAG. The configuration update message may comprise the TAG identifier of the first TAG associated the first cell and/or the first beam. The configuration update message may comprise the cell identifier of the first cell and/or the beam index (e.g. beam index, synchronization signal information, reference signal information associated with the first beam) of the first beam. In an example, the distributed RAN entity may transmit, to the wireless device, a timing advance command (TAC) for the first cell and/or the first beam with the TAG identifier of the first TAG at least based on the configuration update message. Example embodiments may increase connection reliability and decrease interference of wireless devices by enhancing parameter configuration mechanisms of a gNB-CU and a gNB-DU for wireless devices.

In an example, the TAC may comprise a TA adjusting value (e.g. 0, 1, 2, . . . , 63) used to control the amount of timing adjustment that a MAC entity may apply for uplink transmission. The length of a field for the TAC may be 6 bits.

In an example, a distributed RAN entity may receive, from a wireless device, a first reference signal via a first cell and second reference signal via a second cell, the first cell and the second cell configured to belong to a first timing advance group (TAG). The distributed RAN entity may determine that a first uplink timing advance (TA) value for the first cell is different from a second uplink TA value for the second cell based on the first reference signal and the second reference signal. The distributed RAN entity may transmit, to a central RAN entity, a first message indicating at least one of: the first uplink TA value may be different to the second uplink TA value for the wireless device; the first uplink TA value; the second uplink TA value; a different value between the first uplink TA value and the second uplink TA value; a TAG reconfiguration request at least for the second cell or the first cell; and/or the like.

The distributed RAN entity may receive, from the central RAN entity, a response message in response to the first message, the response message that may indicate an acknowledgement for one or more elements of the first message. In an example, the central RAN entity may configure the second cell to belong to a second TAG based on the first message. The central RAN entity may transmit, to the wireless device via the distributed radio access network entity, a second message indicating that the second cell belongs to the second TAG, wherein the second message may comprise a TAG identifier associated with the second TAG.

In an example, the distributed RAN entity may decode the second message, and/or transmit, to the wireless device, a timing advance command for the second cell with the TAG identifier. In an example, the distributed RAN entity may receive, from the central RAN entity, a third message indicating that the second cell belongs to the second TAG, wherein the third message may comprise the TAG identifier. The distributed RAN entity may transmit, to the wireless device, a timing advance command for the second cell with the TAG identifier.

In an example, a central RAN entity may receive, from a first network entity, a timing advance (TA) correlation information, the TA correlation information comprising at least one of: at least one identifier of at least one TA correlation group; and/or a list of cells grouped into one of the at least one TA correlation group, the list of cells that may have the same uplink TA value. The central RAN entity may configure one or more cells for a wireless device to belong to a first timing advance group (TAG) for the wireless device if the one or more cells are in the list of cells. The central RAN entity may transmit, to the wireless device via a distributed RAN entity, a radio resource control (RRC) configuration information indicating a first cell of the one or more cells belongs to the first TAG, the RRC configuration information that may comprise a cell identifier of the first cell and a TAG identifier of the first TAG. In an example, the first network entity is the distributed RAN entity. The first network entity is an operation and maintenance entity.

In an example, the distributed RAN entity may decode the radio resource control (RRC) configuration information, and/or transmit, to the wireless device, a timing advance command for the first cell with the TAG identifier. In an example, the distributed RAN entity may receive, from the central RAN entity, a first message indicating that the first cell may belong to the first TAG, wherein the first message may comprise the TAG identifier. The distributed RAN entity may transmit, to the wireless device, a timing advance command for the first cell with the TAG identifier. Example embodiments may increase connection reliability and decrease interference of wireless devices by enhancing parameter configuration mechanisms of a gNB-CU and a gNB-DU for wireless devices.

In existing technologies, if a gNB is split into a gNB-CU and a gNB-DU, a gNB-CU may provide at least an RRC layer and a gNB-DU may provide at least one of a physical layer and/or a MAC layer. A gNB-CU may determine RRC parameters (e.g. RRC messages) and/or perform connection control for a wireless device. gNB-CU may not be maintain a timing alignment timer for a timing advance group, and may not be aware of expiry of a timing alignment timer. Implementation of existing parameter configuration and/or connection control mechanisms of a gNB-CU may configure inappropriate parameters for the wireless device when a gNB-CU is not aware that a time alignment timer of a timing advance group is expired. For example, gNB-CU may not be able to release uplink resource configurations at a proper time when time alignment timer of a TAG expires. The existing technology may increase unwanted uplink interference and increase a packet transmission/reception failure rate of wireless devices. There is a need to develop enhance signaling mechanisms among a gNB-CU, a gNB-DU and a wireless device so that a gNB-CU can properly configure and/or release uplink channels and timing advance groups to enhance uplink timing and reduce interference.

Example embodiments enhance radio parameter configuration and/or connection control mechanisms of a gNB-CU when a gNB-DU provides lower layer functions of a gNB. Example embodiments may enhance interactions of a gNB-CU and a gNB-DU to configure radio control parameters and/or connection control parameters for wireless devices. Example embodiments may increase connection reliability and decrease interference by enhancing parameter configuration and/or release by a gNB-CU and a gNB-DU for a wireless device.

In an example embodiment, a distributed radio access network (RAN) entity may determine that a time alignment timer (TAT) for a timing advance group (e.g. primary TAG, pTAG, and/or secondary TAG, sTAG) of a wireless device expires. In response to the detection of the TAT expiration for the TAG, the distributed RAN entity may inform the TAT expiration to a central RAN entity. The central RAN entity may release one or more configurations associated with the wireless device and/or one or more cells belonging to the TAG based on the information of the TAT expiration.

In an example, a MAC entity may have a configurable timer timeAlignmentTimer (TAT) per TAG. The timeAlignmentTimer may be used to control how long the MAC entity considers the Serving Cells belonging to the associated TAG to be uplink time aligned.

In an example, the MAC entity, when a Timing Advance Command (TAC) MAC control element is received: may apply the Timing Advance Command for the indicated TAG, and/or may start or restart the timeAlignmentTimer associated with the indicated TAG.

In an example, the MAC entity, when a Timing Advance Command is received in a Random Access Response (RAR) message for a serving cell belonging to a TAG: if the Random Access Preamble was not selected by the MAC entity, may apply the Timing Advance Command for this TAG, and/or may start or restart the timeAlignmentTimer associated with this TAG; else if the timeAlignmentTimer associated with this TAG is not running, may apply the Timing Advance Command for this TAG, may start the timeAlignmentTimer associated with this TAG, and/or, when the contention resolution is considered not successful, may stop timeAlignmentTimer associated with this TAG; else may ignore the received Timing Advance Command.

In an example, the MAC entity, when a timeAlignmentTimer expires: if the timeAlignmentTimer is associated with the pTAG: may flush all HARQ buffers for all serving cells, may notify RRC to release PUCCH for all serving cells, may notify RRC to release SRS for all serving cells, may clear any configured downlink assignments and uplink grants, and/or may consider all running timeAlignmentTimers as expired; else if the timeAlignmentTimer is associated with an sTAG, then for Serving Cells belonging to this TAG: may flush all HARQ buffers, may notify RRC to release SRS, and/or may notify RRC to release PUCCH, if configured.

In an example, when the MAC entity stops uplink transmissions for an SCell due to the fact that the maximum uplink transmission timing difference or the maximum uplink transmission timing difference the UE may handle between TAGs of any MAC entity of the UE is exceeded, the MAC entity may consider the timeAlignmentTimer associated with the SCell as expired.

The MAC entity may not perform an uplink transmission on a Serving Cell except the Random Access Preamble transmission when the timeAlignmentTimer associated with the TAG to which this Serving Cell belongs is not running. Furthermore, when the timeAlignmentTimer associated with the pTAG is not running, the MAC entity may not perform any uplink transmission on any Serving Cell except the Random Access Preamble transmission on the SpCell.

The MAC entity may not perform a sidelink transmission which may be performed based on UL timing of the corresponding serving cell and associated SCI transmissions when the corresponding timeAlignmentTimer may not be running. A MAC entity may store and/or maintain NTA upon expiry of associated timeAlignmentTimer, where NTA may be defined. The MAC entity may apply a received Timing Advance Command MAC control element and/or may start associated timeAlignmentTimer also when the timeAlignmentTimer is not running.

In an example, a base station may comprise a central RAN entity and one or more distributed RAN entities. A distributed RAN entity of the one or more distributed RAN entity may serve at least one cell. The central RAN entity may provide at least a radio resource control (RRC) functionality and/or a packet data convergence protocol (PDCP) layer functionality. The distributed RAN entity may provide at least a radio link control (RLC) layer functionality, a medium access control (MAC) layer functionality, and/or a physical (PHY) layer functionality.

An F1 interface (e.g. a logical direct interface) may be setup between the central RAN entity and the distributed RAN entity. The F1 interface may comprise a user plane interface and/or a control plane interface. RRC messages may be transmitted from the central RAN entity to a wireless device or from a wireless device to the central RAN entity via the distributed RAN entity. Data packets may be transmitted from the central RAN entity to a wireless device or from a wireless device to the central RAN entity via the distributed RAN entity. In an example, data packets transmitted over the F1 interface may be PDCP layer packets. In an example, RRC messages transmitted over the F1 interface may be conveyed by an F1 interface message, and/or the RRC messages conveyed by the F1 interface message may be one or more PDCP layer packets associated with one or more signaling radio bearers.

Figure 17:
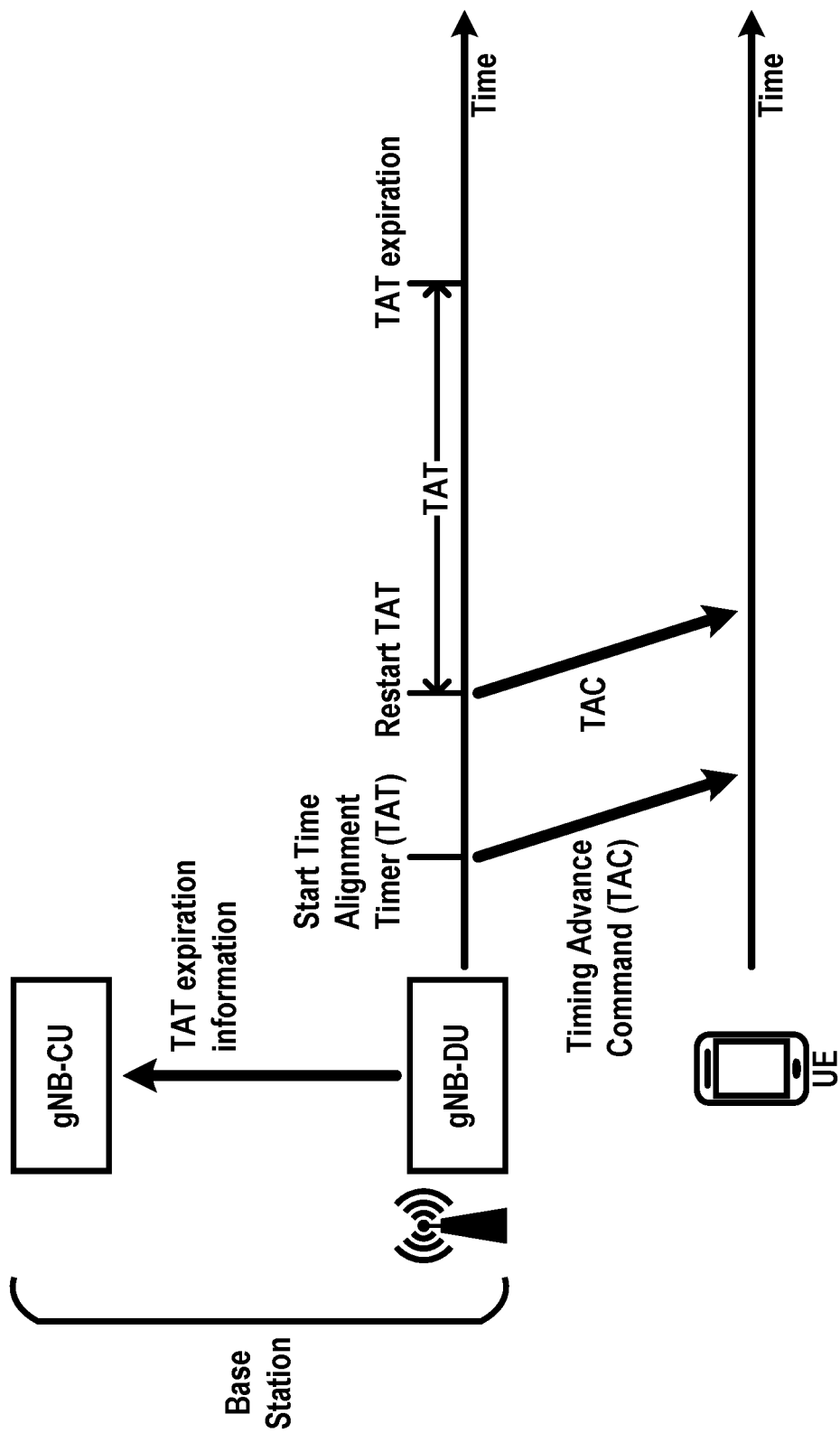
FIG. 17 is an example diagram of an aspect of an embodiment of the present disclosure.

In an example embodiment, as shown in FIG. 17, a base station comprising a distributed RAN entity and/or a central RAN entity may assign one or more cells to a wireless device. The one or more cells may belong to a timing advance group (TAG). The wireless device may transmit and/or receive packets to/from the base station (e.g. the distributed RAN entity and/or the central RAN entity). In an example, the distributed RAN entity may transmit a timing advance command (TAC) for the TAG to the wireless device. The TAC may be transmitted via a medium access control (MAC) layer message, e.g. MAC control element (MAC CE) message. In an example, the TAC may be transmitted via a random access response message for a serving cell belonging to the TAG. The TAC may be transmitted with a TAG identifier of the TAG. In an example, the TAC may comprise a TA adjusting value (e.g. 0, 1, 2, . . . , 63) used to control the amount of timing adjustment that a MAC entity may apply. The length of a field for the TAC may be 6 bits.

In response to transmitting the TAC to the wireless device, the distributed RAN entity may start or restart a time alignment timer (TAT) associated with the TAG for the wireless device. The distributed RAN entity may determine whether the TAT expires after starting or restarting the TAT. When the distributed RAN entity does not successfully transmit another TAC to the wireless device within a time duration of the TAT since the TAT is started and/or restarted, the distributed RAN entity may determine that the TAT expires.

In an example, the TAT may be configured by the central RAN entity (e.g. an RRC) and/or the distributed RAN entity. The TAT may be transmitted from the base station to the wireless device via a RRC message. The TAT may be configured as the number of subframes, e.g. 500 subframes, 750 subframes, 1280 subframes, 1920 subframes, 2560 subframes, 5120 subframes, 10240 subframes, infinite number of subframes, and/or the like.

In an example, in response to determining that the TAT associated with the TAG for the wireless device expires, the distributed RAN entity: may flush hybrid automated repeat request (HARQ) uplink resources configured for the one or more cells; may release physical uplink control channel (PUCCH) configurations for the one or more cells; may release sounding reference signal (SRS) configurations for the one or more cells; may clear configured downlink assignments for the one or more cells; may clear uplink resource grants for the one or more cells; may consider all running TAT as expired if the TAG is a primary TAG; and/or the like.

In an example, in response to the TAT expiration, the distributed RAN entity may release HARQ uplink resources configured on the one or more cells for the wireless device. The distributed RAN entity may release PUCCH radio resources configured on the one or more cells for the wireless device. The distributed RAN entity may release SRS radio resources configured on the one or more cells for the wireless device. The distributed RAN entity may clear downlink radio resource assignments configured for periodic downlink packet transmissions via the one or more cells. The distributed RAN entity may clear uplink resource grants configured for uplink packet transmissions via the one or more cells. In case that the TAG is a primary TAG of the wireless device, the distributed RAN entity may consider running TATs for secondary TAGs as expired, and/or may release uplink HARQ resource configurations, PUCCH configurations, SRS configurations, downlink resource assignments and/or uplink granted resource configurations for one or more cells of the secondary TAGs.

In an example, in response to the TAT expiration, the distributed RAN entity may apply default physical channel configurations for the one or more cells of the TAG. The default channel configurations may be configured for at least one of channel quality information (CQI) report configurations, uplink resource scheduling request configurations, dedicated uplink SRS configurations, and/or the like.

In an example, in response to determining that the TAT associated with the TAG for the wireless device expires, the distributed RAN entity may transmit a first message to the central RAN entity. The first message may be transmitted via an F1 interface between the central RAN entity and the distributed RAN entity. The first message may comprise a wireless device identifier of the wireless device, at least one cell identifier of one or more cell identifiers of the one or more cell belonging to the TAG, a TAG identifier of the TAG, and/or the like. In an example, the first message may indicate that the TAT associated with the TAG for the wireless device expired.

In an example, the first message may comprise at least one notifications for at least one of: releasing hybrid automated repeat request (HARQ) uplink resource configurations for the one or more cells, a releasing physical uplink control channel (PUCCH) configurations for the one or more cells, releasing a sounding reference signal (SRS) configurations for the one or more cells, clearing configured downlink assignments for the one or more cells, clearing uplink resource grants for the one or more cells, considering all running TAT as expired if the TAG is a primary TAG, and/or the like.

In an example, if the central RAN entity receives the first message, the central RAN entity may perform at least one of the following: may flush hybrid automated repeat request (HARQ) uplink resources configured for the one or more cells; may release physical uplink control channel (PUCCH) configurations for the one or more cells; may release sounding reference signal (SRS) configurations for the one or more cells; may clear configured downlink assignments for the one or more cells; may clear uplink resource grants for the one or more cells; may consider all running TAT as expired if the TAG is a primary TAG; and/or the like. Example embodiments may increase connection reliability and decrease interference by enhancing parameter configuration and/or release by a gNB-CU and a gNB-DU for a wireless device.

In an example, in response to receiving the first message, the central RAN entity may release HARQ uplink resource configurations on the one or more cells for the wireless device. The central RAN entity may release PUCCH radio resource configurations for the one or more cells for the wireless device. The central RAN entity may release SRS radio resource configurations for the one or more cells for the wireless device. The central RAN entity may clear downlink radio resource assignment configurations for periodic downlink packet transmissions via the one or more cells for the wireless device. The central RAN entity may clear uplink resource grant configurations for uplink packet transmissions via the one or more cells for the wireless device. In case that the TAG is a primary TAG of the wireless device, the central RAN entity may consider running TATs for secondary TAGs as expired, and/or the like.

In an example, in response to receiving the first message, the central RAN entity may apply default physical channel configurations for the one or more cells of the TAG. The default channel configurations may be configured for at least one of channel quality information (CQI) report configurations, uplink resource scheduling request configurations, dedicated uplink SRS configurations, and/or the like.

In an example, in response to one or more elements of the first message, the central RAN entity may transmit, to the distributed RAN entity, a second message indicating a first wireless device context release request for the wireless device. The second message may be transmitted via the F1 interface. The second message may be a UE context release command message. The second message may be transmitted when the TAG associated with the TAT expiration is a primary TAG for the wireless device. In an example, a first wireless device context released at least based on the second message may comprise one or more data radio bearers, one or more logical channels, one or more security configuration parameters, one or more information, and/or the like configurations associated with the wireless device.

In an example, in response to one or more elements of the first message, the central RAN entity may transmit, to a core network entity (e.g. AMF, MME, and/or the like), a third message indicating a second wireless device context release request for the wireless device, wherein the second wireless device context release request may be at least associated with an interface connection between the central RAN entity and the core network entity for the wireless device. The third message may be transmitted via a NG interface (i.e. an interface between the central RAN entity and the core network entity). The third message may be a UE context release request message. The third message may be transmitted when the TAG associated with the TAT expiration is a primary TAG for the wireless device.

Figure 18:
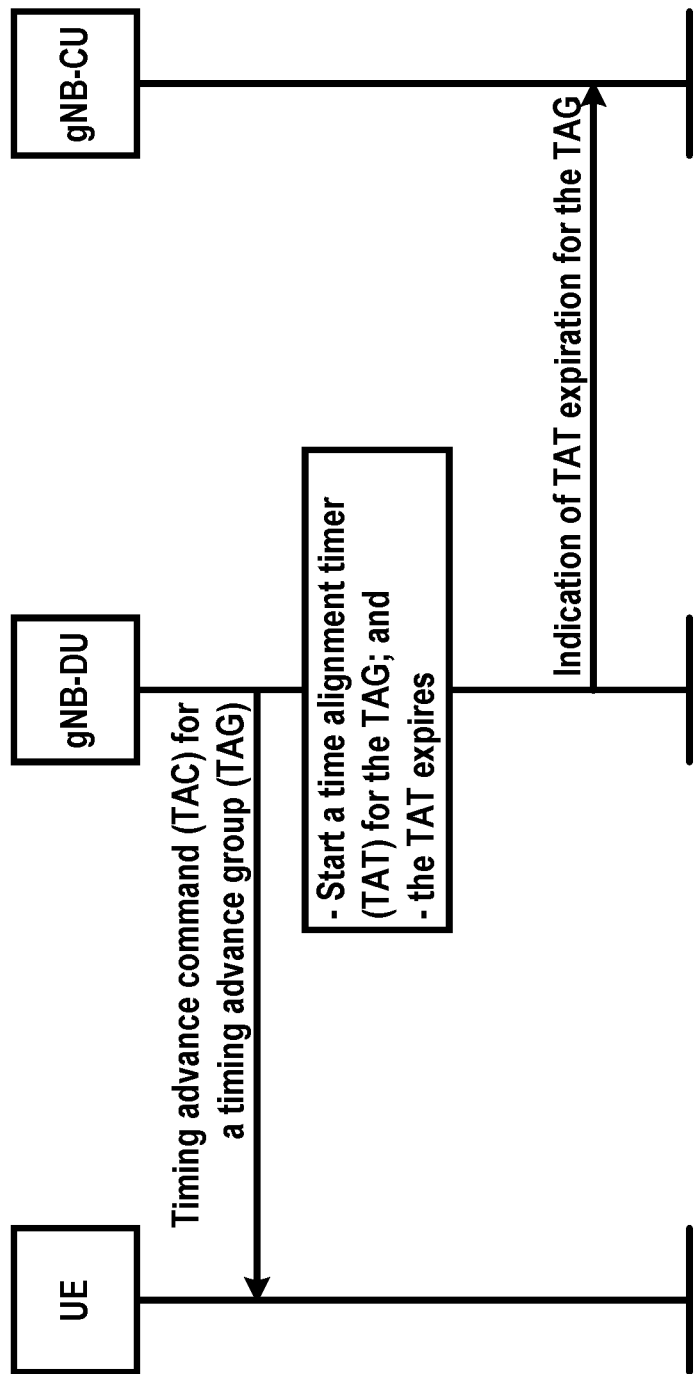
FIG. 18 is an example diagram of an aspect of an embodiment of the present disclosure.

In an example, as shown in FIG. 18, a distributed RAN entity may transmit, to a wireless device, a timing advance command (TAC) for a timing advance group (TAG) comprising one or more cells. The distributed RAN entity may start a time alignment timer (TAT) associated with the TAG for the wireless device. The distributed RAN entity may transmit, to a central RAN entity, a first message associated with the wireless device when the TAT expires.

The first message may indicate at least one of: expiration of the TAT associated with the TAG; a notification to release hybrid automated repeat request (HARD) uplink resource configurations for the one or more cells; a notification to release physical uplink control channel (PUCCH) configurations for the one or more cells; a notification to release a sounding reference signal (SRS) configurations for the one or more cells; a notification to clear configured downlink assignments for the one or more cells; a notification to clear uplink resource grants for the one or more cells; a notification to consider all running TAT as expired if the TAG is a primary TAG; and/or the like. Example embodiments may increase connection reliability and decrease interference by enhancing parameter configuration and/or release by a gNB-CU and a gNB-DU for a wireless device.

In an example, the central RAN entity may apply, for the one or more cells in response to the first message, a default physical channel configuration for at least one of: channel quality information (CQI) report configurations; uplink resource scheduling request configurations; dedicated uplink SRS configurations; and/or the like. In an example, the distributed RAN entity may receive, from the central RAN entity, a second message indicating a first wireless device context release request for the wireless device. The first wireless device context release request may be configured at least based on the first message. The central radio access network entity may transmit, to a core network entity, a third message indicating a second wireless device context release request for the wireless device at least based on the first message. The second wireless device context release request may be at least associated with an interface connection between the central radio access network entity and the core network entity for the wireless device.

In an example, the central RAN entity and/or the distributed RAN entity may release a wireless device context for the wireless device in response to the first wireless device context release request. The wireless device context may comprise one or more data radio bearers; one or more logical channels; one or more security configuration parameters; one or more information associated with the wireless device; and/or the like.

In an example, when a gNB is split into a gNB-CU and a gNB-DU, a gNB-CU may provide at least an RRC layer. A gNB-DU may provide at least one of a physical layer and/or a MAC layer. In existing technologies, the gNB-DU may not process the RRC configuration parameters. The gNB-DU may be transparently transmit the RRC configuration parameters. In an example, a gNB-DU may determine lower layer configuration parameters of a wireless device. A gNB-CU may determine upper layer configuration parameters. A gNB-CU may transmit RRC configuration parameters (e.g. lower layer and/or upper layer configuration parameters) to a wireless device via gNB-DU. The gNB-DU is unaware of a delivery timing of configuration parameters to the wireless device. The wireless device may transmit a confirmation message to the gNB-DU confirming the RRC configuration parameters. The gNB-DU may not process the confirmation. The gNB-DU may be transparently transmit the confirmation.

In existing technologies, since a gNB-DU transparently communicates RRC messages, a gNB-DU may not be aware when the wireless device implements the configuration parameters and is ready for communication with the gNB-DU using the configuration parameters. This creates timing delays in gNB-DU and wireless device. Implementation of existing parameter configuration and/or application mechanisms of a gNB-DU may increase misaligned parameter configurations for wireless devices. This may additionally cause unsynchronized behavior between gNB-DU and UE. There is a need to enhance signaling between gNB-DU, gNB-CU and the wireless device to improve implementation of configuration parameters. Example embodiments introduces one or more signaling messages to resolve this issue. Example embodiments enhances implementation of RRC configuration parameters.

In an example embodiment, a central radio access network (RAN) entity may transmit a radio resource control (RRC) message to a wireless device via a distributed RAN entity. The RRC message may comprise one or more radio resource configuration parameters associated with one or more cells serving the wireless device, the one or more cells served by the distributed RAN entity. The one or more radio resource configuration parameters may be associated with one or more configurations in the distributed RAN entity. To apply the one or more configurations for the wireless device, the distributed RAN entity may need to confirm that the one or more radio resource configuration parameters associated with the one or more configurations have been transmitted to the wireless device and/or have been complied by the wireless device. In an example, the distributed RAN entity may make this confirmation by decoding the RRC message transmitted by the central RAN entity to the wireless device via the distributed RAN entity. In an example, the distributed RAN entity may make this confirmation by receiving a confirmation message from the central RAN entity, the confirmation message transmitted at least based on a response message for the RRC message from the wireless device to the central RAN entity.

In an example, the distributed RAN entity may make this confirmation by receiving an RRC configuration index via an F1 message conveying the RRC message and/or via an RRC response message of the RRC message from the wireless device, wherein the RRC configuration index may be exchanged between the distributed RAN entity and the central RAN entity when configuring the one or more radio resource configuration parameters.

In an example, the distributed RAN entity may make this confirmation by starting an RRC timer after forwarding the RRC message to the wireless device. If the RRC timer expires, the distributed RAN entity may consider the one or more radio resource configuration parameters may (or may not) be complied by the wireless device. In an example, if the distributed RAN entity receives an RRC response message for the RRC message before the RRC timer expires, the distributed RAN entity may consider the one or more radio resource configuration parameters may be complied by the wireless device.

In an example, the distributed RAN entity may make this confirmation by receiving an RRC configuration confirmation message for the one or more radio resource configuration parameters of the RRC message from the wireless device. The RRC configuration message may indicate that the wireless device complies the one or more radio resource configuration parameters. The RRC configuration message may be transmitted via a medium access control (MAC) control element and/or a physical layer indication.

In an example, a base station may comprise a central RAN entity and one or more distributed RAN entities. A distributed RAN entity of the one or more distributed RAN entity may serve at least one cell. The central RAN entity may provide at least a radio resource control (RRC) functionality and/or a packet data convergence protocol (PDCP) layer functionality. The distributed RAN entity may provide at least a radio link control (RLC) layer functionality, a medium access control (MAC) layer functionality, and/or a physical (PHY) layer functionality.

An F1 interface (e.g. a logical direct interface) may be setup between the central RAN entity and the distributed RAN entity. The F1 interface may comprise a user plane interface and/or a control plane interface. RRC messages may be transmitted from the central RAN entity to a wireless device or from a wireless device to the central RAN entity via the distributed RAN entity. Data packets may be transmitted from the central RAN entity to a wireless device or from a wireless device to the central RAN entity via the distributed RAN entity. In an example, data packets transmitted over the F1 interface may be PDCP layer packets. In an example, RRC messages transmitted over the F1 interface may be conveyed by an F1 interface message, and/or the RRC messages conveyed by the F1 interface message may be one or more PDCP layer packets associated with one or more signaling radio bearers.

Figure 20:
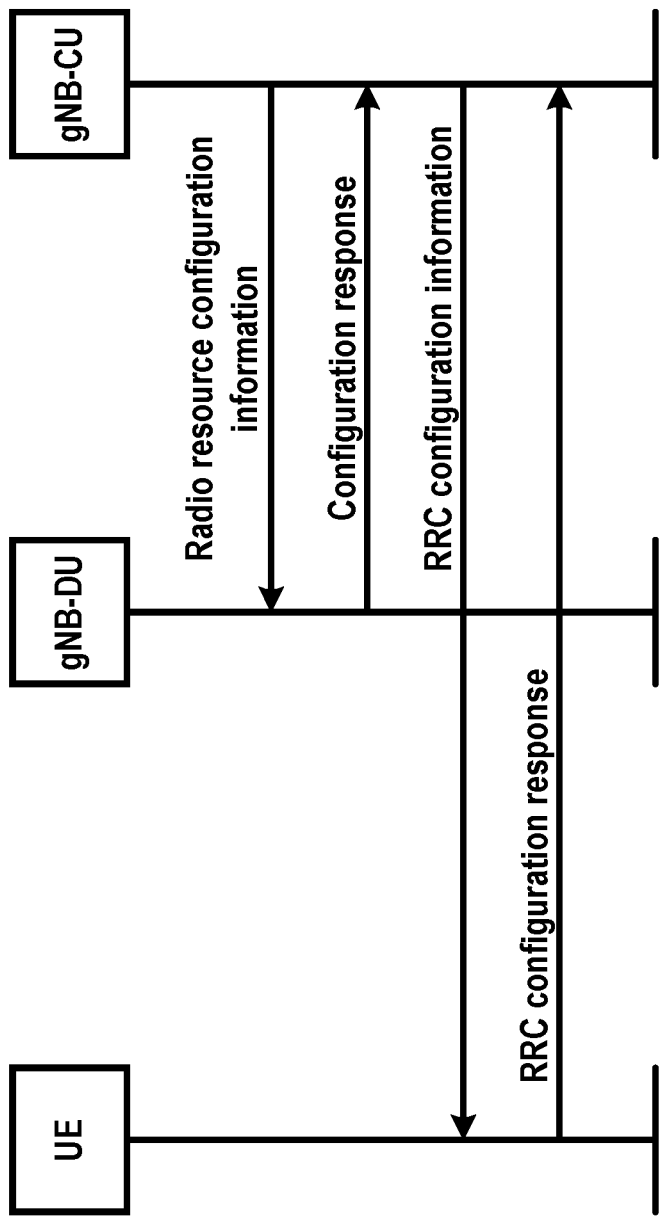
FIG. 20 is an example diagram of an aspect of an embodiment of the present disclosure.

In an example embodiment, as shown in FIG. 20, a wireless device may be served by a base station comprising a central RAN entity and a distributed RAN entity. The distributed RAN entity of the base station may serve the wireless device with one or more serving cells. The distributed RAN entity and the central RAN entity may be connected via a F1 interface, which may be employed for data transmission and/or control message transmission.

In an example, the central RAN entity may transmit, to the distributed RAN entity, a first message comprising a radio resource configuration information associated with a first cell for the wireless device. The first cell may be one of the one or more serving cells served by the distributed RAN entity. The first message may be transmitted via the F1 interface. In an example, the radio resource configuration information may be a request for a cell activation/deactivation, cell configurations, radio resource configurations, radio transmission power configurations, sidelink communication configurations, and/or the like configurations of the distributed RAN entity and/or the first cell. The radio resource configuration information may be associated with the wireless device. In an example, the radio resource configuration information may comprise configuration parameters determined by the central RAN entity, and/or configuration request for configurations determined by the distributed RAN entity.

In an example, if the radio resource configuration information comprises a cell activation request of the first cell for the wireless device, the radio resource configuration information may comprise a request of cell activation and/or configuration parameters associated with the cell activation, e.g. a random access (RA) information for the wireless device (e.g. a preamble index, an RA resource scheduling).

In an example, if the radio resource configuration information is for a periodic resource assignment for the wireless device on the first cell (e.g. semi-persistent scheduling, grant free resource scheduling, and/or the like), the radio resource configuration information may comprise a request indication of periodic resource assignment and/or configuration parameters associated with the periodic resource assignment, e.g. a periodic resource scheduling information (e.g. semi-persistent scheduling, grant free resource scheduling, and/or the like) such as a periodicity, resource frequency information, resource block indicator, subframe indicator, TTI (numerology) indicator, and/or the like.

In an example, if the radio resource configuration information is for a sidelink communication of the wireless device with other wireless device in at least the first cell, the radio resource configuration information may comprise a request for sidelink resource configurations and/or configuration parameters associated with the sidelink resource scheduling.

In an example, the distributed RAN entity may transmit, to the central RAN entity, a second message in response to the first message. The second message may be based on one or more elements of the first message. The second message may be a response message to one or more requests indicated in the first message. The second message may be transmitted via the F1 interface. In an example, the second message may comprise an acknowledge of one or more requests and/or suggested configurations from the central RAN entity in the first message. The distributed RAN entity may apply one or more configurations suggested in the first message and/or apply configurations requested in the first message for the wireless device and/or the first cell. In an example, the second message may be an acknowledge of a cell activation/deactivation, cell configurations, radio resource configurations, radio transmission power configurations, sidelink communication configurations, and/or the like configurations of the distributed RAN entity and/or the first cell.

In an example, the second message may be associated with the wireless device. The second message may comprise configuration parameters, for the first cell and/or the wireless device, applied in the distributed RAN entity (e.g. for the first cell, other serving cells, and/or the wireless device) and/or determined by the distributed RAN entity at least based on the first message. The second message may comprise an acknowledge indicating that one or more configuration parameters in the first message are applied at least to the first cell and/or the wireless device configurations.

In an example, if the second message comprises a cell activation indication of the first cell for the wireless device, the second message may comprise an indication of cell activation and/or configuration parameters (applied and/or to be applied to the first cell and/or the wireless device) associated with the cell activation, e.g. a random access (RA) information for the wireless device (e.g. a preamble index, an RA resource scheduling).

In an example, if the second message is for a periodic resource assignment indication for the wireless device on the first cell (e.g. semi-persistent scheduling, grant free resource scheduling, and/or the like), the second message may comprise a acknowledge indication of periodic resource assignment and/or configuration parameters (applied and/or to be applied to the first cell and/or the wireless device) associated with the periodic resource assignment, e.g. a periodic resource scheduling information (e.g. semi-persistent scheduling, grant free resource scheduling, and/or the like) such as a periodicity, resource frequency information, resource block indicator, subframe indicator, TTI (numerology) indicator, and/or the like.

In an example, if the second message is for a sidelink communication of the wireless device with other wireless device in at least the first cell, the second message may comprise an acknowledge indication for sidelink resource configurations and/or configuration parameters (applied and/or to be applied to the first cell and/or the wireless device) associated with the sidelink resource scheduling.

In an example, the central RAN entity may transmit, to the wireless device, a third message configured at least based on one or more elements of the second message. The third message may be a radio resource control (RRC) message. The third message may be transmitted via the F1 interface to the distributed RAN entity, and the distributed RAN entity may forward the third message to the wireless device via a radio interface (e.g. Uu interface). The third message may comprise an RRC configuration information associated with one or more elements of the radio resource configuration information of the first message and/or one or more elements of the second message. The RRC configuration information may be determined at least based on one or more elements of the second message, e.g. the configuration parameters applied in the distributed RAN entity determined by the distributed RAN entity for the first cell, other serving cells, and/or the wireless device. The RRC configuration information may be determined at least based on the acknowledge indicating that one or more configuration parameters in the first message are applied at least to the first cell and/or the wireless device configurations.

In an example, the RRC configuration information may comprise one or more configuration parameters and/or indications for a cell activation/deactivation, cell configurations, radio resource configurations, radio transmission power configurations, sidelink communication configurations, and/or the like configurations of the distributed RAN entity and/or the first cell.

In an example, if the RRC configuration information comprises a cell addition/modification indication of the first cell for the wireless device, the RRC configuration information may comprise an indication of cell addition and/or configuration parameters associated with the cell addition of the first cell, e.g. a random access (RA) information for the wireless device (e.g. a preamble index, an RA resource scheduling), cell frequency information, one or more beam indexes for one or more beams of the first cell, and/or the like.

In an example, if the RRC configuration information is for a periodic resource assignment for the wireless device on the first cell (e.g. semi-persistent scheduling, grant free resource scheduling, and/or the like), the RRC configuration information may comprise an indication of periodic resource assignment and/or configuration parameters associated with the periodic resource assignment, e.g. a periodic resource scheduling information (e.g. semi-persistent scheduling information, grant free resource scheduling information, and/or the like) such as a periodicity, resource frequency information, resource block indicator, subframe indicator, TTI (numerology) indicator, and/or the like.

In an example, if the RRC configuration information is for a sidelink communication of the wireless device with other wireless device in at least the first cell, the RRC configuration information may comprise an indication for sidelink resource configurations and/or configuration parameters associated with the sidelink resource scheduling on the first cell.

In an example, the wireless device may transmit, to the central RAN entity in response to the third message, a fourth message confirming one or more elements of the RRC configuration information of the third message. In an example, the fourth message may be an RRC message. The fourth message may be transmitted to the distributed RAN entity via a radio interface (e.g. Uu interface), and the distributed RAN entity may forward the fourth message to the central RAN entity via the F1 interface. In an example, the fourth message may indicate one or more acknowledges for one or more elements of the third message.

Figure 21:
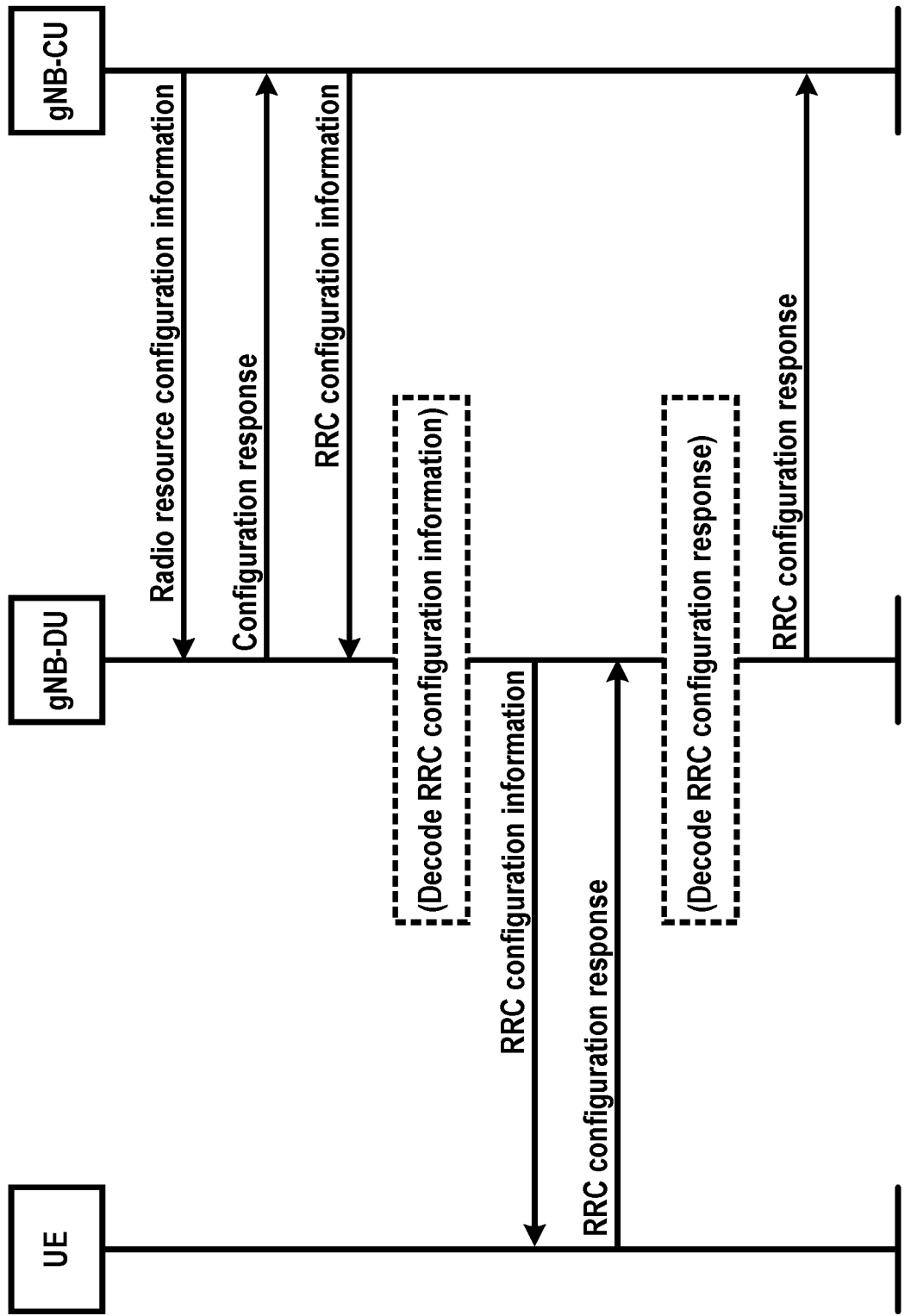
FIG. 21 is an example diagram of an aspect of an embodiment of the present disclosure.

In an example, as shown in FIG. 21 a gNB-DU may decode one or more RRC messages transmitted between a gNB-CU and a wireless device to determine that a wireless device receives (and/or applies) RRC configurations.

In an example, the distributed RAN entity may decode the third message (e.g. the RRC message transmitted to the wireless device). The third message may be transmitted via the F1 interface to the distributed RAN entity, and the distributed RAN entity may forward the third message to the wireless device. In an example, when the central RAN entity transmits the third message to the distributed RAN entity, the central RAN entity may transmit it with an indication indicating that the distributed RAN entity needs to decode the third message. In an example, the third message and/or the indication may be conveyed through an F1 message from the central RAN entity to the distributed RAN entity. The F1 message may comprise at least one of the third message, the indication, a wireless device identifier (e.g. UE ID) of the wireless device, and/or the like. In an example, the F1 message may be an RRC transfer message. The indication may indicates that the third message (i.e. an RRC message transmitted to the wireless device) comprises at least one element necessary to the distributed RAN entity. In an example, the distributed RAN entity may decode the third message without the indication in the F1 message.

In an example, the distributed RAN entity may transmit, to the wireless device, a control message associated with the radio resource configuration information of the first message at least based on the decoding of the third message. The control message may indicate, to the wireless device, an activation of one or more configurations configured based on the radio resource configuration information of the first message. In an example, the control message may indicate a cell activation/deactivation, cell configuration activation, radio resource configuration activation, periodic radio resource configuration activation (e.g. semi-persistent scheduling resource activation, grant free resource activation, and/or the like), radio transmission power configuration activation, sidelink communication configuration activation, and/or the like configuration activation for the distributed RAN entity, the wireless device, and/or the first cell. In an example, the control message may be transmitted via a medium access control (MAC) layer message (e.g. MAC control element), a physical layer message (e.g. physical downlink control channel (PDCCH) order, DCI), and/or the like.

In an example, the distributed RAN entity may decode the fourth message (e.g. the RRC message transmitted by the wireless device to the central RAN entity). The fourth message may be transmitted via a radio interface from the wireless device to the distributed RAN entity, and the distributed RAN entity may forward the fourth message to the central RAN entity. In an example, when the wireless device transmits the fourth message to the distributed RAN entity, the wireless device may transmit it with an indication indicating that the distributed RAN entity needs to decode the fourth message. In an example, the fourth message and/or the indication may be conveyed through a radio interface message from the wireless device to the distributed RAN entity. The radio interface message may comprise at least one of the fourth message, the indication, a wireless device identifier (e.g. UE ID) of the wireless device, and/or the like. In an example, the radio interface message may be an RRC transfer message. The indication may indicates that the fourth message (i.e. a radio interface message of the wireless device) comprises at least one element necessary to the distributed RAN entity. In an example, the distributed RAN entity may decode the fourth message without the indication in the radio interface message.

In an example, the distributed RAN entity may transmit, to the wireless device, a control message associated with the radio resource configuration information of the first message at least based on the decoding of the fourth message. The control message may indicate, to the wireless device, an activation of one or more configurations configured based on the radio resource configuration information of the first message and/or the second message. In an example, the control message may indicate a cell activation/deactivation, cell configuration activation, radio resource configuration activation, periodic radio resource configuration activation (e.g. semi-persistent scheduling resource activation, grant free resource activation, and/or the like), radio transmission power configuration activation, sidelink communication configuration activation, and/or the like configuration activation for the distributed RAN entity, the wireless device, and/or the first cell. In an example, the control message may be transmitted via a medium access control (MAC) layer message (e.g. MAC control element), a physical layer message (e.g. physical downlink control channel (PDCCH) order, DCI), and/or the like.

Figure 19:
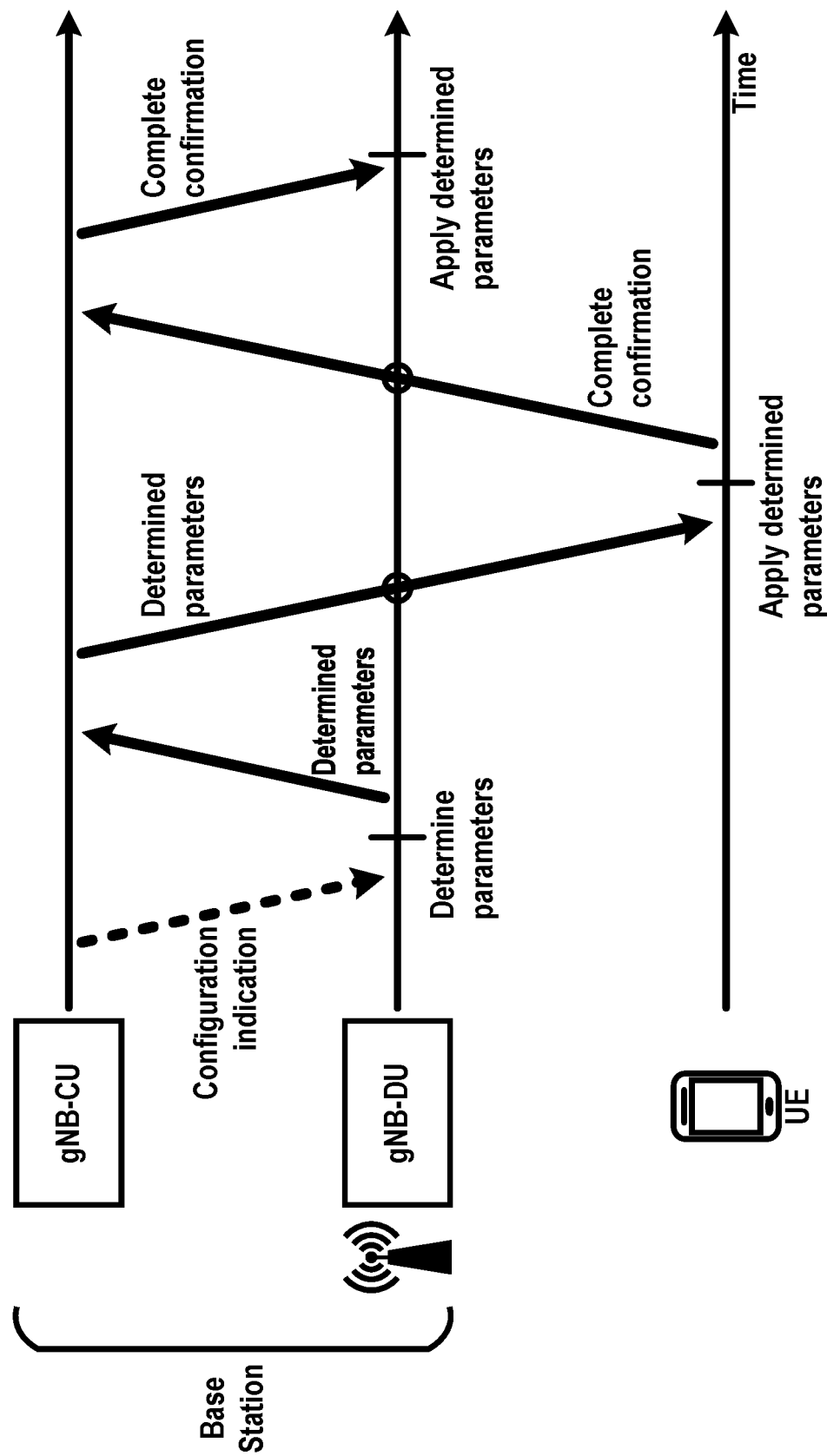
FIG. 19 is an example diagram of an aspect of an embodiment of the present disclosure.
Figure 22:
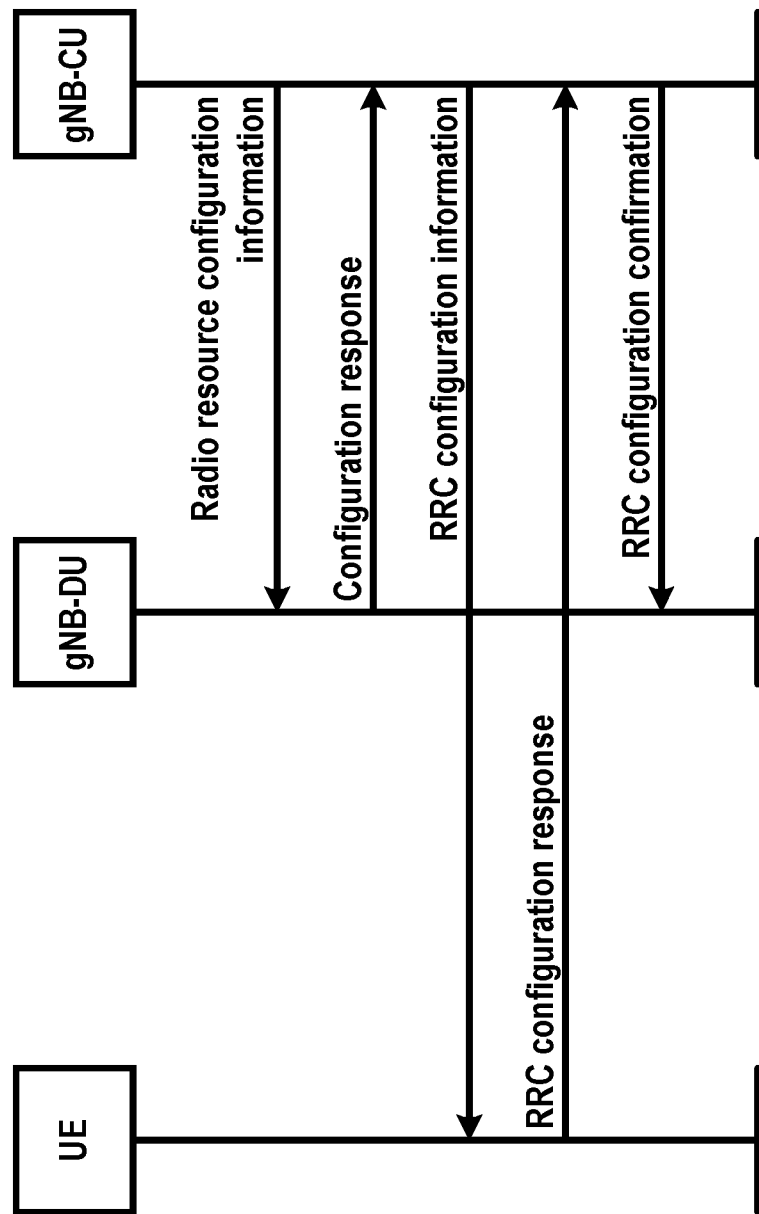
FIG. 22 is an example diagram of an aspect of an embodiment of the present disclosure.

In an example, as shown in FIG. 19 and/or FIG. 22, a gNB-CU (e.g. CU, central unit, central RAN entity) may transmit, to a gNB-DU (e.g. DU, distributed unit, distributed RAN entity) a configuration confirmation message indicating that a wireless device receives (and/or applies) RRC configurations. The gNB-CU may transmit, to the gNB-DU the configuration confirmation message in response to receiving the confirmation message from the UE. Example embodiments enhances implementation of RRC configuration parameters. With implementation of example embodiments, an additional message is introduced to align implementation of RRC configuration parameters among a gNB-CU, a gNB DU, and a wireless device.

In an example, the central RAN entity may transmit, to the distributed RAN entity, a fifth message indicating that the wireless device complies one or more configurations associated with one or more elements of the radio resource configuration information in the first message. The fifth message may be configured at least based on the third message transmission and/or the fourth message reception of the central RAN entity. The fifth message may be transmitted via the F1 interface. In an example, the fifth message may comprise an F1 interface message. In an example, the fifth message may comprise a UE context modification request message. In an example, the fifth message may comprise a complete indication information element (IE) indicating that the wireless device completed one or more configurations of one or more elements of the radio resource configuration information of the first message. In an example, the complete indication IE may comprise an RRC reconfiguration complete indicator IE informing the distributed RAN entity (e.g. gNB-DU) that a configuration procedure for the RRC configuration information was successfully performed by the wireless device.

In an example, the first message, the second message, and/or the fifth message may comprise an RRC configuration index. Based on the RRC configuration index, the distributed RAN entity may recognize that the fifth message is a confirmation of one or more configurations in the radio resource configuration information associated with the first message and/or the second message.

In an example, the distributed RAN entity may transmit, to the wireless device, a control message associated with the radio resource configuration information of the first message at least based on the fifth message received from the central RAN entity. The control message may indicate, to the wireless device, an activation of one or more configurations configured based on the radio resource configuration information of the first message and/or the second message. In an example, the control message may indicate a cell activation/deactivation, cell configuration activation, radio resource configuration activation, periodic radio resource configuration activation (e.g. semi-persistent scheduling resource activation, grant free resource activation, and/or the like), radio transmission power configuration activation, sidelink communication configuration activation, and/or the like configuration activation for the distributed RAN entity, the wireless device, and/or the first cell. In an example, the control message may be transmitted via a medium access control (MAC) layer message (e.g. MAC control element), a physical layer message (e.g. physical downlink control channel (PDCCH) order, DCI), and/or the like.

Figure 23:
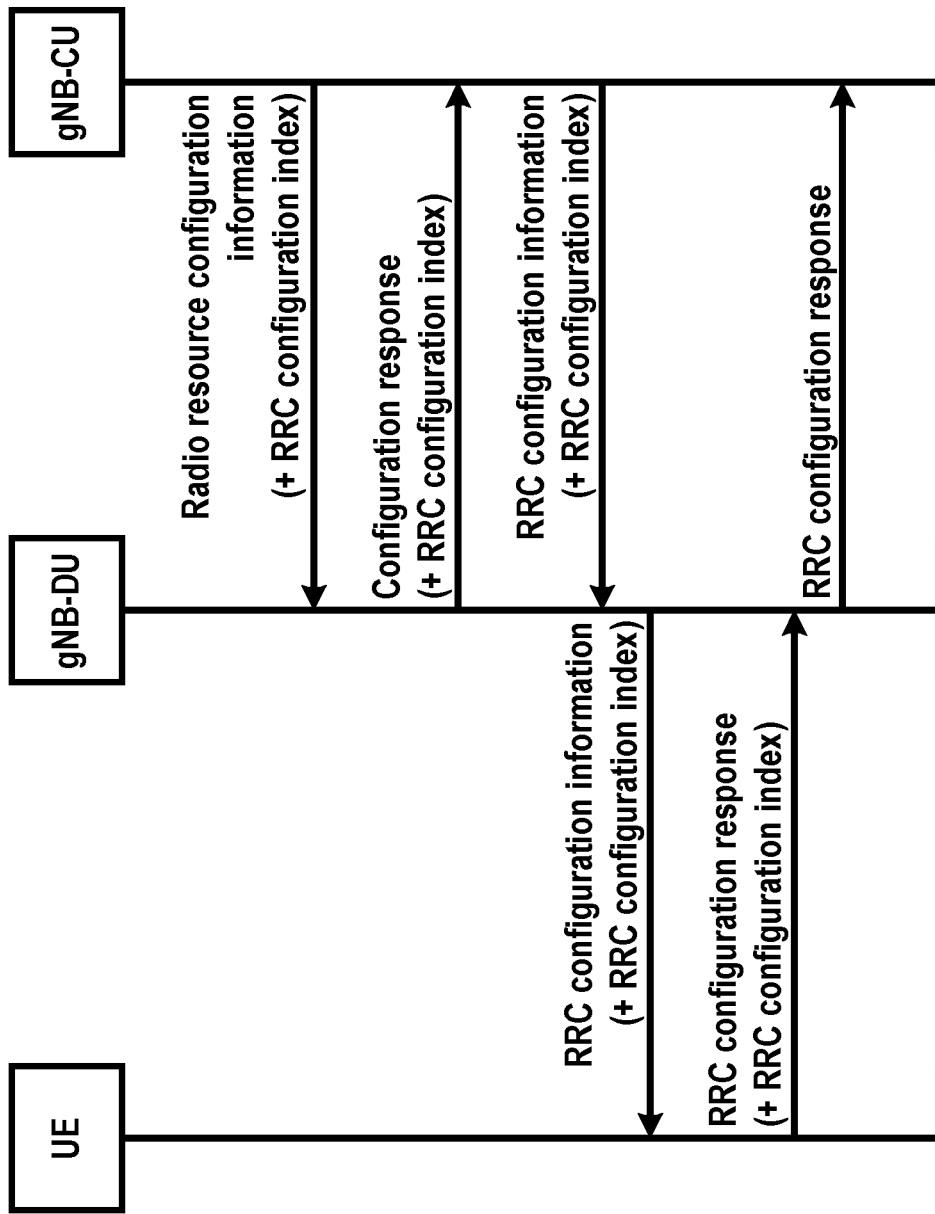
FIG. 23 is an example diagram of an aspect of an embodiment of the present disclosure.

In an example, as shown in FIG. 23, messages for an RRC parameter configuration procedure may comprise an RRC configuration index to identify (and/or distinguish) the RRC parameter configuration procedure.

In an example, the first message and/or the second message may further comprise an RRC configuration index. The RRC configuration index may be associated with the radio resource configuration information in the first message and/or the second message. In an example, when transmitting the third message, the central RAN entity may transmit, to the distributed RAN entity, the RRC configuration index via the F1 interface by adding the RRC configuration index to an F1 message conveying the third message (i.e. an RRC message). The distributed RAN entity may determine, based on the RRC configuration index, that the radio resource configuration information is transmitted to the wireless device.

In an example, when transmitting the fourth message, the wireless device may transmit, to the distributed RAN entity, the RRC configuration index via a radio interface (e.g. signaling radio bearer) by adding the RRC configuration index to at least one packet (e.g. PDCP packet and/or PDCP packet header) conveying the fourth message (i.e. an RRC message). The distributed RAN entity may determine, based on=the RRC configuration index, that the wireless device receives and/or complies the radio resource configuration information.

In an example, the distributed RAN entity may transmit, to the wireless device, a control message associated with the radio resource configuration information of the first message at least based on the RRC configuration index received from the central RAN entity via the F1 index and/or received from the wireless device via the radio interface. The control message may indicate, to the wireless device, an activation of one or more configurations configured based on the radio resource configuration information of the first message and/or the second message. In an example, the control message may indicate a cell activation/deactivation, cell configuration activation, radio resource configuration activation, periodic radio resource configuration activation (e.g. semi-persistent scheduling resource activation, grant free resource activation, and/or the like), radio transmission power configuration activation, sidelink communication configuration activation, and/or the like configuration activation for the distributed RAN entity, the wireless device, and/or the first cell. In an example, the control message may be transmitted via a medium access control (MAC) layer message (e.g. MAC control element), a physical layer message (e.g. physical downlink control channel (PDCCH) order, DCI), and/or the like.

Figure 24:
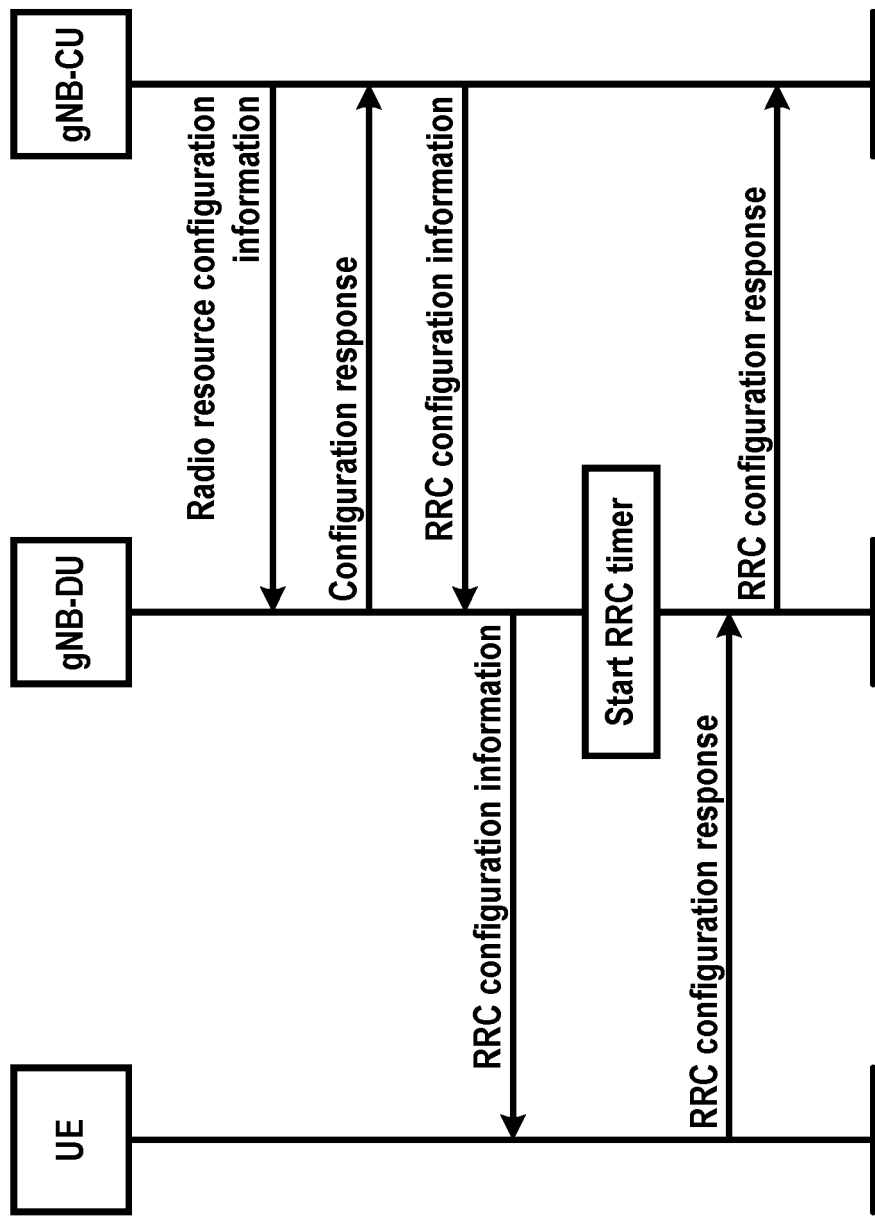
FIG. 24 is an example diagram of an aspect of an embodiment of the present disclosure.

In an example, as shown in FIG. 24, a gNB-DU (e.g. DU, distributed unit, distributed RAN entity) may determine that a wireless device receives (and/or applies) RRC configurations based on an RRC timer.

In an example, the distributed RAN entity may start an RRC timer when forwarding the third message to the wireless device. In an example, the first message, the second message, and/or an F1 message conveying the third message via the F1 message may comprise an RRC configuration index. Based on the RRC configuration index, the distributed RAN entity may recognize that the third message is an RRC message associated with the radio resource configuration information of the first message and/or the second message. The RRC timer may start based on the RRC configuration index when forwarding the third message. In an example, if the RRC timer expires, the distributed RAN entity may consider the radio resource configuration information may be complied by the wireless device.

In an example, if the RRC timer expires, the distributed RAN entity may consider the radio resource configuration information may not be complied by the wireless device, and/or if the distributed RAN entity receives an RRC response message (which may be transmitted with the RRC configuration index) for the RRC message before the RRC timer expires, the distributed RAN entity may consider the radio resource configuration information may be complied by the wireless device.

In an example, the RRC timer may be associated with a processing delay requirement for RRC procedures. The RRC timer may be set to be same to or longer than the processing delay requirement.

In an example, if the distributed RAN entity considers that the wireless device complies at least one of the radio resource configuration information based on the RRC timer expiration and/or the RRC response message before the RRC timer expiration, the distributed RAN entity may transmit, to the wireless device, a control message associated with the radio resource configuration information of the first message and/or the second message. The control message may indicate, to the wireless device, an activation of one or more configurations configured based on the radio resource configuration information of the first message. In an example, the control message may indicate a cell activation/deactivation, cell configuration activation, radio resource configuration activation, periodic radio resource configuration activation (e.g. semi-persistent scheduling resource activation, grant free resource activation, and/or the like), radio transmission power configuration activation, sidelink communication configuration activation, and/or the like configuration activation for the distributed RAN entity, the wireless device, and/or the first cell. In an example, the control message may be transmitted via a medium access control (MAC) layer message (e.g. MAC control element), a physical layer message (e.g. physical downlink control channel (PDCCH) order, DCI), and/or the like.

Figure 25:
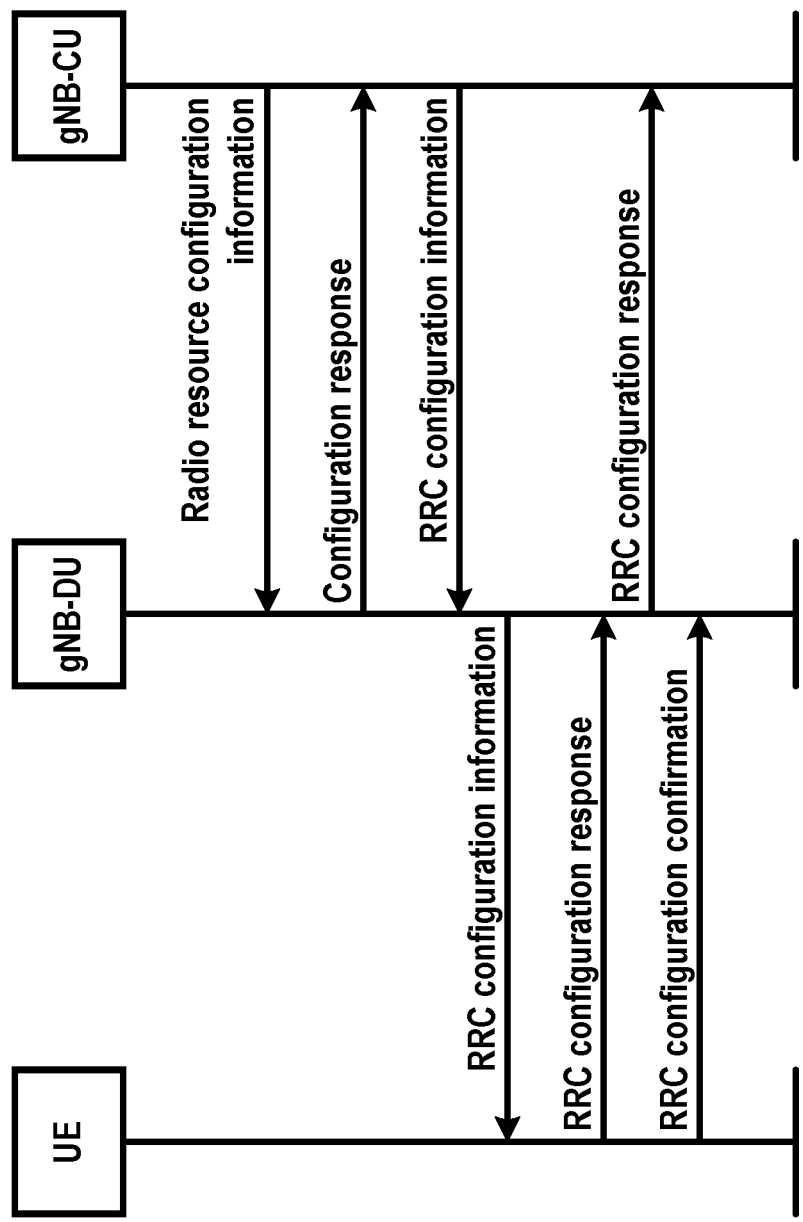
FIG. 25 is an example diagram of an aspect of an embodiment of the present disclosure.

In an example, as shown in FIG. 25, a wireless device may indicate, to a gNB-DU, confirmation of RRC configurations.

In an example, the wireless device may transmit an RRC configuration confirmation indicating that the wireless device complies at least one of the radio resource configuration information of the third message. By receiving the RRC configuration confirmation, the distributed RAN entity may consider that the wireless device complies at least one of configurations of the radio resource configuration information associated with the first message and/or the second message. In an example, the RRC configuration confirmation may be transmitted via a medium access control (MAC) control element and/or a physical layer message.

In an example, the first message, the second message, the third message, and/or the RRC configuration confirmation may comprise an RRC configuration index. Based on the RRC configuration index, the distributed RAN entity may recognize that the RRC configuration confirmation is a confirmation of one or more configurations in the radio resource configuration information associated with the first message and/or the second message.

In an example, if the distributed RAN entity receives the RRC configuration confirmation from the wireless device, the distributed RAN entity may transmit, to the wireless device, a control message associated with the radio resource configuration information of the first message and/or the second message. The control message may indicate, to the wireless device, an activation of one or more configurations configured based on the radio resource configuration information of the first message. In an example, the control message may indicate a cell activation/deactivation, cell configuration activation, radio resource configuration activation, periodic radio resource configuration activation (e.g. semi-persistent scheduling resource activation, grant free resource activation, and/or the like), radio transmission power configuration activation, sidelink communication configuration activation, and/or the like configuration activation for the distributed RAN entity, the wireless device, and/or the first cell. In an example, the control message may be transmitted via a medium access control (MAC) layer message (e.g. MAC control element), a physical layer message (e.g. physical downlink control channel (PDCCH) order, DCI), and/or the like.

Processing delay requirements for RRC procedures: The UE performance requirements for RRC procedures may be specified in the following tables, by means of a value N, N=the number of 1 ms subframes from the end of reception of the E-UTRAN→UE message on the UE physical layer up to when the UE may be ready for the reception of uplink grant for the UE→E-UTRAN response message with no access delay other than the TTI-alignment (e.g. excluding delays caused by scheduling, the RA procedure or physical layer synchronization).

FIG. 26 and/or FIG. 27 shows a table of example UE performance requirements for RRC procedures for wireless devices (UEs).

In an example, a central RAN entity may transmit, to a distributed RAN entity, a first message comprising a radio resource configuration information associated with a first cell for a wireless device. The central RAN entity may receive, from the distributed RAN entity, a second message in response to the first message. The central RAN entity may transmit, to the wireless device via the distributed RAN entity, a third message at least based on the second message. The third message may comprise a radio resource control (RRC) configuration information associated with one or more elements of the radio resource configuration information. The central RAN entity may receive, from the wireless device via the distributed RAN entity, a fourth message confirming one or more elements of the RRC configuration information in response to the third message.

In an example, the distributed RAN entity may decode the fourth message, and/or may transmit, to the wireless device, a control message associated with the radio resource configuration information in response to the fourth message. In an example, the fourth message may be transmitted to the wireless device via the distributed RAN entity. An F1 message may convey the fourth message from the central RAN entity to the distributed RAN entity. The F1 message may comprise the fourth message and an indication indicating that the distributed RAN entity needs to decode the fourth message. The distributed RAN entity may decode the fourth message based on the indication.

In an example, the distributed RAN entity may receive, from the central radio access network entity, a fifth message indicating that the central radio access network entity transmitted the radio resource control configuration information to the wireless device and/or received response message. The distributed RAN entity may transmit, to the wireless device, a control message associated with the radio resource configuration information in response to the fifth message.

In an example, the radio resource configuration information may comprise: a secondary cell addition/modification/release request; a periodic resource configuration request; a request for configuring one or more radio resource; configurations of one or more radio resources; and/or the like. The control message may be transmitted via at least one of: a medium access control (MAC) control element (CE); a physical downlink control channel (PDCCH) order; and/or the like. In an example, the control message may comprise a secondary cell activation command, a periodic resource configuration activation command, and/or the like.

In an example, when a gNB is split into a gNB-CU and a gNB-DU, a gNB-CU may provide at least an RRC layer and/or a gNB-DU may provide at least one of a physical layer and/or a MAC layer. In an example, a gNB may determine beam configuration parameters based on physical layer status information for wireless devices. In existing technologies, a radio resource control function and a physical layer monitoring and configuration function are performed in different base station units (e.g. a gNB-CU and a gNB-DU). Implementation of existing beam configuration and/or application mechanisms of a gNB-CU and a gNB-DU may increase misaligned parameter configurations for wireless devices. The existing technology may decrease radio channel reliability and increase a packet transmission/reception failure rate of wireless devices. The existing technology may increase call dropping rate and/or packet transmission delay when a gNB comprises a gNB-CU and a gNB-DU. There is a need to enhance signaling among a gNB-DU, a gNB-CU and a wireless device to configure beams for a wireless device.

Example embodiments enhance beam configuration and/or application mechanisms of a gNB-CU and/or gNB-DU when a gNB-DU provides lower layer functions of a gNB and a gNB-CU provides upper layer functions. Example embodiments may enhance interactions of a gNB-CU and a gNB-DU to configure beam configuration parameters and/or apply configured beam parameters for wireless devices and/or cells. Example embodiments may increase connection reliability and decrease packet transmission/reception delay of wireless devices by enhancing beam parameter configuration and/or parameter application mechanism of a gNB-CU and a gNB-DU for wireless devices and/or cells.

A NR (New Radio) may support both single beam and multi-beam operations. In a multi-beam system, a gNB may need to perform a downlink beam sweeping to provide coverage for DL synchronization signals (SSs) and common control channels. To enable UEs to access the cell, the UEs may need the similar sweeping for UL direction.

In the single beam scenarios, the network may configure time-repetition within one synchronization signal (SS) block, which may comprise at least PSS (Primary synchronization signal), SSS (Secondary synchronization signal), and PBCH (Physical broadcast channel), in a wide beam. In multi-beam scenarios, the network may configure at least some of these signals and physical channels (e.g. SS Block) in multiple beams such that a UE identifies at least OFDM symbol index, slot index in a radio frame and radio frame number from an SS block.

Figure 31:
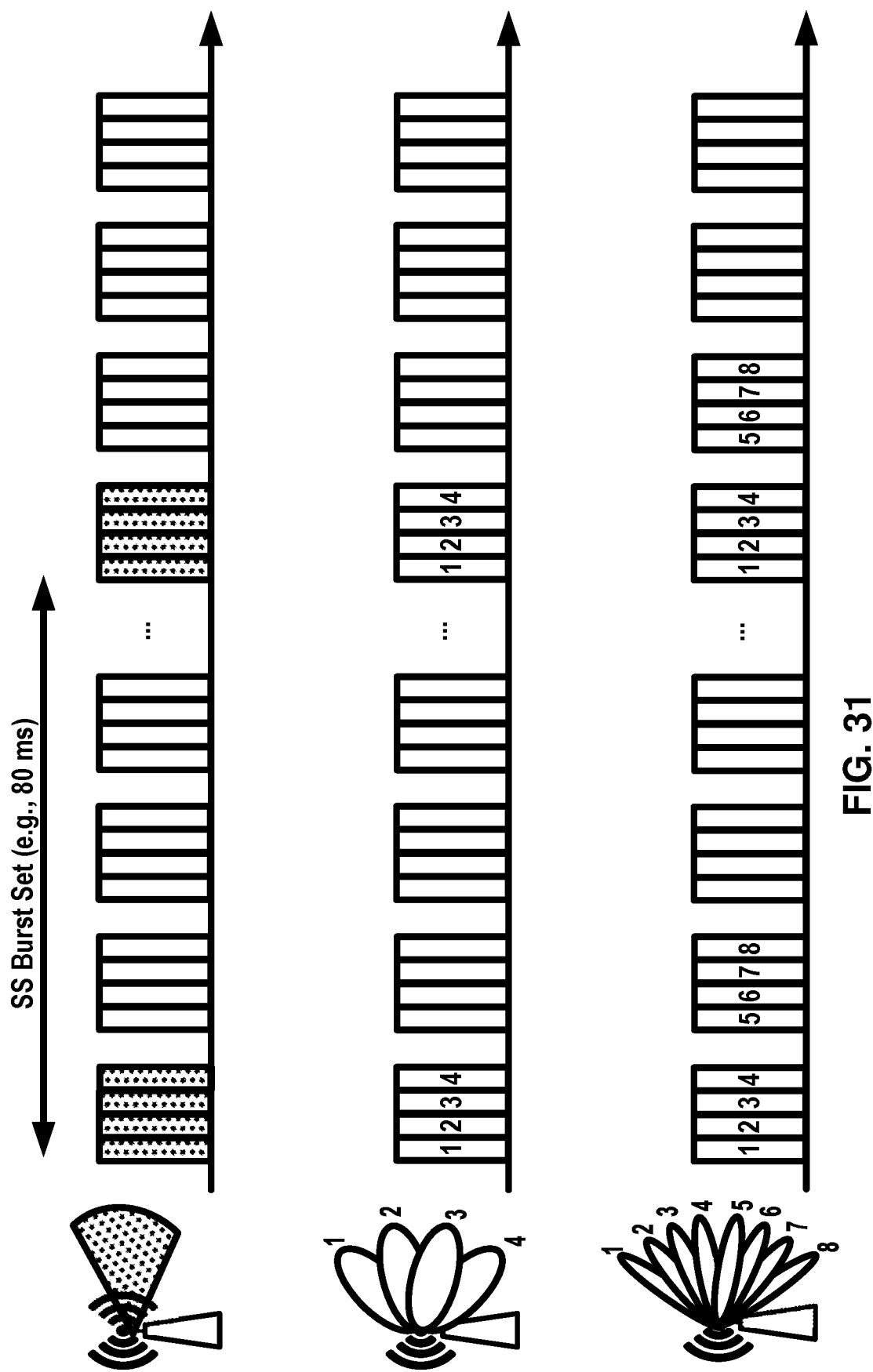
FIG. 31 is an example diagram of an aspect of an embodiment of the present disclosure.

An RRC_INACTIVE or RRC_IDLE UE may need to assume that an SS Block may form an SS Block Set and, an SS Block Set Burst, having a given periodicity. In multi-beam scenarios, the SS Block may be transmitted in multiple beams, together forming an SS Burst. If multiple SS Bursts are needed to transmit beams, these SS Bursts together may form an SS Burst Set as illustrated in FIG. 31. FIG. 31 illustrates examples of different configurations of an SS Burst Set. Top: Time-repetition within one SS Burst in a wide beam. Middle: Beam-sweeping of a small number of beams using one SS Burst in the SS Burst Set. Bottom: Beam-sweeping of a larger number of beams using more than one SS Burst in the SS Burst Set to form a complete sweep.

In the multi-beam scenario, for the same cell, PSS/SSS/PBCH may be repeated to support cell selection/reselection and initial access procedures. There may be some differences in the conveyed PRACH configuration implied by the TSS (Tertiary synchronization signal) on a beam basis within an SS Burst. Under the assumption that PBCH carries the PRACH configuration, a gNB may broadcast PRACH configurations possibly per beam where the TSS may be utilized to imply the PRACH configuration differences.

Figure 32:
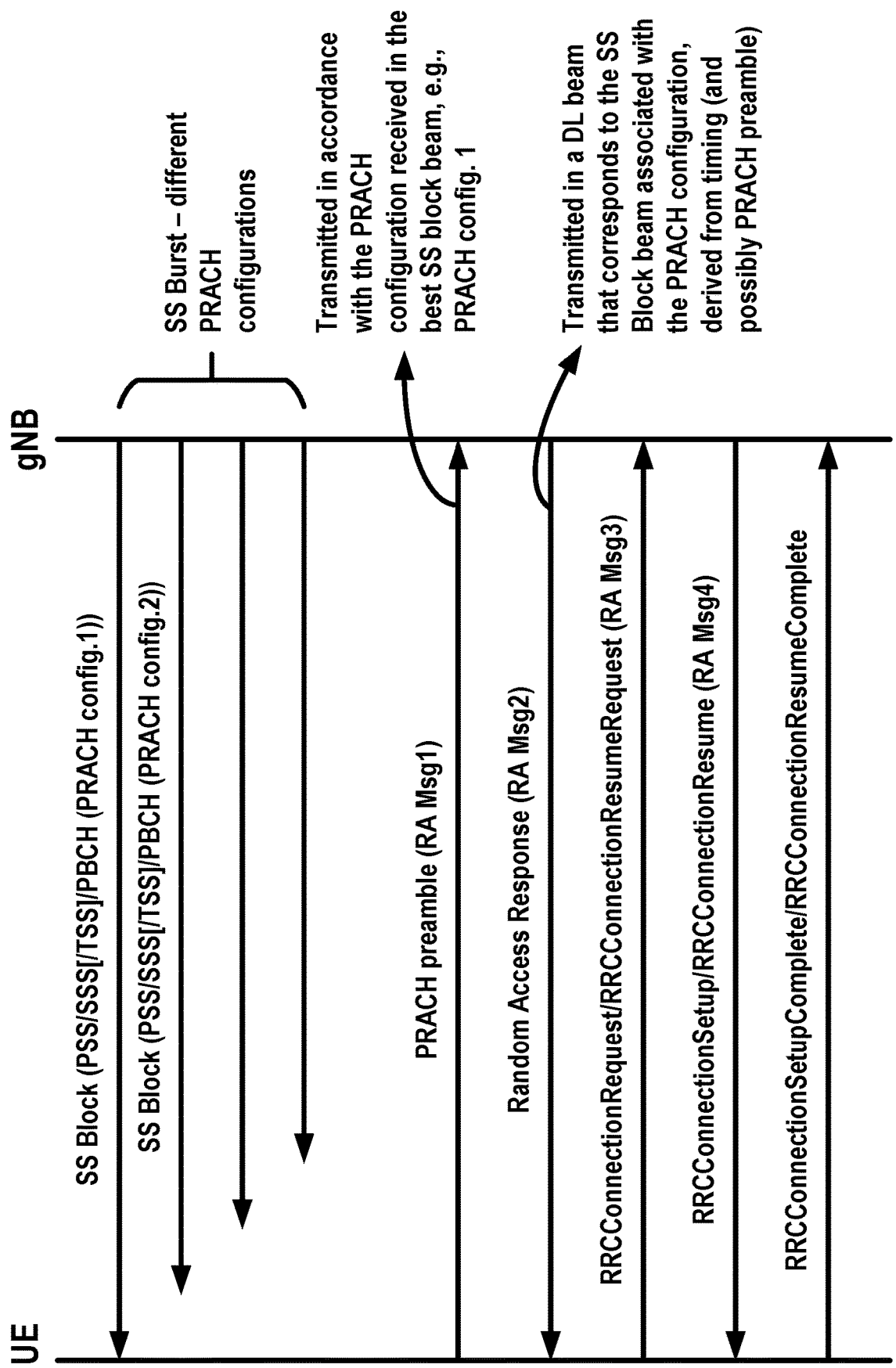
FIG. 32 is an example diagram of an aspect of an embodiment of the present disclosure.

FIG. 32 illustrates an example of an RA procedure comprising broadcasting multiple SS blocks.

In an example, the base station may transmit to a wireless device one or more messages comprising configuration parameters of one or more cells. The configuration parameters may comprise parameters of a plurality of CSI-RS signal format and/or resources. Configuration parameters of a CSI-RS may comprise one or more parameters indicating CSI-RS periodicity, one or more parameters indicating CSI-RS subcarriers (e.g. resource elements), one or more parameters indicating CSI-RS sequence, and/or other parameters. Some of the parameters may be combined into one or more parameters. A plurality of CSI-RS signals may be configured. In an example, the one or more message may indicate the correspondence between SS blocks and CSI-RS signals. The one or more messages may be RRC connection setup message, RRC connection resume message, and/or RRC connection reconfiguration message. In an example, a UE in RRC-Idle mode may not be configured with CSI-RS signals and may receive SS blocks and may measure a pathloss based on SS signals. A UE in RRC-connected mode, may be configured with CSI-RS signals and may be measure pathloss based on CSI-RS signals. In an example, a UE in RRC inactive mode may measure the pathloss based on SS blocks, e.g. when the UE moves to a different base station that has a different CSI-RS configuration compared with the anchor base station.

Example PRACH Burst/RACH Resource Partitioning

Figure 33:
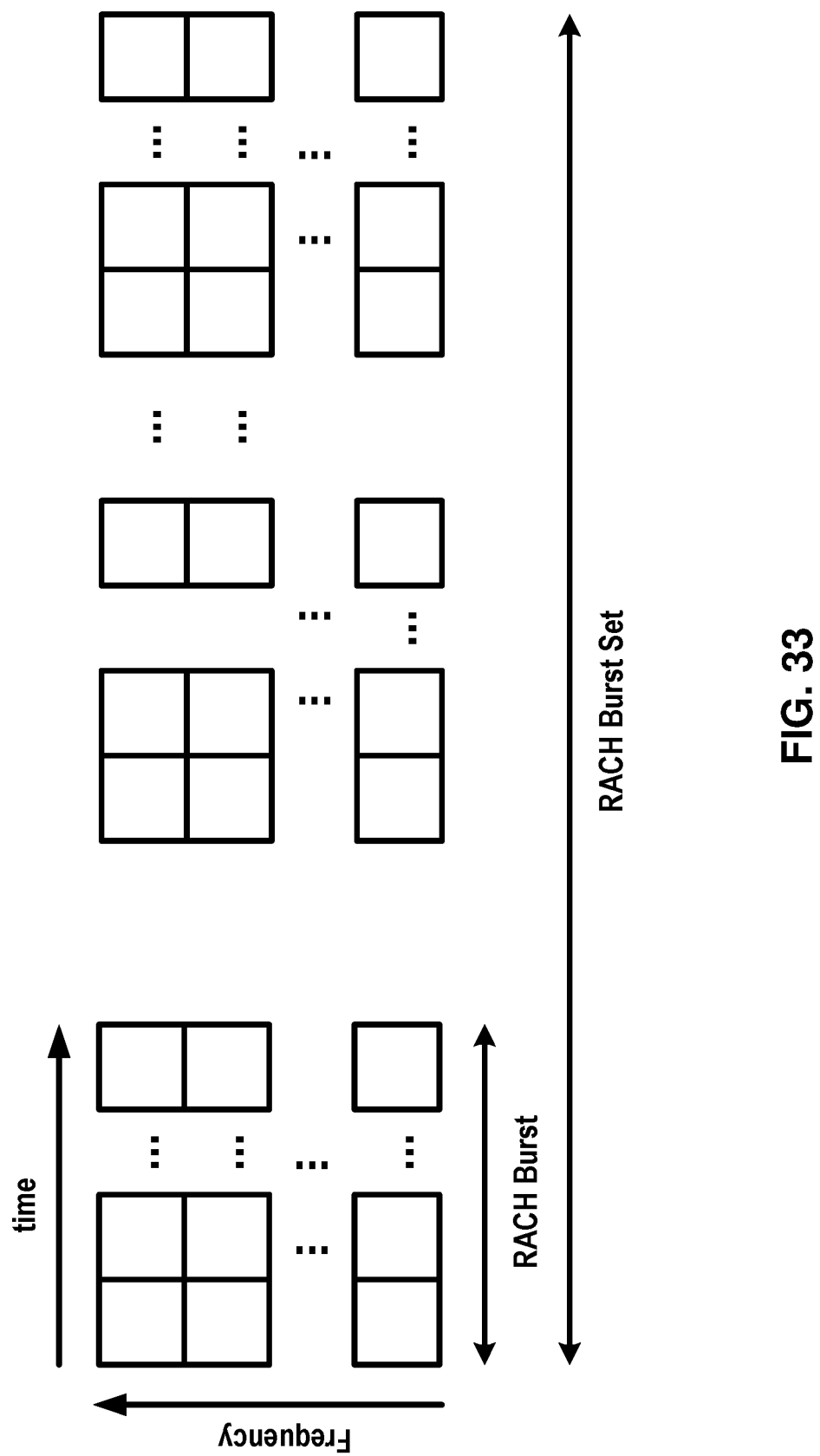
FIG. 33 is an example diagram of an aspect of an embodiment of the present disclosure.

In a multi-beam system, a NR may configure different types of PRACH resources that may be associated with SS blocks and/or DL beams. In NR, a PRACH transmission occasion may be defined as the time-frequency resource on which a UE transmits a preamble using the configured PRACH preamble format with a single particular Tx beam and for which gNB performs PRACH preamble detection. One PRACH occasion may be used to cover the beam non-correspondence case. gNB may perform RX sweep during PRACH occasion as UE TX beam alignment is fixed during single occasion. A PRACH burst may mean a set of PRACH occasions allocated consecutively in time domain, and a PRACH burst set may mean a set of PRACH bursts to enable full RX sweep. FIG. 33 illustrates an example of configured PRACH occasion, PRACH burst, and PRACH burst set. FIG. 33 illustrates an example of a RACH Occasion, RACH Burst and RACH Burst Set.

There may be an association between SS blocks (DL signal/channel) and PRACH occasion and a subset of PRACH preamble resources. One PRACH occasion may comprise a set of preambles. In multi beam operation, the gNB may need to know which beam or set of beams it may use to send RAR and the preambles may be used to indicate that. NR may configure following partitioning and mappings in multi beam operation:

The timing from SS block to the PRACH resource may be indicated in the MIB. In an example, different TSS may be used for different timings such that the detected sequence within TSS indicates the PRACH resource. This PRACH configuration may be specified as a timing relative to the SS block, and may be given as a combination of the payload in the MIB and another broadcasted system information.

Association between SS block and a subset of RACH resources and/or a subset of preamble indices may be configured so that TRP may identify the best DL beam for a UE according to resource location or preamble index of received preamble. An association may be independent and at least either a subset of RACH resources or subset of preamble indices may not be allowed to be associated with multiple SS blocks.

Figure 34:
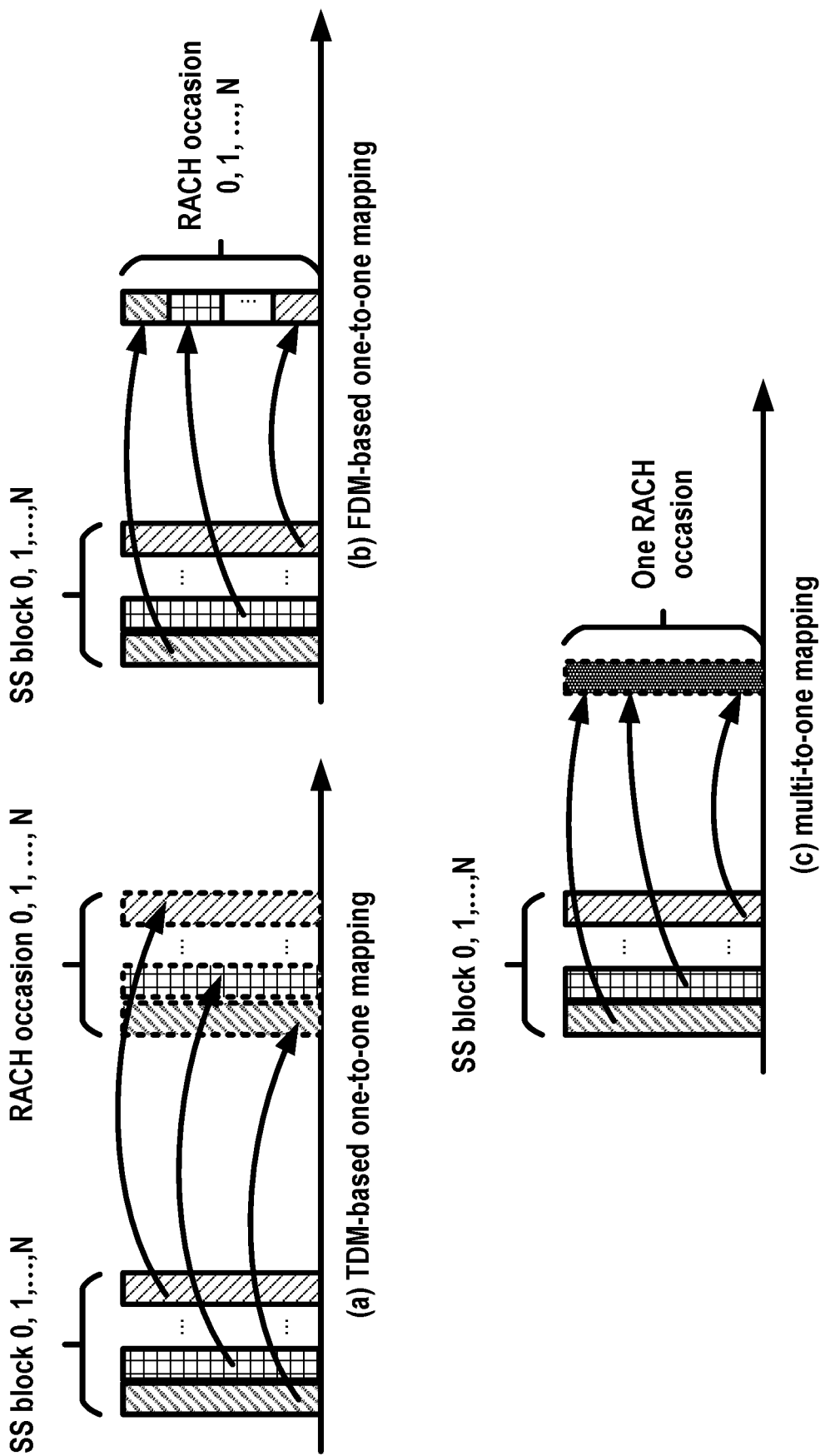
FIG. 34 is an example diagram of an aspect of an embodiment of the present disclosure.

Example SS-Block Specific PRACH Preamble Resources:

PRACH resources may be partitioned on SS-blocks basis in multiple beams operation. There may be one to one and/or many to one mapping between SS-blocks and PRACH occasions. FIG. 34 illustrates an example of TDD (FIG. 34(a))/FDD (FIG. 34(b)) based one to one mapping and multi-to-one mapping (FIG. 34(c)) between SS-blocks and PRACH occasions.

UE may detect SS-block based on DL synchronization signals and differentiate SS-blocks based on the time index. With one-to-one mapping of beam or beams used to transmit SS-block and a specific PRACH occasion, the transmission of PRACH preamble resource may be an indication informed by a UE to gNB of the preferred SS-block. This way the PRACH preamble resources of single PRACH occasion may correspond to specific SS-block and mapping may be done based on the SS-block index. There may be one to one mapping between an SS-block beam and a PRACH occasion. There may not be such mapping for the SS-block periodicity and RACH occasion periodicity.

Depending on the gNB capability (e.g. the used beamforming architecture), there may not be one to one mapping between single SS-block and single RACH occasion. In case beam or beams used for transmitting SS-block and receiving during RACH occasion do not correspond directly, e.g., gNB may form receive beams that cover multiple SS-blocks beams, the preambles of PRACH occasion may be divided between the different SS-blocks in a manner that a subset of PRACH preambles map to specific SS-block. FIG. 34 illustrates an example of TDM and FDM mapping of PRACH resources. Example beam-specific PRACH resources:

With beam-specific PRACH resources, a gNB DL TX beam may be associated with a subset of preambles. The beam specific PRACH preambles resources may be associated with DL TX beams that are identified by periodical beam and cell specific CSI-RS for L3 Mobility (same signals may be used for L2 beam management/intra-cell mobility as well). A UE may detect the beams without RRC configuration, e.g., reading the beam configuration from minimum SI (MIB/SIB).

Figure 35:
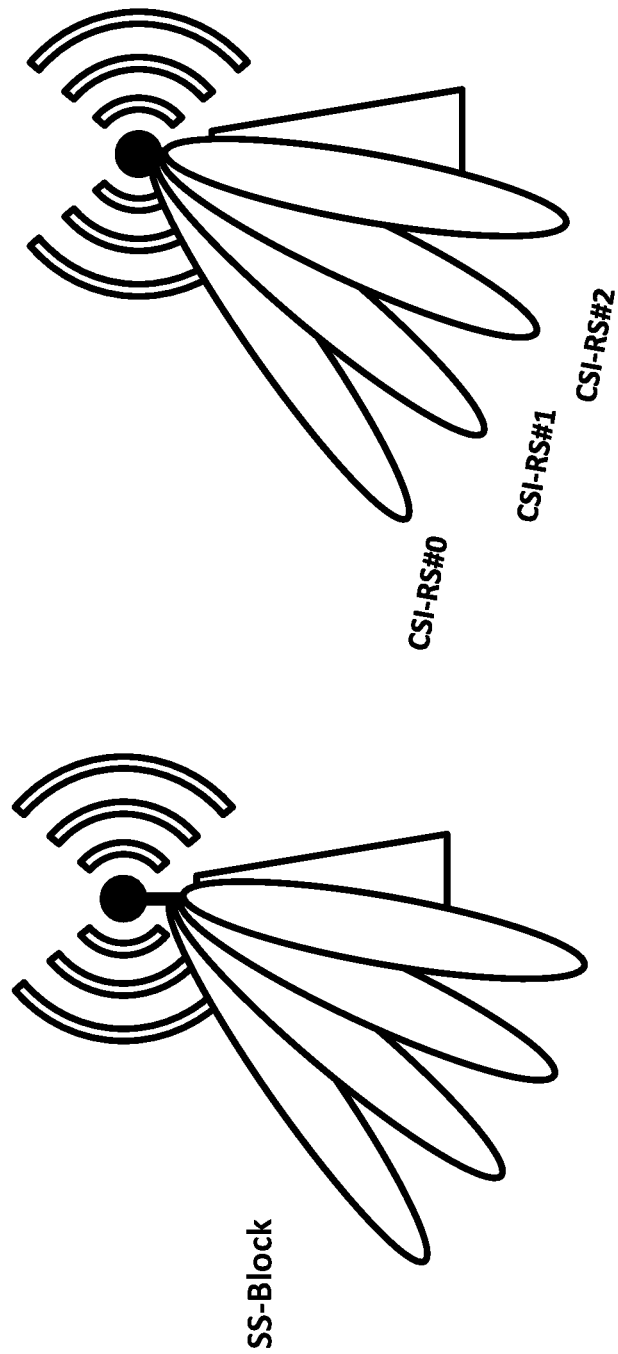
FIG. 35 is an example diagram of an aspect of an embodiment of the present disclosure.

The PRACH resource mapping to specific beams may use SS-block association. Specific beams may be associated with the beams used for transmitting SS-block as illustrated in FIG. 35. In FIG. 35, gNB may transmit SS-block using one or multiple beams (in case of analogue/hybrid beamforming), but individual beams may not be detected. From the UE perspective, this is a single beam transmission. In FIG. 35, gNB may transmit CSI-RS (for Mobility) using individual beams associated with specific SS-block. A UE may detect individual beams based on the CSI-RS.

FIG. 35 illustrates an example of one or more beams configured with an SS block and FIG. 35 illustrates an example of one or more beams configured with CSI-RS.

Figure 36:
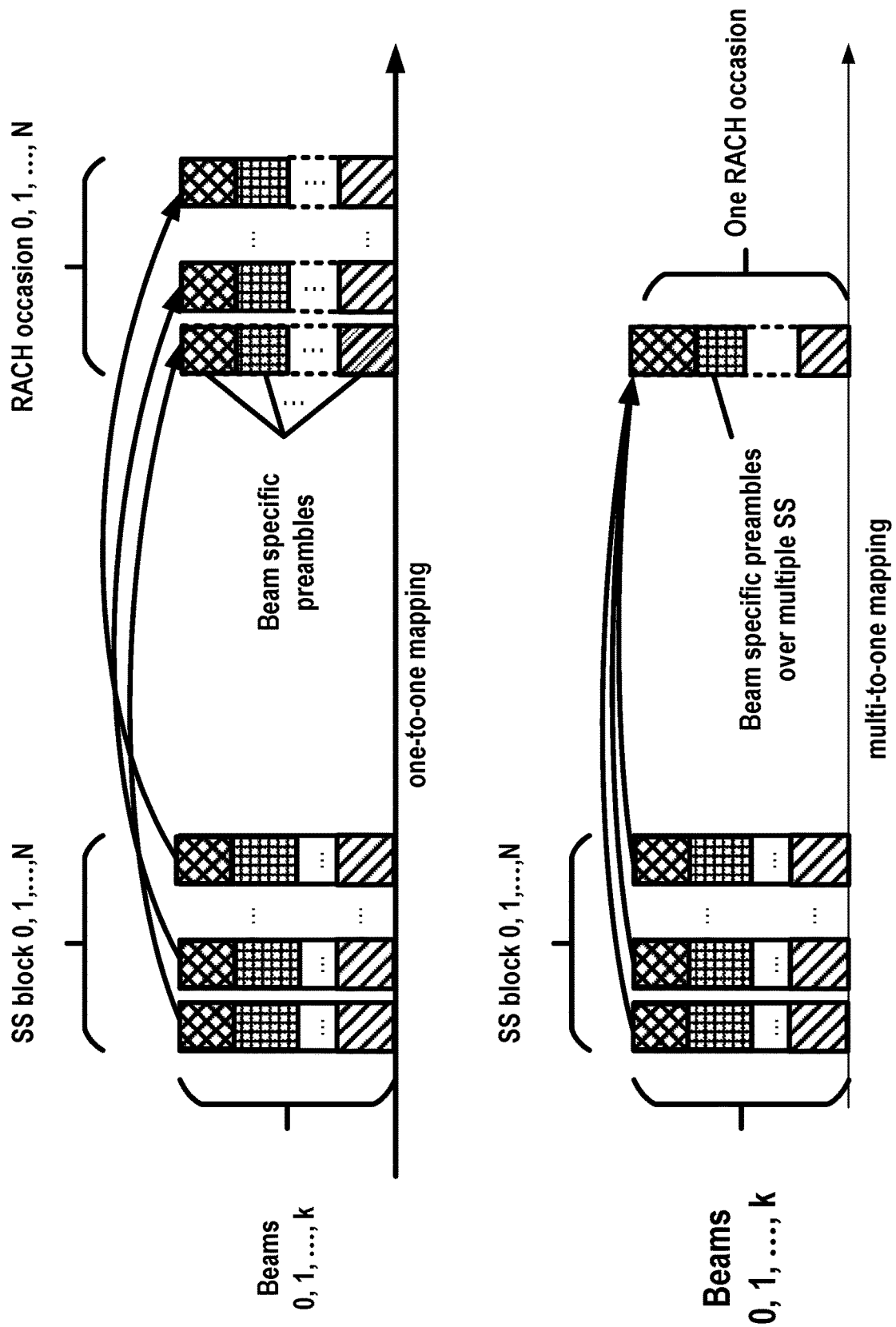
FIG. 36 is an example diagram of an aspect of an embodiment of the present disclosure.

PRACH occasion may be mapped to corresponding SS-block, and a set of PRACH preambles may be divided between beams as illustrated in FIG. 36. Similar to mapping of multiple SS-blocks to single PRACH occasion, multiple beams of an SS-block may be mapped to at least one PRACH occasion as illustrated in FIG. 36.

FIG. 36 illustrates an example of mapping beam specific preambles to PRACH occasion with one-to-one mapping and FIG. 36 illustrates an example of mapping beam specific preambles to PRACH occasion with k-to-one mapping.

If a PRACH occasion is configured with k preambles, and a PRACH occasion is configured to be SS-block specific, the whole set of preambles may be used to indicate the specific SS-block. In this case, there may be N PRACH occasions corresponding to N SS-blocks.

If multiple SS-blocks are mapped to single PRACH occasion, then the preambles may be divided between SS-blocks and depending on the number of SS-blocks, the available preambles per SS-block may be K/N (K preambles, N SS-blocks).

If K SS-block specific preambles are divided between CSI-RS beams in the corresponding PRACH occasions, the number of available preambles per beam may be determined by the K preambles/number of beams.

If the preambles are partitioned in SS-block specific manner, the UE may indicate preferred SS-block but not the preferred individual DL TX beam to gNB.

The network may configure mapping/partitioning PRACH preamble resources to SS-blocks and/or to individual beams. A UE may determine the used partitioning of PRACH preambles, as much as possible, e.g. based on the PRACH configuration.

Beam-specific PRACH configurations may be configurable when a gNB uses analog RX beamforming. In that case, when a UE sends, for example, a preamble in a beam-specific time/frequency slot associated with one or multiple SS Block transmissions, then the gNB may use the appropriate RX beamforming when receiving the preamble in that time/frequency slot and use the corresponding DL beam when transmitting the RAR. Hence, beam-specific PRACH configurations may allow the gNB to direct its Rx beamforming in the direction of the same beam when monitoring the associated PRACH resources.

Example Subsequent Transmissions

In the multi-beam RACH scenario, thanks to the mapping between DL SS beams and PRACH configuration, e.g. time/frequency slot and possibly preamble partitioning, a UE may be under the coverage of a given DL beam or at least a subset of them in a cell. That may enable the network to send a RAR in this best DL beam and/or perform a more optimized beam sweeping procedure e.g. not transmitting the same RAR message in possible beams (e.g. transmitting the RAR in a single beam as in the figure below) as illustrated in FIG. 37.

Figure 37:
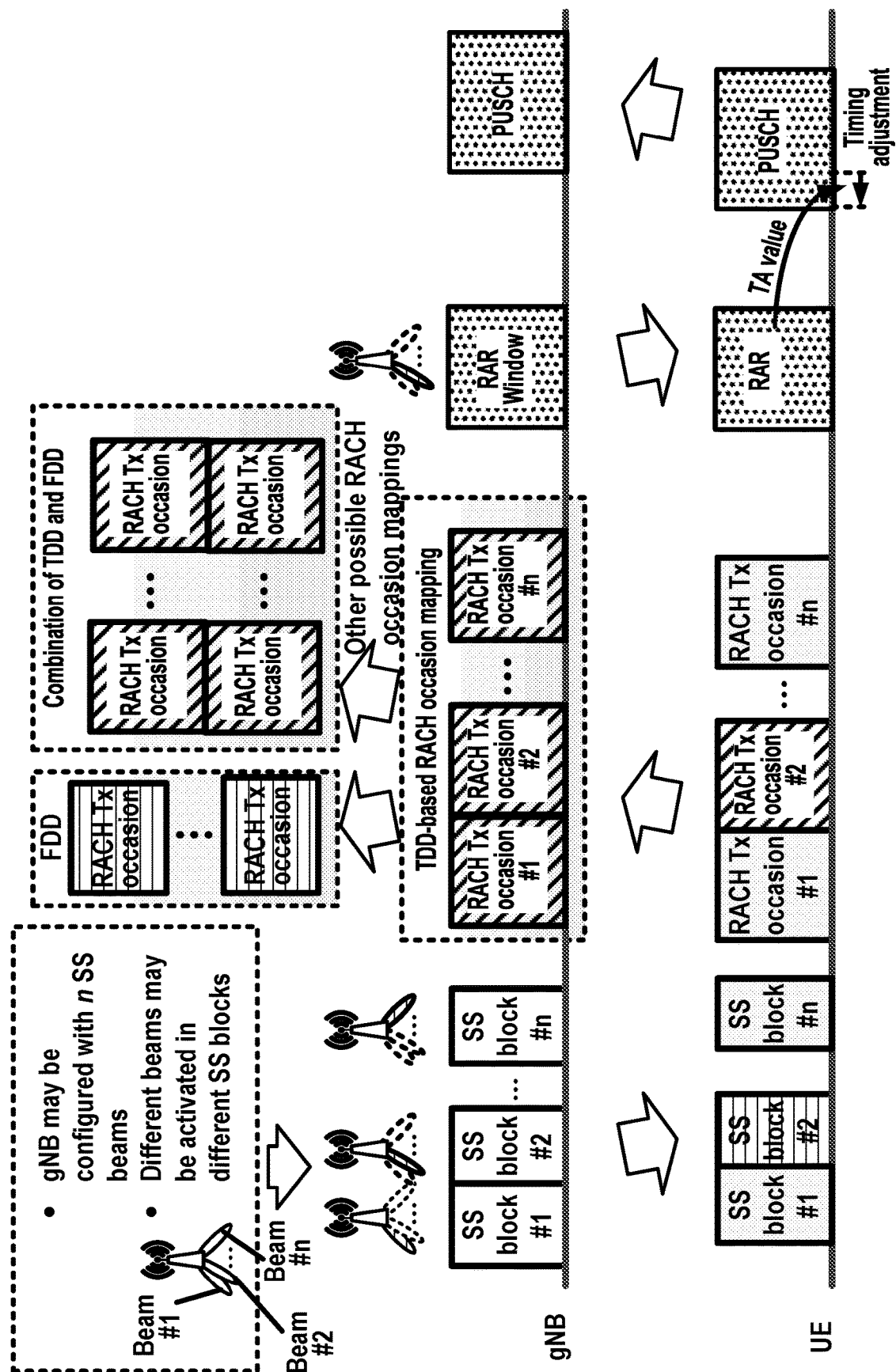
FIG. 37 is an example diagram of an aspect of an embodiment of the present disclosure.

FIG. 37 illustrates an example of an RA procedure with multi-beam; a UE detects the second SS blocks and thereby transmits a preamble on a RACH resource corresponding to the second SS block to inform gNB of the preferred beam. gNB responds with a RAR using the beam that the UE prefers.

Example Contention-Free RACH with Multi-Beam Operations

NR may support the contention-free scenarios in a way to provide a dedicated RACH resource for the preamble transmission as in LTE for handover, DL data arrival, positioning and obtaining timing advance alignment for a secondary TAG. For the handover case, a UE may be configured to measure on one or more SS blocks or other RS in a neighboring cell. If one of the neighboring cell SS-block measurements triggers a handover request, the source gNB may signal a preferred beam index in a handover request to the target gNB. The target gNB in turn may provide a beam-specific dedicated RACH resource (including preamble) in the handover command. In an example, the target gNB may provide a set of dedicated resources e.g. one for at least one SS-block in the handover command. The UE then may transmit Msg1 using the dedicated preamble corresponding to the preferred DL beam in the target cell.

In an example, a cell may be operated with one or more beams employing a multi-antenna system. A beam may have a spatial direction, and/or may cover a part of a cell coverage area. A combination of one or more beam spatial areas may form a cell coverage. In an example, a beam transmitting a synchronization signal and/or receiving a signal from a wireless device may be swept over a cell coverage area in a predetermined way. A synchronization signal index, a synchronization signal scheduling information, and/or a synchronization signal sequence information may be used to identify a swept beam. A swept beam may broadcast one or more control information comprising at least one of a system information, a master information, a PDCCH, a PRACH resource, a random access preamble information, a synchronization signal, a reference signal, and/or the like. In an example, a beam may transmit a reference signal (e.g. CSI-RS). A beam may be also identified by a reference signal (e.g. CSI-RS, DM-RS, and the like) index, a reference signal scheduling information, and/or a reference signal sequence information.

In an example, one or more beams may be managed via a set of L1/L2 procedures to acquire and maintain a set of TRP(s)(Transmission Reception Point) and/or UE beams that may be used for DL and UL transmission/reception, which may include at least following aspects: Beam determination (for TRP(s) or UE to select of its own Tx/Rx beam(s)), Beam measurement (for TRP(s) or UE to measure characteristics of received beamformed signals), Beam reporting (for UE to report information of beamformed signal(s) based on beam measurement), and/or Beam sweeping (operation of covering a spatial area, with beams transmitted and/or received during a time interval in a predetermined way).

In an example, the followings may be defined as Tx/Rx beam correspondence at TRP and UE. Tx/Rx beam correspondence at TRP holds if at least one of the following is satisfied: TRP may be able to determine a TRP Rx beam for the uplink reception based on UE's downlink measurement on TRP's one or more Tx beams; and/or TRP may be able to determine a TRP Tx beam for the downlink transmission based on TRP's uplink measurement on TRP's one or more Rx beams. Tx/Rx beam correspondence at UE may hold if at least one of the following is satisfied: UE may be able to determine a UE Tx beam for the uplink transmission based on UE's downlink measurement on UE's one or more Rx beams; UE may be able to determine a UE Rx beam for the downlink reception based on TRP's indication based on uplink measurement on UE's one or more Tx beams; and/or capability indication of UE beam correspondence related information to TRP may be supported.

In an example, the following DL L1/L2 beam management procedures (e.g. P-1, P-2, and P-3) may be supported within one or multiple TRPs. P-1 may be used to enable UE measurement on different TRP Tx beams to support selection of TRP Tx beams/UE Rx beam(s). For beamforming at TRP, it typically may include a intra/inter-TRP Tx beam sweep from a set of different beams. For beamforming at UE, it may include a UE Rx beam sweep from a set of different beams. P-2 may be used to enable UE measurement on different TRP Tx beams to possibly change inter/intra-TRP Tx beam(s). From a possibly smaller set of beams for beam refinement than in P-1. P-2 may be a special case of P-1. P-3 may be used to enable UE measurement on the same TRP Tx beam to change UE Rx beam in the case UE uses beamforming. At least network triggered aperiodic beam reporting may be supported under P-1, P-2, and P-3 related operations.

In an example, UE measurement based on RS for beam management (at least CSI-RS) may be composed of K (=total number of configured beams) beams, and/or UE may report measurement results of N selected Tx beams, where N may not be necessarily fixed number. The procedure based on RS for mobility purpose may be not precluded. Reporting information may at least include measurement quantities for N beam (s) and information indicating N DL Tx beam(s), if N<K. Specifically, when a UE is configured with K'>1 non-zero power (NZP) CSI-RS resources, a UE may report N' CRIs (CSI-RS Resource Indicator). A UE may be configured with the following high layer parameters for beam management. N≥1 reporting settings, M≥1 resource settings: the links between reporting settings and resource settings may be configured in the agreed CSI measurement setting; CSI-RS based P-1 & P-2 may be supported with resource and reporting settings; and/or P-3 may be supported with or without reporting setting. A reporting setting at least including: information indicating selected beam(s); L1 measurement reporting; time-domain behavior, e.g. aperiodic, periodic, semi-persistent; and/or frequency-granularity if multiple frequency granularities are supported. A resource setting at least including: time-domain behavior, e.g. aperiodic, periodic, semi-persistent; RS type, e.g. NZP CSI-RS at least; at least one CSI-RS resource set, with each CSI-RS resource set having K≥1 CSI-RS resources (Some parameters of K CSI-RS resources may be the same, e.g. port number, time-domain behavior, density and periodicity if any).

In an example, a beam reporting may be supported at least based on an alternative 1 as follow. UE may report information about TRP Tx Beam(s) that may be received using selected UE Rx beam set(s) where a Rx beam set may refer to a set of UE Rx beams that may be used for receiving a DL signal. It may be UE implementation issues on how to construct the Rx beam set. One example may be that each of Rx beam in a UE Rx beam set may correspond to a selected Rx beam in each panel. For UEs with more than one UE Rx beam sets, the UE may report TRP Tx Beam(s) and an identifier of the associated UE Rx beam set per reported TX beam(s). Different TRP Tx beams reported for the same Rx beam set may be received simultaneously at the UE. Different TRP TX beams reported for different UE Rx beam set may not be possible to be received simultaneously at the UE.

In an example, a beam reporting may be supported at least based on an alternative 2 as follow. UE may report information about TRP Tx Beam(s) per UE antenna group basis where UE antenna group may refer to receive UE antenna panel or subarray. For UEs with more than one UE antenna group, the UE may report TRP Tx Beam(s) and an identifier of the associated UE antenna group per reported TX beam. Different TX beams reported for different antenna groups may be received simultaneously at the UE. Different TX beams reported for the same UE antenna group may not be possible to be received simultaneously at the UE.

In an example, NR may support the following beam reporting considering L groups where L>=1 and/or each group may refer to a Rx beam set (alternative 1) or a UE antenna group (alternative 2) depending on which alternative may be adopted. For each group L, UE may report at least the following information: information indicating group at least for some cases; measurement quantities for N_L beam(s), which may support L1 RSRP and CSI report (when CSI-RS is for CSI acquisition); and/or information indicating N_L DL Tx beam(s) when applicable. This group based beam reporting may be configurable per UE basis. This group based beam reporting may be turned off per UE basis, e.g. when L=1 or N_L=1. Group identifier may not be reported when it is turned off.

In an example, NR (New Radio) may support that UE may be able to trigger mechanism to recover from beam failure. Beam failure event may occur when the quality of beam pair link(s) of an associated control channel falls low enough (e.g. comparison with a threshold, time-out of an associated timer). Mechanism to recover from beam failure may be triggered when beam failure occurs. The beam pair link may be used for convenience, and may or may not be used in specification. Network may configure to UE with resources for UL transmission of signals for recovery purpose. Configurations of resources may be supported where the base station may be listening from all or partial directions, e.g. random access region. The UL transmission/resources to report beam failure may be located in the same time instance as PRACH (resources orthogonal to PRACH resources) and/or at a time instance (configurable for a UE) different from PRACH. Transmission of DL signal may be supported for allowing the UE to monitor the beams for identifying new potential beams.

In an example, NR may support beam management with and without beam-related indication. When beam-related indication is provided, information pertaining to UE-side beamforming/receiving procedure used for CSI-RS-based measurement may be indicated through QCL (Quasi Co-Location) to UE. NR may support using the same or different beams on control channel and the corresponding data channel transmissions.

In an example, for NR-PDCCH transmission supporting robustness against beam pair link blocking, UE may be configured to monitor NR-PDCCH on M beam pair links simultaneously, where M≥1 and the maximum value of M may depend at least on UE capability. UE may be configured to monitor NR-PDCCH on different beam pair link(s) in different NR-PDCCH OFDM symbols. Parameters related to UE Rx beam setting for monitoring NR-PDCCH on multiple beam pair links may be configured by higher layer signaling or MAC CE and/or considered in the search space design. At least, NR may support indication of spatial QCL assumption between an DL RS antenna port(s), and DL RS antenna port(s) for demodulation of DL control channel. Candidate signaling methods for beam indication for a NR-PDCCH (i.e. configuration method to monitor NR-PDCCH) may be MAC CE signaling, RRC signaling, DCI signaling, specification-transparent and/or implicit method, and combination of these signaling methods. Indication may not be needed for some cases.

In an example, for reception of unicast DL data channel, NR may support indication of spatial QCL assumption between DL RS antenna port(s) and DMRS antenna port(s) of DL data channel. Information indicating the RS antenna port(s) may be indicated via DCI (downlink grants). The information may indicate the RS antenna port(s) which may be QCL-ed with DMRS antenna port(s). Different set of DMRS antenna port(s) for the DL data channel may be indicated as QCL with different set of RS antenna port(s). Indication may not be needed for some cases.

In an example, a CU-DU interface between CU and DU may be defined as an F1 interface. In an example, there may be transport networks with performances that may vary from high transport latency to low transport latency in the real deployment. For transport network with higher transport latency, higher layer splits may be applicable. For transport network with lower transport latency, lower layer splits may also be applicable and preferable to realize enhanced performance (e.g. centralized scheduling). Thus, preferable option may be different between different types of transport networks (ranging from lower layer split for transport networks with lower transport latency to higher layer split for transport networks with higher transport latency). Furthermore, within lower layer split discussion, there may be both demands to reduce transport bandwidth and demands to support efficient scheduling and advanced receivers.

In an example, LTE <-> NR interworking may be based on Dual-Connectivity-like mechanisms. Such approach may not imply a particular functional split. The requirement that may be extrapolated by the LTE-NR tight interworking requirement may be that of allowing aggregation of PDCP functionalities, in case of split bearers.

In an example, some possible options for the granularity of the CU/DU functional split may be per CU (each CU may a fixed split, and DUs may be configured to match this) and/or per DU (each DU may be configured with a different split. The choice of a DU split may depend on specific topology or backhaul support in an area). For 2 cases, one possible way on how the CU/DU decide or coordinate the split may be through configuration. Alternatively, the split may be negotiated taking into account capabilities of the two units (CU and DU), and deployment preference e.g. based on backhaul topology. In an example, additional split granularity options may be as followings: per UE (different UEs may have different service levels, or belong to different categories, that may be best served in different ways by the RAN e.g. a low rate IoT-type UE with no need for low latency may not necessarily require higher layer functions close to the RF), per bearer (different bearers may have different QOS requirements that may be best supported by different functionality mapping. For example, QCI=1 type bearer may require low delay but may not SDU error sensitive, while eMBB may not be delay sensitive but may have challenging requirements on throughput and SDU error rate), and/or per slice (it may be expected that each slice may have at least some distinctive QOS requirements. Regardless of how exactly a slice is implemented within the RAN, different functionality mapping may be suitable for each slice).

Per CU and Per DU options may pertain to flexibility of network topology, and may be straightforward to support. Whether procedures may be required to handle the initial configuration (or O&M may be relied upon) may not be discussed during the study phase. Note that in the Per DU option, one CU may need to support different split levels in different interfaces, which may not be the case in the Per CU option. Further granularity (Per UE, Per bearer, Per slice) may require analysis and justification based on QoS and latency requirements. Note that the Per UE, Per bearer and Per slice options may imply that a particular instance of the interface between CU/DU may need to support simultaneously multiple granularity levels on user plane. The baseline may be CU based or DU based. If there are demands to have finer granularity (e.g. Per UE, Per bearer, Per slice), justification may be made clear first.

In an example, dynamicity may imply that the protocol distribution and the interface between the CU and DU may need to be reconfigured. If the switching occurs in CU-DU setup procedure (F1 interface setup procedure), the interface design may not be influenced largely as the split option may not be changed during operation. If the switching occurs during operation, there may be impact on complexity of interface.

In an example, it may be possible that not all of the defined functional splits allow for having RRM functions like Call Admission Control and Load balancing in the CU controlling multiple DUs. This may allow for the potential of increased efficiency in inter-cell coordination for RRM functions like the coordination of interference management, load balancing and Call Admission Control. However, that efficiency may only be realized if the CU may have reliable and accurate understanding of the current environment at the DU which may include issues beyond just radio conditions, but may include current processing capabilities, or in the case of wireless or mesh backhauling help in determining current terrestrial capacity.

In an example, functional split Option 5, Option 6, Option 7 and Option 8 may allow for scheduling of data transmission in the CU. Having centralized scheduling may provide benefit particularly for interference management and coordinated transmission in multiple cells (like soft handover in UMTS, or CoMP in LTE). However, this may require the CU to have an even better understanding of the state of the DU radio conditions than for CAC and other centralized RRM functions. It also may require either very low latency/jitter transport or sufficiently tight coordination of timing and reception of user plane data (one solution may be the window mechanism used on the UP in UMTS), but this may be challenging particularly for lower latency use cases in NR. Centralization of RAN functions may have strong potential for some benefits such as reduced cost, improved scalability, more efficient inter-cell coordination for interference management as well as improved mobility in ultra-dense deployments.

In an example, the RRC related functions may be located in the CU. The RRC message between the gNB and the UE may be transferred through the interface (e.g. F1 interface) between the CU and the DU. RRC messages may require a differentiated transport between CU and DU compared to data transport, e.g. in terms of robustness and delay.

In an example, F1-C and F1-U may provide C-plane and U-plane over F1 interface, respectively. In this architecture, CU and DU may be defined as follows. Central Unit (CU) may be a logical node that may include a subset of the gNB functions as listed excepting those functions allocated exclusively to the DU. CU may control the operation of DUs. Distributed Unit (DU) may be a logical node that may include, depending on the functional split option, a subset of the gNB functions. The operation of DU may be controlled by the CU.

In an example, gNB-CU UE F1AP ID may be allocated so as to uniquely identify the UE over the F1 interface within a gNB-CU and an associated gNB-DU. When a gNB-DU receives a gNB-CU UE F1AP ID, it may store it for the duration of the UE-associated logical F1-connection for this UE. The gNB-CU UE F1AP ID may be unique within the gNB-CU logical node and the associated gNB-DU logical node. The definition of the AP ID may be pending the decision on whether the DU is connected to multiple CU. UE-associated signaling may be one or more F1AP messages associated to one UE, wherein the one or more F1AP messages may use the UE-associated logical F1-connection for association of the message to the UE in gNB-DU and gNB-CU. The UE-associated logical F1-connection may use the identities gNB-CU UE F1AP ID. For a received UE associated F1AP message, the gNB-CU and gNB-DU may identify the associated UE based on the gNB-CU UE F1AP ID IE. The UE-associated logical F1-connection may exist before the F1 UE context is setup in gNB-DU.

In an example, the purpose of the F1 Setup procedure may be to exchange application level data needed for the gNB-DU and the gNB-CU to correctly interoperate on the F1 interface (i.e. CU-DU interface). This procedure may be the first F1AP procedure triggered after the TNL association may have become operational. The procedure may use non-UE associated signaling. This procedure may erase existing application level configuration data in the two nodes and may replace it by the one received and may clear gNB-CU overload state information at the gNB-DU. If the gNB-DU and gNB-CU do not agree on retaining the UE Contexts, this procedure may re-initialize the F1AP UE-related contexts and may erase related signaling connections in the two nodes like a Reset procedure would do.

Figure 28:
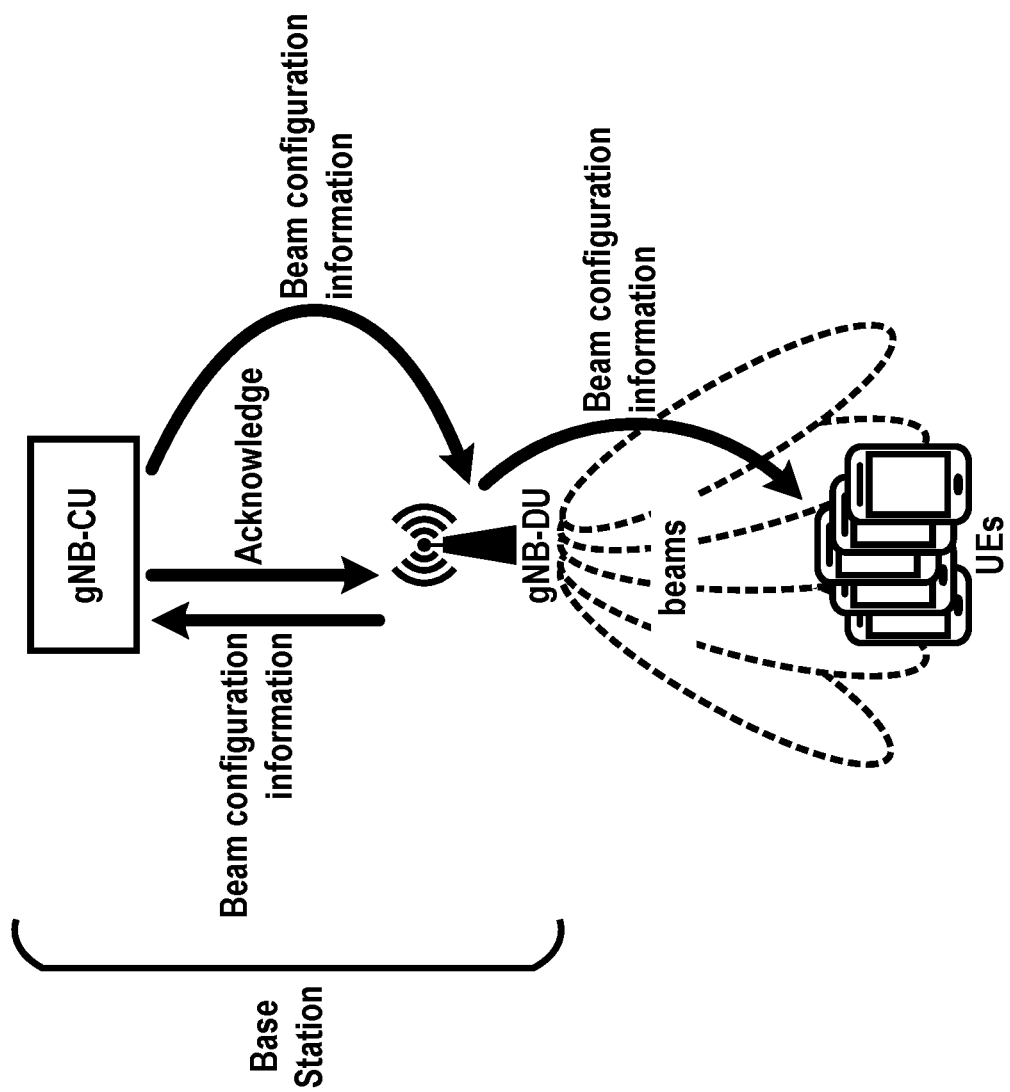
FIG. 28 is an example diagram of an aspect of an embodiment of the present disclosure.
Figure 29:
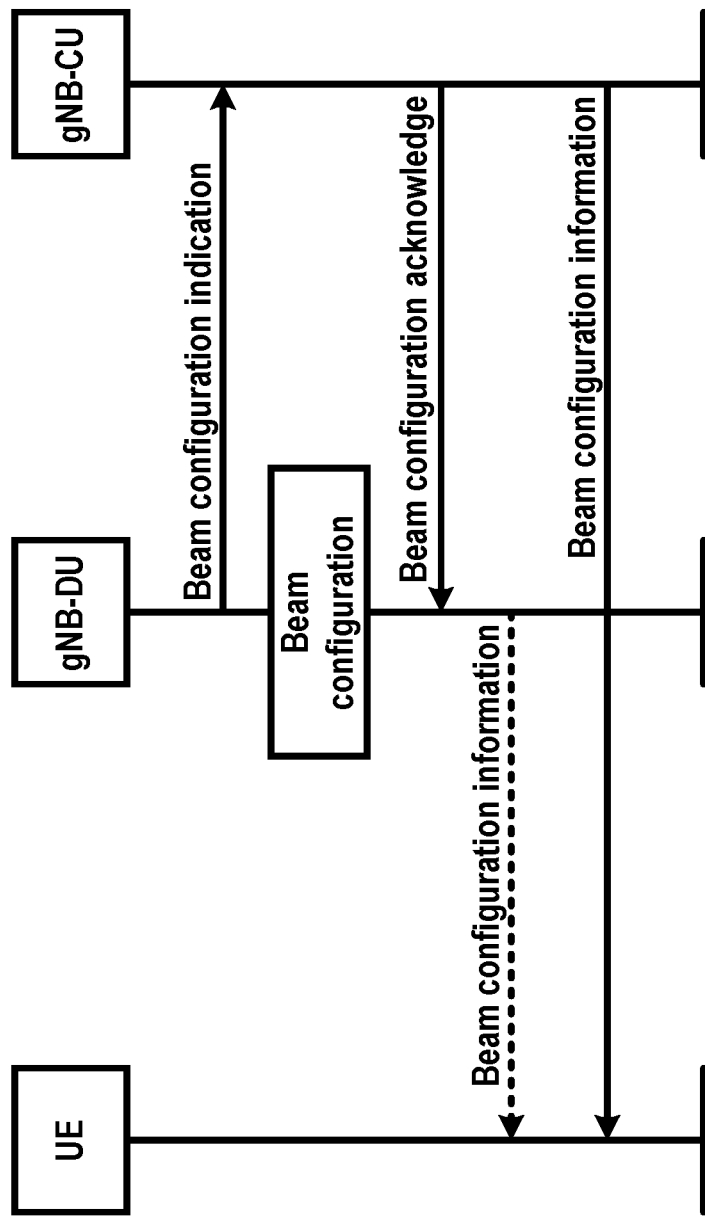
FIG. 29 is an example diagram of an aspect of an embodiment of the present disclosure.
Figure 30:
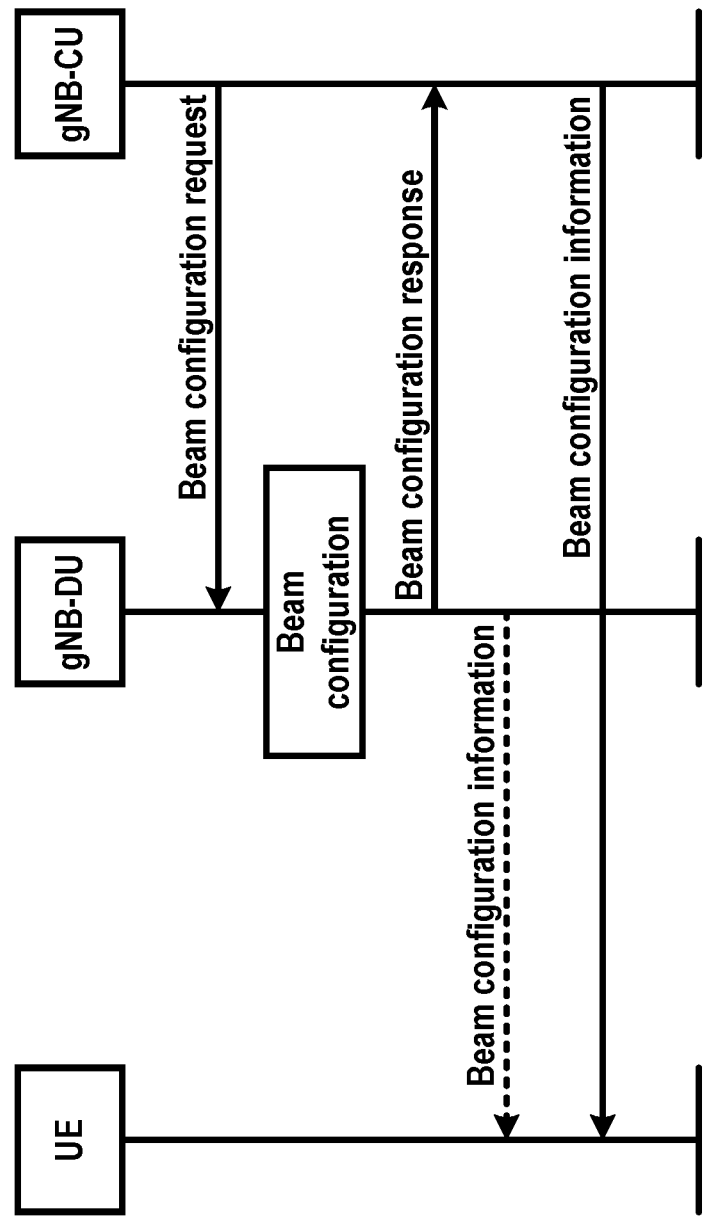
FIG. 30 is an example diagram of an aspect of an embodiment of the present disclosure.

In an example, as shown in FIG. 28, FIG. 29 and/or FIG. 30, a gNB-CU (e.g. CU, central unit) may configure beam configuration parameters.

In an example embodiment, a central radio access network (RAN) entity (Central Unit, CU, gNB-CU) may transmit a beam management message to a distributed RAN entity (Distributed Unit, DU, gNB-DU) via an F1 interface (i.e. an interface between CU and DU). The beam management message may be configured to activate one or more beams, to deactivate one or more beams, and/or to modify one or more beam configuration parameters for one or more beams. In an example, the beam management message may be transmitted at least based on radio resource status and/or interference information received from one or more DUs, one or more neighbor base stations, and/or one or more wireless devices. The DU receiving the beam management message may activate/deactivate one or more beams and/or modify one or more beam configuration parameters for one or more beams at least based on the beam management message.

In an example, a first DU may receive, from a CU, a first message comprising one or more beam configuration parameters. The first message may be transmitted via an F1 interface between the first DU and the CU. The first message may be configured to request the DU at least one of: to activate (e.g. configure) a first beam; to deactivate (e.g. release) a second beam; and/or to modify one or more beam configuration parameters for a third beam. The first beam, the second beam, and/or the third beam may be to serve a first cell. In an example, a type of the first beam, the second beam, and/or the third beam may be a synchronization signal (SS) beam, a cell specific channel state information reference signal (CSI-RS) beam, a UE specific CSI-RS beam, and/or the like. The first message may further comprise a cell identifier of the first cell. The cell identifier may be a global cell identifier, a physical cell identifier, a cell identifier at least unique at the first DU, and/or the like.

In an example, the one or more beam configuration parameters may comprise at least one of: a beam index, a beam scheduling information, a synchronization signal configuration information (e.g. SS block scheduling information), a reference signal configuration information (e.g. CSI-RS and/or DM-RS scheduling information), a beam identifier, and/or the like. In an example, one or more elements of the first message may be determined at least based on information received from at least one of a first wireless device, a neighboring base station, and/or a second distributed radio access network entity.

In an example, if the first message is to request the first DU to activate (e.g. configure) a first beam, the first message may comprise an activation indication (e.g. configuration indication) indicating a request (e.g. a configuration parameter) to activate (e.g. configure) the first beam. In an example, the activation indication (e.g. the configuration indication) may be based on one or more first measurement reports from one or more wireless device. The one or more first measurement reports may indicate that a coverage area of the first cell and/or neighboring cells of the first cell is overloaded (congested), and/or that wireless devices in the coverage area are experiencing low radio channel qualities. By increasing the number of activated beams (e.g. configured beams), the first cell may resolve the congestion situation, may compensate coverage holes in the area of the first cell, and/or may increase a channel quality of a wireless device served via the first cell.

In an example, if the first message is to request the first DU to deactivate (e.g. release) a second beam, the first message may comprise a deactivation indication (e.g. release indication) indicating a request (e.g. release configuration parameter) to deactivate (e.g. release) the second beam. In an example, the deactivation indication (e.g. release indication) may be based on one or more second measurement reports from one or more wireless device. The one or more second measurement reports may indicate that a coverage area of the second cell and/or neighboring cells of the second cell has low traffic, and/or that wireless devices in the coverage area are experiencing high radio channel qualities (e.g. high enough to decrease the number of beams). By decreasing the number of activated beams (e.g. configured beams), the second cell may reduce operation complexity, may reduce interference towards neighboring cells of the second cell, and/or may increase radio resource usage (e.g. because the second cell may reduce the number of sweeping beams).

In an example, if the first message is to modify one or more beam configuration parameters for a third beam, the first message may comprise a modification indication indicating a request to modify one or more beam configuration parameters of the third beam. In an example, the modification indication may be based on one or more third measurement reports from one or more wireless device. The one or more third measurement reports may indicate that a coverage area of the third cell and/or neighboring cells of the third cell is overloaded (congested) and/or has low traffic, and/or that wireless devices in the coverage area are experiencing low or high radio channel qualities. By modifying the one or more beam configuration parameters for the third cell, the third cell may control service qualities for wireless devices and/or system performance. In an example, the one or more beam configuration parameters may comprise beam steering direction, transmission power, beam sweeping scheduling (e.g. periodicity, sweeping timing, beam serving duration of the third beam compared to other beams of the third cell, the number of beam activations of the third beam in a sweeping period). For example, by increasing the beam serving duration of the third beam and/or the number of beam activations of the third beam, traffic capacity of the area of the third beam may increase.

In an example, the one or more beam configuration parameters may comprise a random access (RA) configurations associated with the first beam, the second beam, and/or the third beam (e.g. RA preamble indexes to be used, RA resource configuration information, and/or the like).

In an example, the CU may determine one or more elements of the first message at least based on a third message that the CU received from at least one of a first wireless device, a neighboring base station, a second DU (e.g. the second DU may be the first DU), a core network entity, and/or an operation and management (OAM). The third message may comprise a resource status information (e.g. radio resource status, hardware overhead information, and/or the like) of one or more beams of one or more cells; a resource status information of one or more cells; a load status information of one or more beams of one or more cells (e.g. a number of serving wireless devices, a number of radio resource control inactive state wireless devices, a random access resource utilization information, and/or the like); a load status information of one or more cells; an uplink receiving interference information of one or more beams; an uplink receiving interference information of one or more cells; a downlink receiving interference information of one or more beams; a downlink receiving interference information of one or more cells; a uplink/downlink received signal quality (e.g. received signal power and/or interference); and/or the like.

In an example, the first DU may transmit, to the CU, a second message in response to the first message. The second message may be transmitted via the F1 interface. The second message may be configured to indicate an acknowledge of one or more elements of the one or more beam configuration parameters of the first message. In an example, the second message may further comprise at least one of: an acceptance indication indicating that the first DU activates the first beam of the first cell, a rejection indication indicating that the first DU does not activate the first beam, an acceptance indication indicating that the first DU deactivates the second beam of the first cell, a rejection indication indicating that the first DU does not deactivate the second beam, an acceptance indication indicating that the first DU modifies at least one configuration parameter of the one or more beam configuration parameters for the third beam of the first cell, a rejection indication indicating that the first DU does not modify the one or more beam configuration parameters for the third beam, and/or the like.

In an example, the first DU may configure beams of the first cell at least based on the one or more beam configuration parameters of the first message. The first DU may activate (e.g. configure) the first beam for the first cell, may deactivate (e.g. release) the second beam for the first cell, may modify at least one configuration parameter of the one or more beam configuration parameters of the third beam for the first cell, and/or may configure the like. The second message may be determined at least based on the configurations of the first DU in response to receiving the first message. In an example, the first DU may transmit, to a plurality of wireless devices via radio interface (e.g. system information, one or more system information blocks, system information block type 1, master information, master information block, UE dedicated message, UE dedicated RRC message, and/or the like), beam information updated at least based on the configurations of the first DU in response to receiving the first message. The beam information may comprise configuration parameters of the first beam activated (e.g. configured) in response to the first message, the third beam modified in response to the first message, and/or the like. The configuration parameters may comprise SS block information (e.g. scheduling, timing, resource block, periodicity, frequency, and/or the like information), CSI-RS block information (e.g. scheduling, timing, resource block, periodicity, frequency, and/or the like information). In an example, the first DU may transmit the one or more system information blocks (e.g. the system information block type 1, the system information, the master information block) via the CU to wireless devices.

In an example, the CU may transmit, to a wireless device, a fourth message based on the second message and/or the first message. The fourth message may be a radio resource control (RRC) message. One or more elements of the fourth message may be determined based on one or more elements of the first message and/or the second message. The fourth message may comprise a cell configuration information of the first cell. The fourth message may comprise RA configuration parameters for one or more beams of the first cells. The fourth message may comprise one or more beam configuration parameters of the first cell. The fourth message may comprise one or more beam list to be measured, to be accessed, to be monitored, to be employed, and/or to be stored as a candidate for use by the wireless device.

In an example, as shown in FIG. 28, FIG. 29 and/or FIG. 30, a gNB-DU (e.g. DU, distributed unit) may configure beam configuration parameters.

In an example, a DU may manage beam configurations (e.g. beam activation (e.g. configuration), beam deactivation (e.g. release), and/or beam configuration modification) and/or transmit the beam configuration information to a CU. The CU may transmit, to a wireless device, one or more radio configuration parameters (e.g. system information block, RRC message, and/or the like) determined at least based on one or more elements of the beam configuration information. In an example, the beam configurations managed by the DU may be determined at least based on radio resource status information and/or interference information of neighboring DUs and/or neighboring base stations provided by the CU.

In an example, a first DU may transmit, to a CU, a cell configuration message (e.g. system information block, RRC message) comprising one or more beam configuration parameters. The cell configuration message may be transmitted via an F1 interface between the first DU and the CU. The cell configuration message may be configured to inform the CU at least one of: activation (e.g. configuration) of a first beam; deactivation (e.g. release) of a second beam; and/or modification of one or more beam configuration parameters for a third beam. The first beam, the second beam, and/or the third beam may be to serve a first cell. In an example, a type of the first beam, the second beam, and/or the third beam may be a synchronization signal (SS) beam, a cell specific channel state information reference signal (CSI-RS) beam, a UE specific CSI-RS beam, and/or the like. The cell configuration message may further comprise a cell identifier of the first cell. The cell identifier may be a global cell identifier, a physical cell identifier, a cell identifier at least unique at the first DU, and/or the like.

In an example, the one or more beam configuration parameters may comprise at least one of: a beam index, a beam scheduling information, a synchronization signal configuration information (e.g. SS block scheduling information), a reference signal configuration information (e.g. CSI-RS and/or DM-RS scheduling information), a beam identifier, and/or the like. In an example, one or more elements of the cell configuration message may be determined at least based on information received from at least one of a first wireless device, a neighboring base station, and/or a second distributed radio access network entity. In an example, one or more elements of the cell configuration message may be determined at least based on beam configuration updates associated with one or more beams of the first cell. The one or more beams may be activated, deactivated, and/or modified by the first DU.

In an example, if the cell configuration message is to inform that the first DU activates (e.g. configures) a first beam, the cell configuration message may comprise an activation indication indicating an activation of the first beam. In an example, the activation (e.g. configuration) may be based on one or more first measurement reports from one or more wireless device and/or from the CU. The one or more first measurement reports may indicate that a coverage area of the first cell and/or neighboring cells of the first cell is overloaded (congested), and/or that wireless devices in the coverage area are experiencing low radio channel qualities. By increasing the number of activated beams, the first cell may resolve the congestion situation, may compensate coverage holes in the area of the first cell, and/or may increase a channel quality of a wireless device served via the first cell.

In an example, if the cell configuration message is to inform that the first DU deactivates (e.g. release) a second beam, the cell configuration message may comprise a deactivation (e.g. release) indication indicating a deactivation of the second beam. In an example, the deactivation may be based on one or more second measurement reports from one or more wireless device and/or from the CU. The one or more second measurement reports may indicate that a coverage area of the second cell and/or neighboring cells of the second cell has low traffic, and/or that wireless devices in the coverage area are experiencing high radio channel qualities (e.g. high enough to decrease the number of beams). By decreasing the number of activated beams, the second cell may reduce operation complexity, may reduce interference towards neighboring cells of the second cell, and/or may increase radio resource usage (e.g. because the second cell may reduce the number of sweeping beams).

In an example, if the cell configuration message is to inform a modification of one or more beam configuration parameters for a third beam, the cell configuration message may comprise a modification indication indicating a modification of one or more beam configuration parameters of the third beam. In an example, the modification may be based on one or more third measurement reports from one or more wireless device and/or from the CU. The one or more third measurement reports may indicate that a coverage area of the third cell and/or neighboring cells of the third cell is overloaded (congested) and/or has low traffic, and/or that wireless devices in the coverage area are experiencing low or high radio channel qualities. By modifying the one or more beam configuration parameters for the third cell, the third cell may control service qualities for wireless devices and/or system performance. In an example, the one or more beam configuration parameters may comprise beam steering direction, transmission power, beam sweeping scheduling (e.g. periodicity, sweeping timing, beam serving duration of the third beam compared to other beams of the third cell, the number of beam activations of the third beam in a sweeping period). For example, by increasing the beam serving duration of the third beam and/or the number of beam activations of the third beam, traffic capacity of the area of the third beam may increase.

In an example, the one or more beam configuration parameters may comprise a random access (RA) configurations associated with the first beam, the second beam, and/or the third beam (e.g. RA preamble indexes to be used, RA resource configuration information, and/or the like).

In an example, the first DU may determine beam configurations for the first cell and/or one or more elements of the cell configuration message at least based on a status information message that the first DU received from at least one of a first wireless device, the CU, a neighboring base station, and/or an operation and management (OAM). The status information message may comprise a resource status information (e.g. radio resource status, hardware overhead information, and/or the like) of one or more beams of one or more cells; a resource status information of one or more cells; a load status information of one or more beams of one or more cells (e.g. a number of serving wireless devices, a number of radio resource control inactive state wireless devices, a random access resource utilization information, and/or the like); a load status information of one or more cells; an uplink receiving interference information of one or more beams; an uplink receiving interference information of one or more cells; a downlink receiving interference information of one or more beams; a downlink receiving interference information of one or more cells; a uplink/downlink received signal quality (e.g. received signal power and/or interference); and/or the like.

In an example, the CU may transmit, to the first DU, a cell configuration response message in response to the cell configuration message. The cell configuration response message may be transmitted via the F1 interface. The cell configuration response message may be configured to indicate an acknowledge of one or more elements of the one or more beam configuration parameters of the cell configuration message. In an example, the cell configuration response message may comprise at least one of: an acknowledge indication for the activation of the first beam, the deactivation of the second beam, the modification of the one or more beam configuration parameters for the third beam, and/or the like.

In an example, the first DU may configure the one or more beam configuration parameters of the cell configuration message at least based on the beam configuration updates of the first cell. The first DU may activate the first beam for the first cell, may deactivate the second beam for the first cell, may modify at least one configuration parameter of the one or more beam configuration parameters of the third beam for the first cell, and/or may configure the like. In an example, the first DU may transmit, to a plurality of wireless devices via radio interface (e.g. system information, master information, UE dedicated message, and/or the like), beam information updated at least based on the beam configuration updates of the first DU. The beam information may comprise configuration parameters of the first beam activated in response to the cell configuration message, the third beam modified in response to the cell configuration message, and/or the like. The configuration parameters may comprise SS block information (e.g. scheduling, timing, resource block, periodicity, frequency, and/or the like information), CSI-RS block information (e.g. scheduling, timing, resource block, periodicity, frequency, and/or the like information).

In an example, the CU may transmit, to a wireless device, a radio resource configuration message based on the cell configuration message and/or the cell configuration response message. The radio resource configuration message may be a radio resource control (RRC) message. One or more elements of the radio resource configuration message may be determined based on one or more elements of the cell configuration message and/or the cell configuration response message. The radio resource configuration message may comprise a cell configuration information of the first cell. The radio resource configuration message may comprise RA configuration parameters for one or more beams of the first cells. The radio resource configuration message may comprise one or more beam configuration parameters of the first cell. The radio resource configuration message may comprise one or more beam list to be measured, to be accessed, to be monitored, to be employed, and/or to be stored as a candidate for use by the wireless device.

In an example, a first distributed RAN entity may receive, from a central RAN entity, a first message comprising one or more beam configuration parameters associated with a serving cell of the first distributed RAN entity, wherein the first message may be configured to request for at least one of: activating a first beam; deactivating a second beam; and/or modifying configurations of a third beam. The first distributed RAN entity may transmit, to the central RAN entity, a second message in response to the first message, wherein the second message may comprise an indication indicating at least one of: accepting the request of the first message; and/or rejecting the request of the first message. In an example, the first distributed RAN entity, may configure beam configurations at least based on the one or more beam configuration parameters. The first distributed RAN entity may transmit, to a plurality of wireless devices, a beam information that may be determined at least based on the one or more beam configuration parameters.

In an example, the central radio access network entity may determine one or more elements of the first message at least based on a third message received from at least one of a first wireless device, a neighboring base station, and/or a second distributed RAN entity. The third message may comprise at least one of: a resource status information of one or more beams of one or more cells; a resource status information of one or more cells; a load status information of one or more beams of one or more cells (e.g. a number of serving wireless devices, a number of radio resource control inactive state wireless devices, a random access resource utilization information, and/or the like); a load status information of one or more cells; an uplink receiving interference information of one or more beams; an uplink receiving interference information of one or more cells; a downlink receiving interference information of one or more beams; and/or a downlink receiving interference information of one or more cells.

In an example, the second distributed RAN entity may be the first distributed RAN entity. The central RAN entity may transmit, to a wireless device, a fourth message comprising one or more radio resource control configuration parameters at least based on the second message. In an example, the one or more beam configuration parameters may comprise at least one of: a beam index; a beam scheduling information; a beam transmission power; a beam steering direction; and/or the like.

In an example, a first distributed RAN entity may transmit, to a central RAN entity, a cell configuration message comprising one or more beam configuration parameters, wherein the cell configuration message may indicate at least one of: an activation of a first beam; a deactivation of a second beam; and/or a configuration modification of a third beam. The first distributed RAN entity may receive, from the central RAN entity, a second message acknowledging one or more elements of the cell configuration message. The first distributed RAN entity may transmit, to a plurality of wireless devices, a beam information associated with one or more elements of the one or more beam configuration parameters.

According to various embodiments, a device such as, for example, a wireless device, a base station, base station central unit, a base station distributed unit, a core network entity, and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

Figure 38:
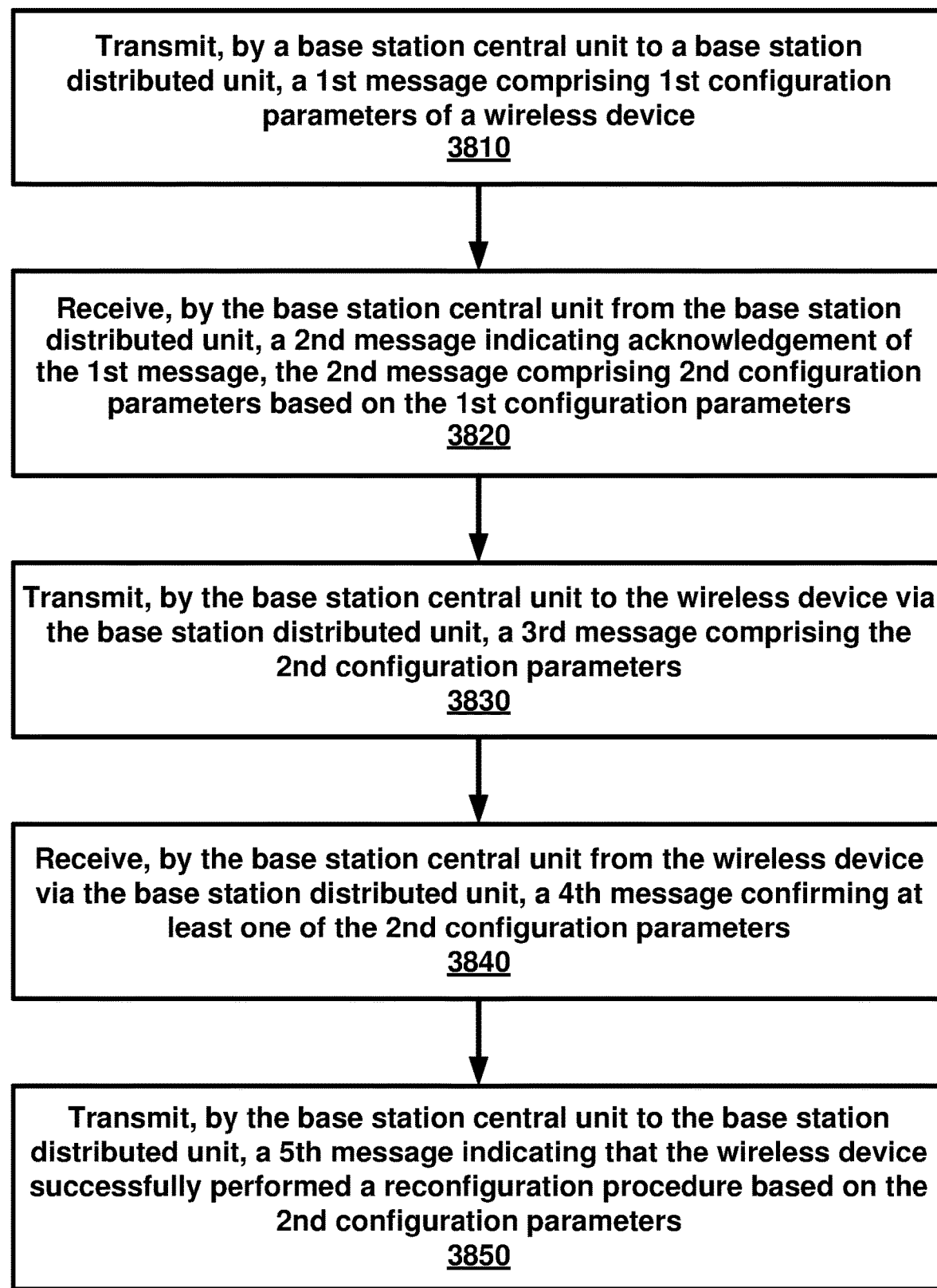
FIG. 38 is a flow diagram of an aspect of an embodiment of the present disclosure.

FIG. 38 is an example flow diagram as per an aspect of an embodiment of the present disclosure. At 3810, a base station central unit may transmit a first message to a base station distributed unit. The first message may comprise first configuration parameters of a wireless device. At 3820, the base station central unit may receive a second message from the base station distributed unit. The second message may indicate acknowledgement of the first message. The second message may comprise second configuration parameters based on the first configuration parameters. At 3830, the base station central unit may transmit a third message to the wireless device via the base station distributed unit. The third message may comprise the second configuration parameters. At 3840, the base station central unit may receive a fourth message from the wireless device via the base station distributed unit. The fourth message may confirm at least one of the second configuration parameters. At 3850, the base station central unit may transmit a fifth message to the base station distributed unit. The fifth message may indicate that the wireless device successfully performed a reconfiguration procedure based on the second configuration parameters.

According to an embodiment, the second configuration parameters comprise a secondary cell addition indication of a secondary cell. According to an embodiment, the second configuration parameters may comprise a secondary cell modification indication of a secondary cell. According to an embodiment, the second configuration parameters may comprise a secondary cell release indication of a secondary cell. According to an embodiment, the second configuration parameters may comprise periodic resource scheduling information of periodic resources of a cell. According to an embodiment, the second configuration parameters may comprise a transmission power configuration parameter. According to an embodiment, the second configuration parameters may comprise a sidelink configuration parameter. According to an embodiment, the second configuration parameters may comprise a random access configuration parameter.

According to an embodiment, the second configuration parameters may comprise a periodic resource scheduling information of periodic resources of a cell. The periodic resource scheduling information may comprise a periodicity configuration parameter. The periodic resource scheduling information may comprise a frequency configuration parameter. The periodic resource scheduling information may comprise a numerology indication parameter.

According to an embodiment, the second configuration parameters may comprise a random access configuration parameter. The random access configuration parameter may comprise a preamble index. The random access configuration parameter may comprise random access resource information.

According to an embodiment, the base station distributed unit may transmit to the wireless device and based on the fifth message, a medium access control control element may indicate activation of periodic resources. According to an embodiment, the base station distributed unit may transmit to the wireless device and based on the fifth message, a physical downlink control channel order may indicate a random access initiation command for a secondary cell. According to an embodiment, the base station distributed unit may transmit to the wireless device and based on the fifth message, a medium access control control element may indicate activation or deactivation of a secondary cell.

According to an embodiment, in response to receiving the fifth message, the base station distributed unit based may be configured based on the second configuration parameters for the wireless device. According to an embodiment, the second configuration parameters may indicate acknowledgement of at least one of the first configuration parameters. According to an embodiment, the wireless device may reject one or more of the second configuration parameters. According to an embodiment, the second configuration parameters may be for a first cell of the wireless device. According to an embodiment, the second message and the fifth message may comprise a radio resource control configuration index may indicating that the reconfiguration procedure of the fifth message is for the second configuration parameters. According to an embodiment, the first message, the second message, and the fifth message may be transmitted via an F1 interface. According to an embodiment, the third message and the fourth message may comprise a radio resource control message. According to an embodiment, a base station may comprise the base station central unit and the base station distributed unit. According to an embodiment, the base station central unit may comprise a radio resource control function for the wireless device.

According to an embodiment, the base station distributed unit may comprise a medium access control layer function for the wireless device. According to an embodiment, the base station distributed unit may comprise a physical layer function for the wireless device. According to an embodiment, the base station central unit may transmit to the wireless device, one or more first packets via the base station distributed unit. According to an embodiment, the base station central unit may receive from the wireless device, one or more second packets via the base station distributed unit. According to an embodiment, the third message may comprise a radio resource control reconfiguration message.

According to an embodiment, the fourth message may comprise a radio resource control reconfiguration complete message.

Figure 39:
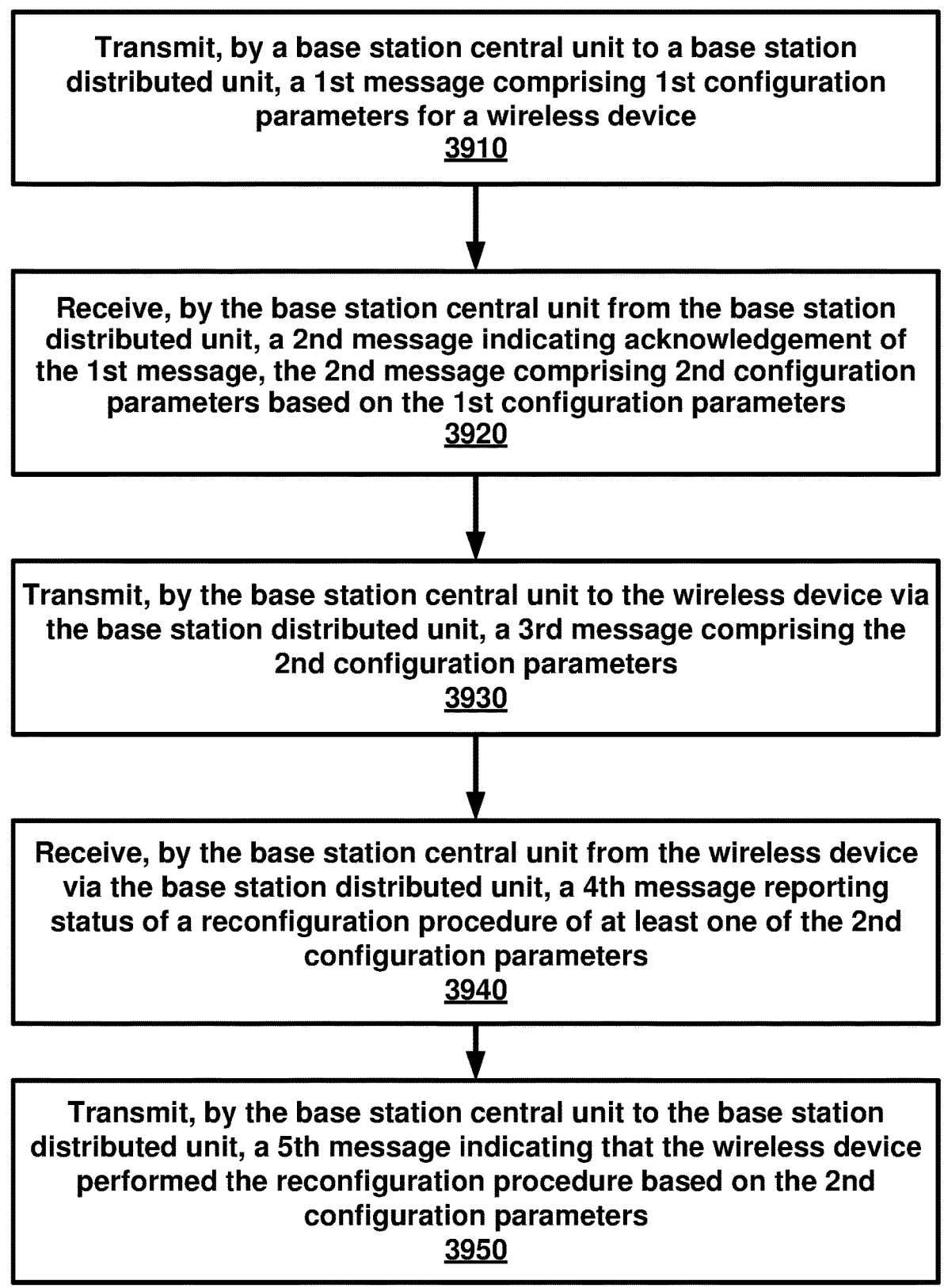
FIG. 39 is a flow diagram of an aspect of an embodiment of the present disclosure.

FIG. 39 is an example flow diagram as per an aspect of an embodiment of the present disclosure. At 3910, a base station central unit may transmit first message to a base station distributed unit. The first message may comprise first configuration parameters of a wireless device. At 3920, the base station central unit may receive a second message from the base station distributed unit. The second message may indicate acknowledgement of the first message. The second message may comprise second configuration parameters based on the first configuration parameters. At 3930, the base station central unit may transmit a third message to the wireless device and via the base station distributed unit. The third message may comprise the second configuration parameters. At 3940, the base station central unit may receive a fourth message from the wireless device and via the base station distributed unit. The fourth message may report status of a reconfiguration procedure of at least one of the second configuration parameters. At 3950, the base station central unit may transmit a fifth message to the base station distributed unit. The fifth message may indicate that the wireless device successfully performed the reconfiguration procedure based on the second configuration parameters.

According to an embodiment, the base station distributed unit may transmit to the wireless device and based on the fifth message, a medium access control control element. The a medium access control control element may indicate activation of periodic resources. The second configuration parameters may comprise periodic resource scheduling information of the periodic resources. According to an embodiment, the base station distributed unit may transmit to the wireless device and based on the fifth message, a physical downlink control channel order. The a physical downlink control channel order may indicate a random access initiation command for a secondary cell. The second configuration parameters may comprise a secondary cell addition indication of the secondary cell. The second configuration parameters may comprise a secondary cell modification indication of the secondary cell.

According to an embodiment, the base station distributed unit may transmit to the wireless device and based on the fifth message, a medium access control control element. The medium access control control element may indicate activation or deactivation of a secondary cell. The second configuration parameters may comprise at least one of: a secondary cell addition indication of the secondary cell, or a secondary cell modification indication of the secondary cell.

Figure 40:
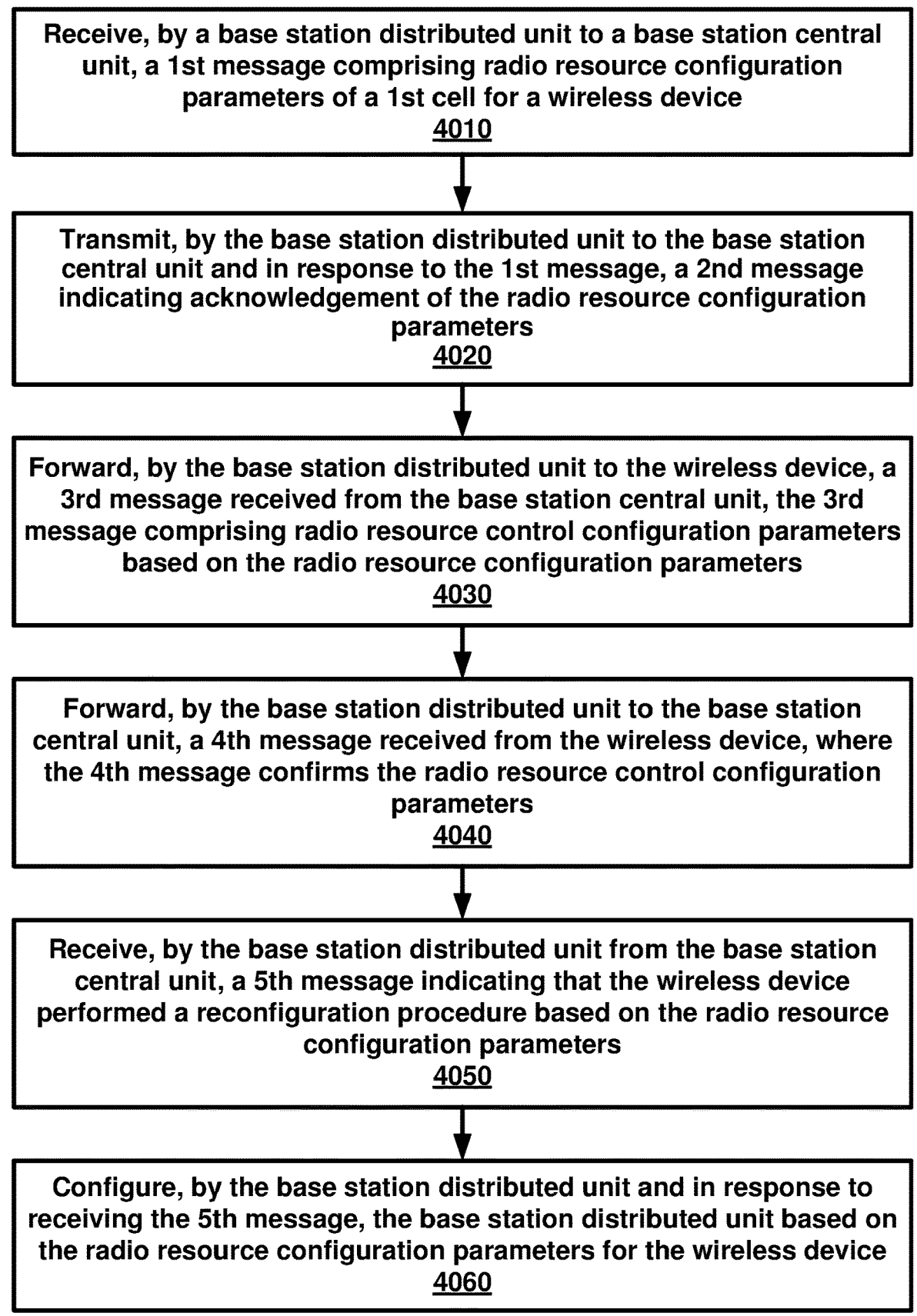
FIG. 40 is a flow diagram of an aspect of an embodiment of the present disclosure.

FIG. 40 is an example flow diagram as per an aspect of an embodiment of the present disclosure. At 4010, a base station distributed unit may receive a first message from a base station central unit. The first message may comprise radio resource configuration parameters of a first cell for a wireless device. At 4020, the base station distributed unit may transmit a second message to the base station central unit in response to the first message. The second message may indicate acknowledgement of the radio resource configuration parameters. At 4030, the base station distributed unit may forward to the wireless device, a third message received from the base station central unit. The third message may comprise radio resource control configuration parameters based on the radio resource configuration parameters. At 4040, the base station distributed unit may forward to the base station central unit, a fourth message received from the wireless device. The fourth message may confirm the radio resource control configuration parameters. At 4050, the base station distributed unit may receive a fifth message from the base station central unit. The fifth message may indicate that the wireless device performed a reconfiguration procedure based on the radio resource configuration parameters. At 4060, the base station distributed unit may configure and in response to receiving the fifth message, the base station distributed unit based on the radio resource configuration parameters for the wireless device.

Figure 41:
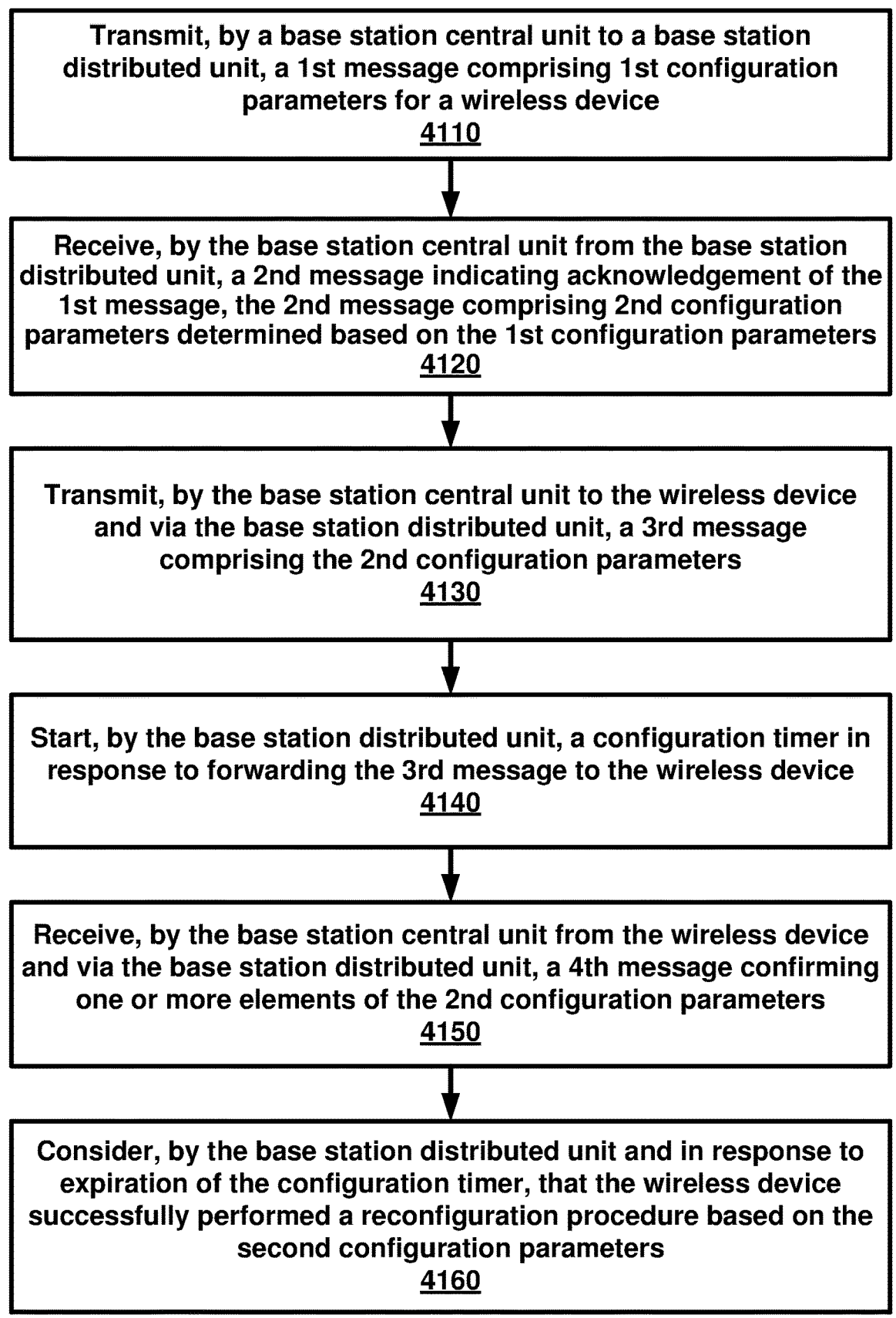
FIG. 41 is a flow diagram of an aspect of an embodiment of the present disclosure.

FIG. 41 is an example flow diagram as per an aspect of an embodiment of the present disclosure. At 4110, a base station central unit may transmit a first message to a base station distributed unit. The first message may comprise first configuration parameters for a wireless device. At 4120, the base station central unit may receive a second message from the base station distributed unit. The second message may indicate acknowledgement of the first message. The second message may comprise second configuration parameters determined based on the first configuration parameters. At 4130, the base station central unit may transmit a third message to the wireless device and via the base station distributed unit. The third message may comprise the second configuration parameters. At 4140, the base station distributed unit may start a configuration timer in response to forwarding the third message to the wireless device. At 4150, the base station central unit may receive a fourth message from the wireless device and via the base station distributed unit. The fourth message may confirm one or more elements of the second configuration parameters. At 4160, the base station distributed unit may consider and in response to expiration of the configuration timer, that the wireless device successfully performed a reconfiguration procedure based on the second configuration parameters.

FIG. 42 is an example flow diagram as per an aspect of an embodiment of the present disclosure. At 4210, a base station central unit may transmit a first message to a base station distributed unit. The first message may comprise first configuration parameters for a wireless device. At 4220, the base station central unit may receive a second message from the base station distributed unit. The second message may indicate acknowledgement of the first message. The second message may comprise second configuration parameters determined based on the first configuration parameters. At 4230, the base station central unit may transmit to the wireless device and via the base station distributed unit, a third message. The third message may comprise the second configuration parameters. At 4240, the base station central unit may receive from the wireless device and via the base station distributed unit, a fourth message. The fourth message may confirm one or more elements of the second configuration parameters. At 4250, the base station distributed unit may receive a fifth message from the wireless device. The fifth message may indicate that the wireless device successfully performed a reconfiguration procedure based on the second configuration parameters. According to an embodiment, the fifth message may be transmitted via at least one of: a medium access control layer message, or a physical layer indication.

FIG. 43 is an example flow diagram as per an aspect of an embodiment of the present disclosure. At 4310, a base station distributed unit may transmit a first message to a base station central unit. The first message may comprise one or more beam configuration parameters of a first cell. The one or more beam configuration parameters may comprise a first beam index identifying a first beam. The one or more beam configuration parameters may comprise first beam scheduling information of the first beam. At 4320, the base station distributed unit may receive a second message from the base station central unit. The second message may indicate acknowledgement of the first message. At 4330, the base station distributed unit may transmit a system information block to a plurality of wireless devices. The system information block may comprise the one or more beam configuration parameters of the first cell. At 4340, the base station distributed unit may transmit synchronization signals to the plurality of wireless devices via the first beam.

According to an embodiment, the first beam scheduling information may comprise a synchronization signal periodicity, According to an embodiment, the first beam scheduling information may comprise a synchronization signal frequency. According to an embodiment, the first beam scheduling information may comprise a channel state information-reference signal periodicity. According to an embodiment, the first beam scheduling information may comprise a channel state information-reference signal frequency. According to an embodiment, the base station distributed unit may transmit to the plurality of wireless devices, the system information block is via the base station central unit. According to an embodiment, the base station central unit may transmit to a wireless device, a radio resource control message may comprise the one or more beam configuration parameters.

FIG. 44 is an example flow diagram as per an aspect of an embodiment of the present disclosure. At 4410, a first distributed radio access network entity may receive a first message from a central radio access network entity. The first message may comprise one or more beam configuration parameters for a serving cell of the first distributed radio access network entity. The first message may be configured to request at least one of: activation of a first beam, deactivation of a second beam, and modification of a configuration of a third beam. At 4420, the first distributed radio access network entity may transmit a second message to the central radio access network entity and in response to the first message. The second message may indicate at least one of: acceptance of the request of the first message, and rejection of the request of the first message. At 4430, the first distributed radio access network entity may configure beam configurations based on the one or more beam configuration parameters. At 4440, the first distributed radio access network entity may transmit beam information to a plurality of wireless devices. The beam information may be determined based on the one or more beam configuration parameters.

According to an embodiment, a third message may be received by the central radio access network entity from a first wireless device. According to an embodiment, a third message may be received by the central radio access network entity from a neighboring base station. According to an embodiment, a third message may be received by the central radio access network entity from the first distributed radio access network entity. According to an embodiment, a third message may be received by the central radio access network entity from a second distributed radio access network entity.

According to an embodiment, the third message may comprise a resource status information of one or more beams of one or more cells. According to an embodiment, the third message may comprise a resource status information of one or more cells. According to an embodiment, the third message may comprise a load status information of one or more beams of one or more cells (e.g. a number of serving wireless devices, a number of radio resource control inactive state wireless devices, a random access resource utilization information, and/or the like). According to an embodiment, the third message may comprise a load status information of one or more cells. According to an embodiment, the third message may comprise an uplink receiving interference information of one or more beams. According to an embodiment, the third message may comprise an uplink receiving interference information of one or more cells. According to an embodiment, the third message may comprise a downlink receiving interference information of one or more beams. According to an embodiment, the third message may comprise a downlink receiving interference information of one or more cells.

According to an embodiment, the central radio access network entity may determine one or more elements of the first message based on the third message. According to an embodiment, a third message may be received by the central radio access network entity from the first distributed radio access network entity. According to an embodiment, the central radio access network entity may transmit to a wireless device, a fourth message comprising one or more radio resource control configuration parameters based on the second message.

According to an embodiment, the one or more beam configuration parameters indicate a beam index. According to an embodiment, the one or more beam configuration parameters indicate beam scheduling information. According to an embodiment, the one or more beam configuration parameters indicate a beam transmission power. According to an embodiment, the one or more beam configuration parameters indicate a beam steering direction.

FIG. 45 is an example flow diagram as per an aspect of an embodiment of the present disclosure. At 4510, a base station central unit may transmit a first message to a wireless device via a base station distributed unit. The first message may comprise configuration parameters of the wireless device. At 4520, the base station central unit may receive a second message from the wireless device via the base station distributed unit. The second message may confirm at least one of the configuration parameters. At 4530, the base station central unit may transmit a third message to the base station distributed unit. The third message may indicate that the wireless device successfully performed a reconfiguration procedure based on the configuration parameters.

FIG. 46 is an example flow diagram as per an aspect of an embodiment of the present disclosure. At 4610, a base station distributed unit may determine that a first uplink timing advance value for a first cell of a wireless device is different than a second uplink timing advance value for a second cell of the wireless device. The first cell and the second cell may belong to a first timing advance group. At 4620, the base station distributed unit may transmit a first message to a base station central unit in response to the determining. The first message may comprise one or more information elements. The one or more information elements may indicate a reconfiguration of a timing advance group configuration for the wireless device. At 4630, the base station distributed unit may receive from the base station central unit, a radio resource control message based on the reconfiguration for the wireless device.

According to an embodiment, the radio resource control message may indicate that the first timing advance group may comprise the first cell. According to an embodiment, the radio resource control message may indicate that a second timing advance group may comprise the second cell. According to an embodiment, the base station central unit may create based on the first message, the second timing advance group for the second cell. According to an embodiment, the base station distributed unit may receive from the wireless device: at least one first reference signal via the first cell and at least one second reference signal via the second cell. The determining may be based on: the at least one first reference signal, and the at least one second reference signal.

According to an embodiment, the at least one first reference signal may comprise a sounding reference signal. According to an embodiment, the at least one first reference signal may comprise a random access preamble. According to an embodiment, the at least one second reference signal may comprise a sounding reference signal. According to an embodiment, the at least one second reference signal may comprise a random access preamble. According to an embodiment, the base station distributed unit may transmit to the base station central unit, configuration information may indicate that the first timing advance group may comprise the first cell and the second cell. According to an embodiment, the base station distributed unit may receive from the base station central unit, a second radio resource control message. The second radio resource control message may comprise the configuration information. According to an embodiment, the base station distributed unit may transmit to the wireless device, the second radio resource control message.

According to an embodiment, the base station distributed unit may transmit the radio resource control message to the wireless device. According to an embodiment, the base station distributed unit may transmit to the wireless device, a timing advance command for at least one of: the first timing advance group of the first cell, or a second timing advance group of the second cell. According to an embodiment, the timing advance command is transmitted via a medium access control control element. According to an embodiment, the second cell is served by multiple transmission and reception points. According to an embodiment, the first message indicates at least one of: the first uplink timing advance value is different than the second uplink timing advance value, or the first cell and the second cell need to belong to different timing advance groups for the wireless device.

According to an embodiment, the first message further may comprise at least one of: the first uplink timing advance value, the second uplink timing advance value, or a difference value may indicate an amount of difference between the first uplink timing advance value and the second uplink timing advance value. According to an embodiment, the first uplink timing advance value indicates an amount of time to be adjusted for uplink time alignment of the first cell. According to an embodiment, the second uplink timing advance value may indicate an amount of time to be adjusted for uplink time alignment of the second cell. According to an embodiment, the first message further may comprise an identifier of the wireless device. According to an embodiment, the base station distributed unit may receive from the base station central unit, a second message in response to the first message. The second message may indicate acknowledgment of the one or more information elements.

According to an embodiment, the first message and the radio resource control message may be transmitted via an F1 interface between the base station distributed unit and the base station central unit. According to an embodiment, the base station central unit may comprise a radio resource control function for the wireless device. According to an embodiment, the base station distributed unit may comprise at least one of: a medium access control layer function for the wireless device, or a physical layer function for the wireless device. According to an embodiment, the base station distributed unit may transmit to the base station central unit, a configuration parameter. The configuration parameter may indicate at least one of: the first cell is served by a first transmission and reception point, or the second cell is served by: the first transmission and reception point, a second transmission and/or a reception point. According to an embodiment, the base station distributed unit may decode the radio resource control message.

FIG. 47 is an example flow diagram as per an aspect of an embodiment of the present disclosure. At 4710, a base station distributed unit may receive from a wireless device, at least one first reference signal via a first cell and at least one second reference signal via a second cell. The first cell and the second cell may be configured to belong to a first timing advance group. At 4720, the base station distributed unit may determine based on the at least one first reference signal and the at least one second reference signal, that a first uplink time alignment value of the wireless device for the first cell is different than a second uplink timing advance value of the wireless device for the second cell. At 4730, the base station distributed unit may transmit a first message to a base station central unit. The first message may comprise at least one of: the first uplink timing advance value is different than the second uplink timing advance value, the first uplink timing advance value and the second uplink timing advance value, a difference value may indicate an amount of difference between the first uplink timing advance value and the second uplink timing advance value, or a timing advance group reconfiguration request for at least one of the first cell or the second cell.

According to an embodiment, the base station distributed unit may receive from the base station central unit, a second message in response to the first message. The second message may indicate an acknowledgement for one or more elements of the first message. According to an embodiment, the base station central unit may configure, based on the first message, the second cell to belong to a second timing advance group. According to an embodiment, the base station central unit may transmit to the wireless device via the base station distributed unit, a second message may indicate the second cell belongs to the second timing advance group, wherein the second message may comprise a timing advance group identifier of the second timing advance group.

According to an embodiment, the base station distributed unit may decode the second message. The base station distributed unit may transmit to the wireless device, a timing advance command for the second cell with the timing advance group identifier. According to an embodiment, the base station distributed unit may receive third message from the base station central unit. The third message may indicate the second cell belongs to the second timing advance group. The third message may comprise the timing advance group identifier. According to an embodiment, the base station distributed unit may transmit to the wireless device, a timing advance command with the timing advance group identifier for the second cell.

FIG. 48 is an example flow diagram as per an aspect of an embodiment of the present disclosure. At 4810, a base station central unit may receive timing advance correlation information from a network entity. The timing advance correlation information may comprise one or more cell identifiers of one or more cells. The one or more cells may be served by a first transmission and reception point. At 4820, the base station central unit may configure the one or more cells to belong to a first timing advance group for a wireless device in response to the one or more cells being served by the first transmission and reception point. At 4830, the base station central unit may transmit radio resource control configuration information to the wireless device via a base station distributed unit. The radio resource control configuration information may indicate that the one or more cells belong to the first timing advance group.

FIG. 49 is an example flow diagram as per an aspect of an embodiment of the present disclosure. At 4910, a base station central unit may receive timing advance correlation information from a network entity. The timing advance correlation information may comprise at least one identifier of at least one timing advance correlation group. The timing advance correlation information may comprise a list of cells grouped into one of the at least one timing advance correlation group. The list of cells may comprise an uplink timing advance value. At 4920, the base station central unit may configure one or more cells to belong to a first timing advance group for a wireless device in response to the one or more cells being in the list of cells. At 4930, the base station central unit may transmit radio resource control configuration information to the wireless device via a base station distributed unit. The radio resource control configuration information may indicate that a first cell of the one or more cells belongs to the first timing advance group.

According to an embodiment, the network entity may comprise at least one of: the base station distributed unit, or an operation and maintenance entity. According to an embodiment, the radio resource control configuration information may comprise: a cell identifier of the first cell, and a timing advance group identifier of the first timing advance group. According to an embodiment, the base station distributed unit may decode the radio resource control configuration information. According to an embodiment, the base station distributed unit may transmit to the wireless device: a timing advance command for the first cell, and the timing advance group identifier of the first timing advance group. According to an embodiment, the base station distributed unit may receive from the base station central unit, a first message may indicate that the first cell belongs to the first timing advance group, wherein the first message may comprise the identifier of the first timing advance group. According to an embodiment, the base station distributed unit may transmit to the wireless device: a timing advance command for the first cell, and the timing advance group identifier of the first timing advance group.

Figure 50:
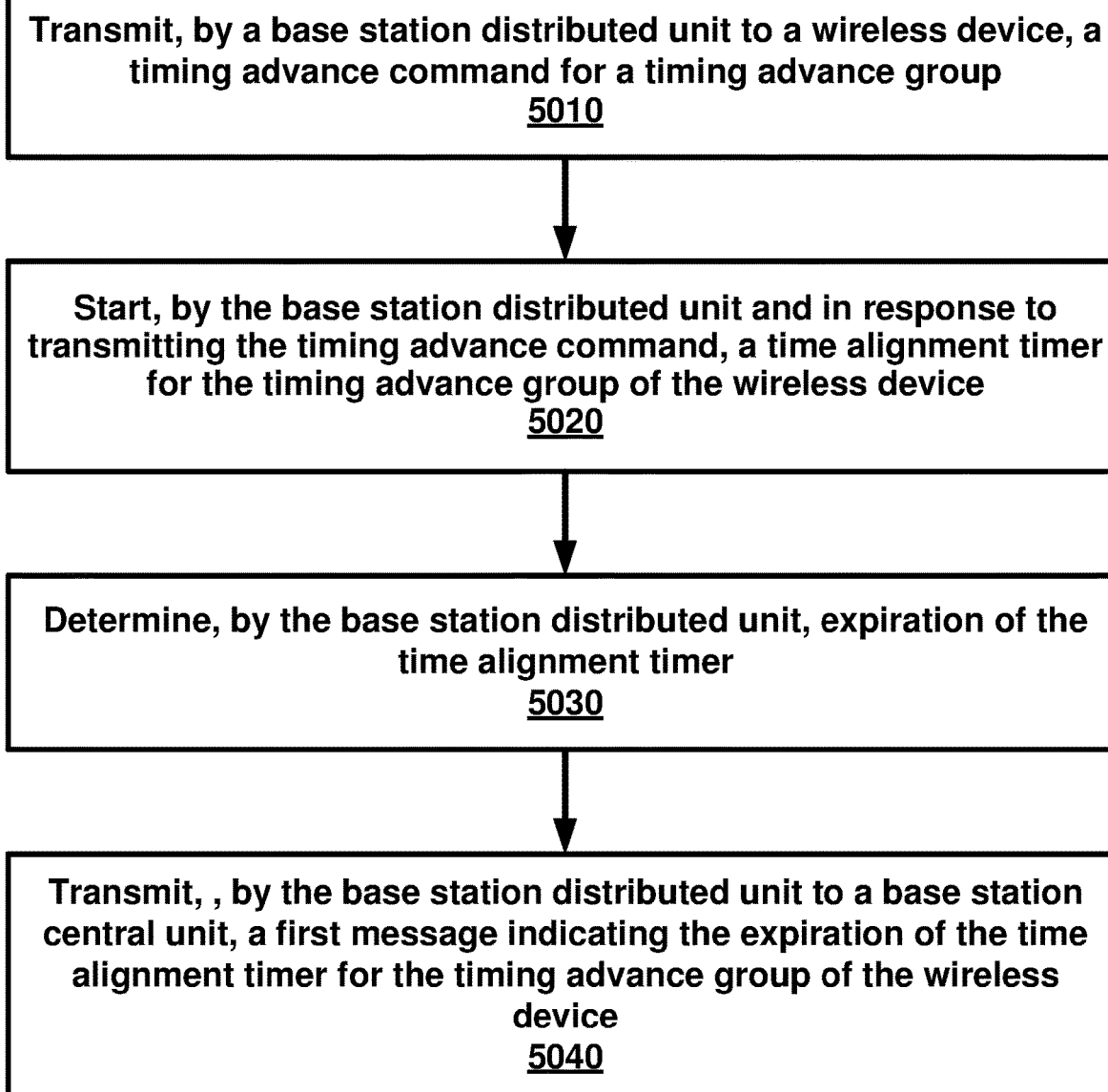
FIG. 50 is a flow diagram of an aspect of an embodiment of the present disclosure.

FIG. 50 is an example flow diagram as per an aspect of an embodiment of the present disclosure. At 5010, a base station distributed unit may transmit to a wireless device, a timing advance command for a timing advance group. At 5020, the base station distributed unit may start in response to transmitting the timing advance command, a time alignment timer for the timing advance group of the wireless device. At 5030, the base station distributed unit may determine expiration of the time alignment timer. At 5040, the base station distributed unit may transmit a first message to a base station central unit. The first message may indicate the expiration of the time alignment timer for the timing advance group of the wireless device.

According to an embodiment, the timing advance group may comprise one or more cells. According to an embodiment, in response to determining the expiration of the time alignment timer, the base station distributed unit may release hybrid automated repeat request uplink resource configurations for one or more cells of the timing advance group. According to an embodiment, in response to determining the expiration of the time alignment timer, the base station distributed unit may release physical uplink control channel configurations for one or more cells of the timing advance group. According to an embodiment, in response to determining the expiration of the time alignment timer, the base station distributed unit may release sounding reference signal configurations for one or more cells of the timing advance group. According to an embodiment, in response to determining the expiration of the time alignment timer, the base station distributed unit may clear configured downlink assignments for one or more cells of the timing advance group. According to an embodiment, in response to determining the expiration of the time alignment timer, the base station distributed unit may clear uplink resource grants for one or more cells of the timing advance group. According to an embodiment, in response to determining the expiration of the time alignment timer, the base station distributed unit may determine, in response to the timing advance group being a primary timing advance group, that a running time alignment timer for the timing advance group is expired.

According to an embodiment, in response to the expiration of the time alignment timer, the base station distributed unit may apply a default physical channel configuration for one or more cells of the timing advance group. The default physical channel configuration may comprise at least one of: channel quality information report configurations. The default physical channel configuration may comprise uplink resource scheduling request configurations. The default physical channel configuration may comprise dedicated uplink sounding reference signal configurations.

According to an embodiment, the base station central unit may apply, in response to receiving the first message, a default physical channel configuration for one or more cells of the timing advance group. The default physical channel configuration may comprise channel quality information report configurations. The default physical channel configuration may comprise uplink resource scheduling request configurations. The default physical channel configuration may comprise dedicated uplink sounding reference signal configurations.

According to an embodiment, the base station distributed unit may receive a second message and based on the first message, a second message may indicate a wireless device context release request for the wireless device. According to an embodiment, the base station distributed unit may release and in response to receiving the second message, a wireless device context of the wireless device. The wireless device context may comprise one or more data radio bearers. The wireless device context may comprise one or more logical channels. The wireless device context may comprise one or more security configuration parameters. The wireless device context may comprise one or more information associated with the wireless device. According to an embodiment, the base station central unit may transmit the second message in response to the timing advance group being a primary timing advance group.

According to an embodiment, the base station distributed unit may release and based on the expiration of the time alignment timer, a wireless device context of the wireless device. The wireless device context may comprise one or more data radio bearers. The wireless device context may comprise one or more logical channels. The wireless device context may comprise one or more security configuration parameters. The wireless device context may comprise one or more information associated with the wireless device.

According to an embodiment, the base station central unit may transmit to a core network entity and based on the first message, a third message. The third message may indicate release of an interface connection for the wireless device between the base station central unit and the core network entity. According to an embodiment, the base station central unit may transmit the third message in response to the timing advance group being a primary timing advance group. According to an embodiment, the core network entity may comprise an access and mobility management function. According to an embodiment, the core network entity may comprise a mobility management function.

According to an embodiment, further may comprise releasing, by the base station central unit may release and based on the first message, a wireless device context of the wireless device. The wireless device context may comprise one or more data radio bearers. The wireless device context may comprise one or more logical channels. The wireless device context may comprise one or more security configuration parameters. The wireless device context may comprise one or more information associated with the wireless device.

According to an embodiment, the base station central unit and in response to receiving the first message, may release hybrid automated repeat request uplink resource configurations for one or more cells of the timing advance group. According to an embodiment, the base station central unit and in response to receiving the first message, may release physical uplink control channel configurations for one or more cells of the timing advance group. According to an embodiment, the base station central unit and in response to receiving the first message, may release sounding reference signal configurations for one or more cells of the timing advance group. According to an embodiment, the base station central unit and in response to receiving the first message, may clear configured downlink assignments for one or more cells of the timing advance group. According to an embodiment, the base station central unit and in response to receiving the first message, may clear uplink resource grants for one or more cells of the timing advance group. According to an embodiment, the base station central unit and in response to receiving the first message, may determine, in response to the timing advance group being a primary timing advance group, that a running time alignment timer for the timing advance group is expired.

According to an embodiment, the base station central unit may comprise a radio resource control function for the wireless device. According to an embodiment, the base station distributed unit may comprise a medium access control layer function for the wireless device. According to an embodiment, the base station distributed unit may comprise a physical layer function for the wireless device.

According to an embodiment, the transmitting of the first message may be via an F1 interface. According to an embodiment, the transmitting of the timing advance command may be via a medium access control element. According to an embodiment, the time alignment timer may be configured by the base station central unit. According to an embodiment, the time alignment timer may be configured by the base station distributed unit. According to an embodiment, a base station may comprise the base station central unit and the base station distributed unit. According to an embodiment, the base station central unit may transmit to the wireless device, the time alignment timer via the base station distributed unit. According to an embodiment, the first message further may comprise an identifier of the wireless device. According to an embodiment, the first message further may comprise one or more cell identifiers of one or more cells of the timing advance group. According to an embodiment, the first message further may comprise a timing advance group identifier of the timing advance group.

Figure 51:
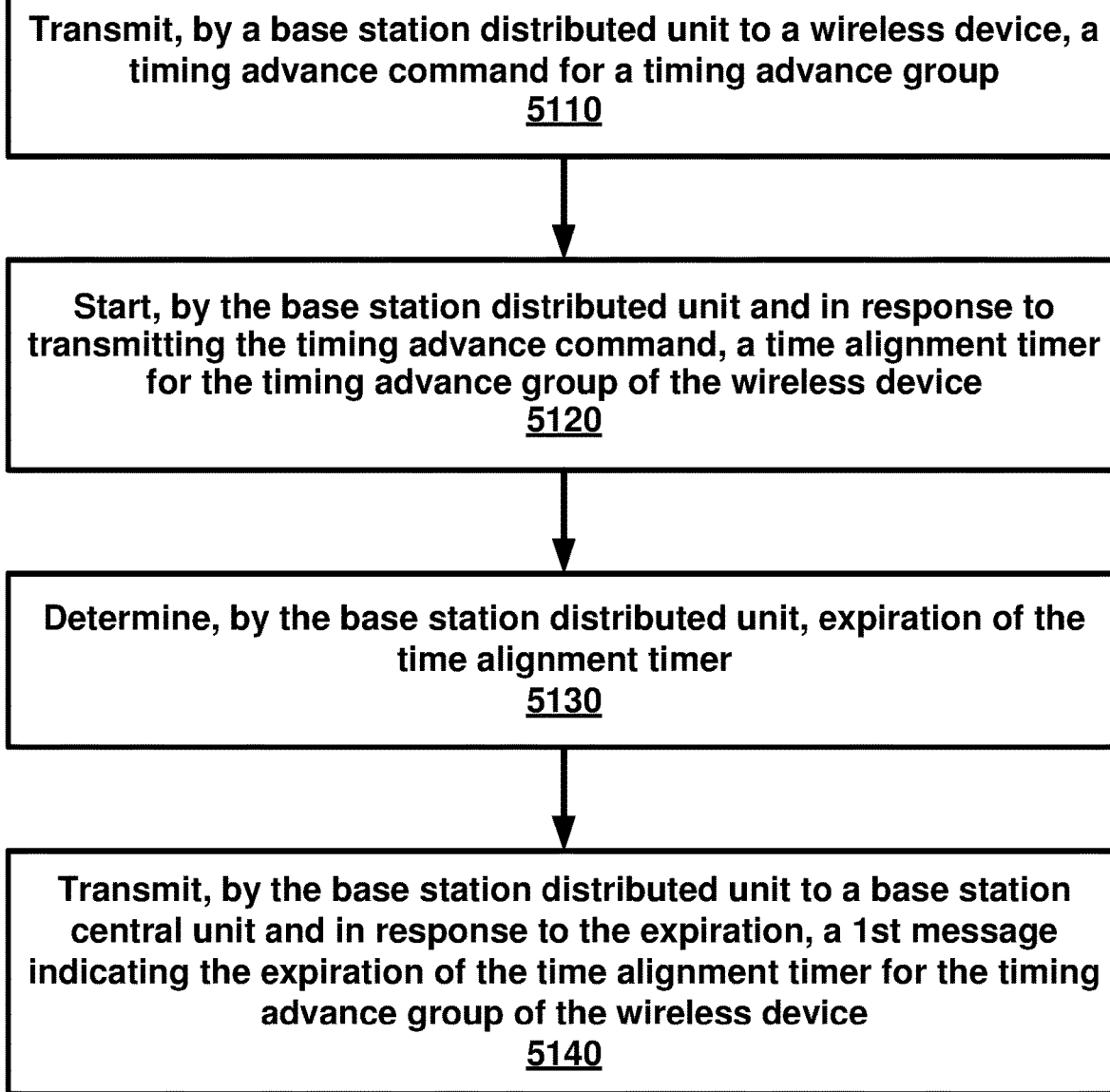
FIG. 51 is a flow diagram of an aspect of an embodiment of the present disclosure.

FIG. 51 is an example flow diagram as per an aspect of an embodiment of the present disclosure. At 5110, a base station distributed unit may transmit to a wireless device, a timing advance command for a timing advance group. At 5120, starting, by the base station distributed unit may start and in response to transmitting the timing advance command, a time alignment timer for the timing advance group of the wireless device. At 5130, the base station distributed unit may determine expiration of the time alignment timer. At 5140, the base station distributed unit may transmit a first message to a base station central unit in response to the expiration. The first message may indicate a request for releasing physical uplink control channel configurations of the wireless device for one or more cells of the timing advance group, The first message may indicate a request for releasing sounding reference signal configurations of the wireless device for the one or more cells.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, because those wireless devices or base stations perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed to one or more of the various embodiments.

If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state In this disclosure, various embodiments are disclosed. Limitations, features, and/or elements from the disclosed example embodiments may be combined to create further embodiments within the scope of the disclosure.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more (or at least one) message(s) comprise a plurality of parameters, it implies that a parameter in the plurality of parameters is in at least one of the one or more messages, but does not have to be in each of the one or more messages. In an example embodiment, when one or more (or at least one) message(s) indicate a value, event and/or condition, it implies that the value, event and/or condition is indicated by at least one of the one or more messages, but does not have to be indicated by each of the one or more messages.

Furthermore, many features presented above are described as being optional through the use of "may" or the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (i.e. hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the scope. In fact, after reading the above description, it will be apparent to one skilled in the relevant art(s) how to implement alternative embodiments. Thus, the present embodiments should not be limited by any of the above described exemplary embodiments.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A method comprising:
   determining, by a base station distributed unit, that a first uplink timing advance value for a first cell of a wireless device is different than a second uplink timing advance value for a second cell of the wireless device, wherein the first cell and the second cell belong to a first timing advance group, and wherein a base station comprises the base station distributed unit and a base station central unit;
   transmitting, by the base station distributed unit to the base station central unit, a first message in response to the determining, wherein the first message comprises one or more information elements indicating a reconfiguration of a timing advance group configuration for the wireless device; and
   receiving, by the base station distributed unit from the base station central unit, a radio resource control message based on the reconfiguration for the wireless device.

2. The method of claim 1, wherein the radio resource control message indicates that:
   the first timing advance group comprises the first cell; and
   a second timing advance group comprises the second cell.

3. The method of claim 2, further comprising creating, by the base station central unit and based on the first message, the second timing advance group for the second cell.

4. The method of claim 1, further comprising receiving, by the base station distributed unit from the wireless device: at least one first reference signal via the first cell; and at least one second reference signal via the second cell; and wherein the determining is based on: the at least one first reference signal; and the at least one second reference signal.

5. The method of claim 4, wherein the at least one first reference signal comprises at least one of:
   a sounding reference signal; or
   a random access preamble.

6. The method of claim 4, wherein the at least one second reference signal comprises at least one of:
   a sounding reference signal; or
   a random access preamble.

7. The method of claim 1, further comprising transmitting, by the base station distributed unit to the base station central unit, configuration information indicating that the first timing advance group comprises the first cell and the second cell.

8. The method of claim 7, further comprising:
   receiving, by the base station distributed unit from the base station central unit, a second radio resource control message comprising the configuration information; and
   transmitting, by the base station distributed unit to the wireless device, the second radio resource control message.

9. The method of claim 1, further comprising transmitting, by the base station distributed unit to the wireless device, the radio resource control message.

10. The method of claim 1, further comprising transmitting, by the base station distributed unit to the wireless device, a timing advance command for at least one of:
    the first timing advance group of the first cell; or
    a second timing advance group of the second cell.

11. The method of claim 10, wherein the timing advance command is transmitted via a medium access control control element.

12. The method of claim 1, wherein the second cell is served by multiple transmission and reception points.

13. The method of claim 1, wherein the first message indicates at least one of:
- the first uplink timing advance value is different than the second uplink timing advance value; or
- the first cell and the second cell need to belong to different timing advance groups for the wireless device.

14. The method of claim 1, wherein the first message further comprises at least one of:
- the first uplink timing advance value;
- the second uplink timing advance value; or
- a difference value indicating an amount of difference between the first uplink timing advance value and the second uplink timing advance value.

15. The method of claim 1, wherein:
- the first uplink timing advance value indicates an amount of time to be adjusted for uplink time alignment of the first cell; and
- the second uplink timing advance value indicates an amount of time to be adjusted for uplink time alignment of the second cell.

16. The method of claim 1, wherein the first message further comprises an identifier of the wireless device.

17. The method of claim 1, further comprising receiving, by the base station distributed unit from the base station central unit, an acknowledgment of the one or more information elements.

18. The method of claim 1, wherein the first message and the radio resource control message are transmitted via an F1 interface between the base station distributed unit and the base station central unit.

19. The method of claim 1, wherein:
- the base station central unit comprises a radio resource control function for the wireless device; and
- the base station distributed unit comprises at least one of:
  - a medium access control layer function for the wireless device; or
  - a physical layer function for the wireless device.

20. The method of claim 1, further comprising transmitting, by the base station distributed unit to the base station central unit, a configuration parameter indicating at least one of:
- the first cell is served by a first transmission and reception point; or
- the second cell is served by:
  - the first transmission and reception point; and
  - a second transmission and reception point.

* * * * *